(12) United States Patent
Shoemaker et al.

(10) Patent No.: US 11,815,619 B1
(45) Date of Patent: Nov. 14, 2023

(54) RADAR CONFIGURATION USING STATIONARY FEED HORN, SIGNAL GENERATOR, AND REFLECTOR

(71) Applicant: StormQuant, Inc., Campbell, CA (US)

(72) Inventors: Kevin Shoemaker, Indian Harbour Beach, FL (US); Andrew Bryant, Los Gatos, CA (US); Nick Muhlhauser, Los Gatos, CA (US)

(73) Assignee: STORMQUANT, INC., Campbell, CA (US)

( * ) Notice: Subject to any disclaimer, the term of this patent is extended or adjusted under 35 U.S.C. 154(b) by 172 days.

(21) Appl. No.: 16/800,621

(22) Filed: Feb. 25, 2020

Related U.S. Application Data

(63) Continuation of application No. 16/262,760, filed on Jan. 30, 2019, now abandoned, and a continuation of
(Continued)

(51) Int. Cl.
*G01S 7/02* (2006.01)
*G01S 7/04* (2006.01)
(Continued)

(52) U.S. Cl.
CPC ............... *G01S 7/024* (2013.01); *G01S 7/04* (2013.01); *G01S 7/282* (2013.01); *G01S 7/285* (2013.01); *G01S 13/89* (2013.01); *G01S 13/003* (2013.01)

(58) Field of Classification Search
CPC ........ G01S 13/883; G01S 13/06; G01S 7/023; G01S 13/66; G01S 13/44; G01S 7/4004;
(Continued)

(56) References Cited

U.S. PATENT DOCUMENTS 3,793,634 A 2/1974 Heller et al.
4,312,002 A * 1/1982 Stewart .................... H01Q 3/20
343/781 P
(Continued)

FOREIGN PATENT DOCUMENTS

CN 202160172 U 3/2012
CN 105703796 A 6/2016
EP 2194395 A1 * 6/2010 ............... G01S 7/35

OTHER PUBLICATIONS

Author Unknown, "Antenna (radio)," Wikipedia, date unknown but prior to Jan. 30, 2018, 10 pages, Wikipedia. com, retrieved from https://en.wikipedia.org/wiki/Antenna_(radio).
(Continued)

*Primary Examiner* — Olumide Ajibade Akonai
(74) *Attorney, Agent, or Firm* — ADELI LLP

(57) ABSTRACT

Some embodiments of the invention provide Pulse Doppler Polarimetric radars that are configured in a manner to eliminate traditional components that contribute to the high system cost, the overall weight and the low reliability of the radars. In some embodiments, each radar includes a (1) a beam steering walking splash plate with positioning actuator(s), (2) a feed horn antenna with wave guide assembly, (3) a parabolic reflector, (4) radar electronic components, and (5) radome and mounting bracket(s). The feed horn antenna, parabolic reflector, and wave guide assembly (including a signal generator) are stationary with respect to each other in some embodiments.

17 Claims, 36 Drawing Sheets

Related U.S. Application Data application No. 16/261,505, filed on Jan. 29, 2019, now abandoned.

(60) Provisional application No. 62/768,086, filed on Nov. 15, 2018, provisional application No. 62/745,979, filed on Oct. 15, 2018, provisional application No. 62/624,102, filed on Jan. 30, 2018.

(51) Int. Cl.
*G01S 7/282* (2006.01)
*G01S 7/285* (2006.01)
*G01S 13/89* (2006.01)
*G01S 13/00* (2006.01)

(58) Field of Classification Search
CPC . G01S 7/032; G01S 7/03; G01S 13/88; G01S 13/931; G01S 7/024; G01S 7/04; G01S 7/282; G01S 7/285; G01S 13/89; G01S 13/003; F41G 7/2286; H01Q 13/02; H01Q 19/10; H01Q 1/125; H01Q 13/10; H01Q 21/064; H01Q 1/3233; H01Q 15/16; H01Q 3/08; H01Q 15/246; H01Q 21/24; H01Q 15/14
See application file for complete search history.

(56) References Cited

U.S. PATENT DOCUMENTS

| | | | |
|---|---|---|---|
| 4,316,195 A | 2/1982 | Steffek et al. | |
| 5,923,284 A | 7/1999 | Artis et al. | |
| 6,043,788 A | 3/2000 | Seavey | |
| 6,724,349 B1 | 4/2004 | Baird et al. | |
| 6,982,678 B2 | 1/2006 | Obert et al. | |
| 7,450,052 B2 | 11/2008 | Hausner et al. | |
| 8,085,181 B2 | 12/2011 | Gekat | |
| 8,817,672 B2 | 8/2014 | Corman et al. | |
| 8,988,274 B2* | 3/2015 | Zhang | G01S 7/024 342/368 |
| 9,094,102 B2 | 7/2015 | Corman et al. | |
| 9,194,945 B2 | 11/2015 | Stewart et al. | |
| 9,405,001 B2 | 8/2016 | Stewart et al. | |
| 9,484,617 B2 | 11/2016 | Takahashi | |
| 9,696,419 B2 | 7/2017 | Mitchell | |
| 2001/0030624 A1 | 10/2001 | Schwoegler | |
| 2002/0164946 A1 | 11/2002 | Olsen et al. | |
| 2002/0164960 A1 | 11/2002 | Slaughter et al. | |
| 2002/0165001 A1 | 11/2002 | Phillips et al. | |
| 2006/0202886 A1 | 9/2006 | Mahapatra et al. | |
| 2007/0052576 A1 | 3/2007 | Hausner et al. | |
| 2007/0121103 A1 | 5/2007 | Salmon | |
| 2007/0257856 A1* | 11/2007 | Peterson | H01Q 15/0026 343/872 |
| 2008/0100523 A1* | 5/2008 | Kim | H01Q 3/20 343/757 |
| 2009/0160700 A1 | 6/2009 | Messer-Yaron et al. | |
| 2009/0174596 A1 | 7/2009 | Gekat | |
| 2010/0097263 A1* | 4/2010 | Vacanti | G01S 13/931 342/70 |
| 2010/0245167 A1 | 9/2010 | Bunch et al. | |
| 2011/0102249 A1 | 5/2011 | Venkatachalam et al. | |
| 2011/0248902 A1* | 10/2011 | Miyagawa | H01Q 15/02 343/872 |
| 2011/0309987 A1* | 12/2011 | Haluba | H01Q 1/42 343/781 CA |
| 2012/0086596 A1 | 4/2012 | Insanic et al. | |
| 2013/0201070 A1 | 8/2013 | Parsche | |
| 2014/0028488 A1 | 1/2014 | Stewart et al. | |
| 2014/0362088 A1 | 12/2014 | Veillette et al. | |
| 2016/0025840 A1 | 1/2016 | Steward et al. | |
| 2016/0341816 A1 | 11/2016 | Stewart et al. | |
| 2017/0075034 A1 | 3/2017 | Kleeman et al. | |

OTHER PUBLICATIONS

Author Unknown, "CASA WX (Collaborative Adaptive Sensing of the Atmosphere) Executive Summary," Collaborative Adaptive Sensing of the Atmosphere (CASA WX), May 20, 2014, 2 pages, North Central Texas Council of Governments, retrieved from https://www.nctcog.org/getmedia/63d2493d-f017-4e6b-b8c1-7c190282cb56/CASAWX_Executive_Summary.pdf.

Author Unknown, "Integrated Waveguide Assemblies," date unknown but prior to Jan. 30, 2018, 4 pages, Ferrite Microwave Technologies, retrieved from https://ferriteinc.com/high-power-waveguide-components/integrated-assemblies/.

Author Unknown, "Radio telescope," Wikipedia, date unknown but prior to Jan. 30, 2018, 4 pages, Wikipedia.com, retrieved from https://en.wikipedia.org/wiki/Radio_telescope.

Chandrasekar, V., et al., "Principles of High-Resolution Radar Network for Hazard Mitigation and Disaster Management in an Urban Environment," Journal of the Meteorological Society of Japan, Jan. 2018, 21 pages, vol. 96A, Meteorological Society of Japan, retrieved from https://www.jstage.jst.go.jp/article/jmsj/96A/0/96A_2018-015/ pdf/-char/en.

Chen, Haonan, et al., "Chapter 15: Real-Time Wind Velocity Retrieval in the Precipitation System Using High- Resolution Operational Multi-radar Network," Remote Sensing of Aerosols, Clouds, and Precipitation, Month Unknown 2018, 25 pages, Elsevier, retrieved from https://www.sciencedirect.com/science/article/pii/B9780128104378000153.

Gao, Jidong, et al., "A Variational Method for the Analysis of Three-Dimensional Wind Fields from Two Doppler Radars," Monthly Weather Review, Sep. 1, 1999, 15 pages, vol. 127, American Meteorological Society, retrieved from https://journals.ametsoc.org/view/journals/mwre/127/9/1520-0493_1999_127_2128_avmfta_2.0.co_2.xml.

McLaughlin, David, et al., "Short-Wavelength Technology and the Potential for Distributed Networks of Small Radar Systems," Bulletin of the American Meteorological Society, Dec. 1, 2009, 22 pages, vol. 90, American Meteorological Society, retrieved from https://journals.ametsoc.org/view/journals/bams/90/12/2009bams2507_1.xml.

Non-Published Abandoned Commonly Owned U.S. Appl. No. 16/261,505, filed Jan. 29, 2019, 77 pages, StormQuant, Inc.
Non-Published Abandoned Commonly Owned U.S. Appl. No. 16/262,760, filed Jan. 30, 2019, 76 pages, StormQuant, Inc.
Non-Published Abandoned Commonly Owned U.S. Appl. No. 16/800,597, filed Feb. 25, 2020, 77 pages, StormQuant, Inc.
Non-Published Abandoned Commonly Owned U.S. Appl. No. 16/800,608, filed Feb. 25, 2020, 77 pages, StormQuant, Inc.
Non-Published Abandoned Commonly Owned U.S. Appl. No. 16/800,629, filed Feb. 25, 2020, 78 pages, StormQuant, Inc.
Non-Published Abandoned Commonly Owned U.S. Appl. No. 16/800,643, filed Feb. 25, 2020, 77 pages, StormQuant, Inc.

Rahmat-Samii, Yahya, "Chapter 15: Reflector Antennas," Antenna Engineering Handbook, Fourth Edition, Jun. 2007, 63 pages, McGraw-Hill Professional, United States of America.

Wade, Paul, "Chapter 8: Periscope Antenna Systems," The W1GHZ Online Microwave Antenna Book, May 17, 2000, 23 pages, Paul Wade, W1GHZ, retrieved from http://www.w1ghz.org/antbook/chap8.pdf.

Ware, Randolph H., et al., "SuomiNet: A Real-Time National GPS Network for Atmospheric Research and Education," Bulletin of the American Meteorological Society, Apr. 1, 2000, 18 pages, American Meteorological Society, retrieved from https://journals.ametsoc.org/view/journals/bams/81/4/1520-0477_2000_081_0677_sarngn_2_3_co_2. kml.

Zhang, Sean X., "Casa Real-time Multi-Doppler Retrieval System," Jul. 7, 2011, 49 pages, Colorado State University College of Engineering, retrieved from https://www.engr.colostate.edu/academic/ece/graduate_exams/ grad_exams/sean_zhang.pdf.

Aguado, Fernando, "The Spanish Weather Radar Network," 32nd Conference on Radar Meteorology, Oct. 27, 2005, 3 pages, American Meteorological Society, retrieved from https://ams.confex.com/ams/32Rad11Meso/techprogram/session_18896.htm.

(56) References Cited

OTHER PUBLICATIONS

Beck, Jeffrey, et al., "Model Wind Field Forecast Verification Using Multiple-Doppler Syntheses from a National Radar Network," Weather and Forecasting, Jan. 8, 2014, 18 pages, vol. 29, American Meteorological Society, retrieved from https://hal.science/hal-01056694v1/document.

Beck, Jeffrey, et al., "Using Gap-Filling Radars in Mountainous Regions to Complement a National Radar Network! Improvements in Multiple-Doppler Wind Syntheses," Journal of Applied Meteorology and Climatology, Mar. 1, 2013, 15 pages, vol. 52, American Meteorological Society, retrieved from https://hal.science/file/index/docid/955763/ filename/jamc-d-12-0187_2E1.pdf.

Bharadwaj, Nitin, et al., "Waveform Design for CASA X-Band Radars," 32nd Conference on Radar Meteorology, Oct. 27, 2005, 6 pages, American Meteorological Society, retrieved from https://ams.confex.com/ ams/32Rad11Meso/techprogram/session_18896.htm.

Cooley, Michael E., et al., "12.4 Reflector Feeds," Radar Handbook, Third Edition, Month Unknown 2008, 3 pages, The McGraw Hill Companies, USA.

Donovan, Brian C., et al., "Improved Radar Sensitivity through Limited Sector Scanning: The DCAS approach," 32nd Conference on Radar Meteorology, Oct. 27, 2005, 4 pages, American Meteorological Society, retrieved from https://ams.confex.com/ams/32Rad11Meso/techprogram/session_18896.htm.

Friedrich, Katja, et al., "On the use of advanced Doppler radar techniques to determine horizontal wind fields for operational weather surveillance," Meteorological Applications, Jun. 2004, 17 pages, vol. 11, Royal Meteorological Society, retrieved from https://atoc.colorado.edu/~friedrik/PUBLICATIONS/2004_MetApp_FriedrichHagen.pdf.

Istok, Michael J., et al., "NWS Use of FAA Radar Data—Status and Operational Considerations," 32nd Conference of Radar Meteorology, Oct. 27, 2005, 8 pages, American Meteorological Society, retrieved from https:// ams.confex.com/ams/32Rad11Meso/techprogram/session_18896.htm.

Junyent, Francesc, et al., "Validation of First Generation CASA Radars with CSU-CHILL," 32nd Conference on Radar Meteorology, Oct. 27, 2005, 6 pages, American Meteorological Society, retrieved from https://ams.confex. com/ams/32Rad11Meso/techprogram/session_18896.htm.

Moosakhanian, Alfred, et al., "NEXRAD Mosaics for En Route Air Traffic Controllers," 32nd Conference on Radar Meteorology, Oct. 27, 2005, 5 pages, American Meteorological Society, retrieved from https://ams.confex. com/ams/32Rad11Meso/techprogram/session_18896.htm.

Proud, Jessica, et al., "Optimal Sampling Strategies for Hazardous Weather Detection Using Networks of Dynamically Adaptive Doppler Radars," 32nd Conference on Radar Meteorology, Oct. 27, 2005, 7 pages, American Meteorological Society, retrieved from https://ams.confex.com/ams/32Rad11Meso/techprogram/session_18896.htm.

Rodriguez, Orlando L., et al., "The Cuban Weather Radar Network: Current Status and Trends," 32nd Conference on Radar Meteorology, Oct. 27, 2005, 3 pages, American Meteorological Society, retrieved from https://ams.confex.com/ams/32Rad11Meso/techprogram/session_18896.htm.

Bennish, Joseph, "On the Reflection Properties of the Conic Sections," Missouri Journal of Mathematical Sciences, Month Unknown 1993, 3 pages, vol. 5, Central Missouri State University, United States of America.

Christiansen, W. N., et al., "Radiotelescopes Second Edition," Cambridge Monographs on Physics, May 31, 1985, 5 pages, Cambridge University Press, Cambridge, England.

Huuskonen, Asko, et al., "Update on the European Weather radar co-operation," WMO Technical Conference on Meteorological and Environmental Instruments and Methods of Observation, Aug. 31, 2010, 7 pages, World Meteorological Organization, Helsinki, Finland.

Malkomes, M., et al., "The Sivam Project: Weather Radar Network for the Amazon Region," Proceedings of ERAD, Jan. 2002, 4 pages, Copernicus GmbH, Göttingen, Germany.

Rahmat-Samii, Yahya, "Chapter 20: Reflector Antennas," Antenna Engineering Handbook 5th edition, Dec. 4, 2018, 4 pages, McGraw Hill, United States of America.

Szturc, J., et al., "Concept of Dealing with Uncertainty in Radar-Based Data for Hydrological Purpose," Natural Hazards and Earth System Sciences, Mar. 27, 2008, 13 pages, vol. 8, Copernicus Publications, Göttingen, Germany.

\* cited by examiner

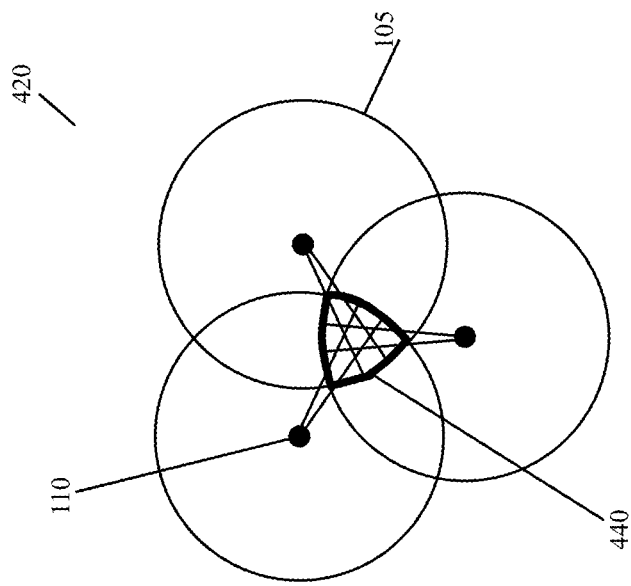
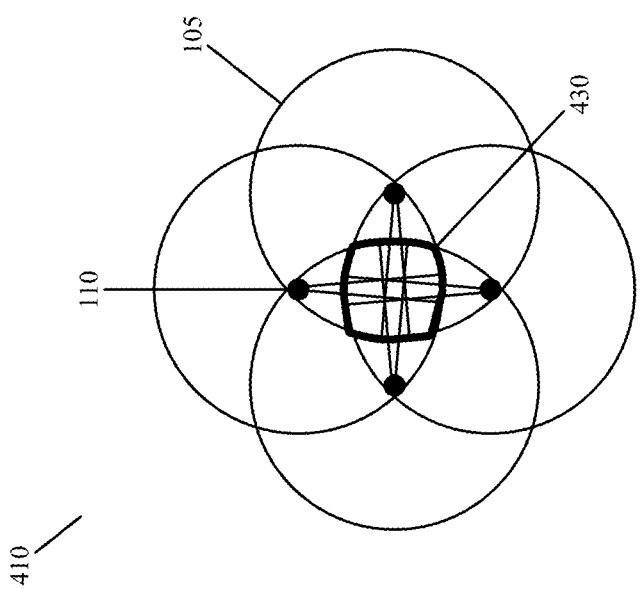
*Figure 4*

RADAR CONFIGURATION USING STATIONARY FEED HORN, SIGNAL GENERATOR, AND REFLECTOR

CLAIM OF BENEFIT TO PRIOR APPLICATIONS

This application is a continuation application of U.S. patent application Ser. No. 16/261,505, filed on Jan. 29, 2019 and U.S. patent application Ser. No. 16/262,760, filed Jan. 30, 2019. U.S. patent application Ser. Nos. 16/261,505 and 16/262,760 claim the benefit of U.S. Provisional Patent Application 62/624,102, filed Jan. 30, 2018; U.S. Provisional Patent Application 62/745,979, filed Oct. 15, 2018; and U.S. Provisional Patent Application 62/768,086, filed Nov. 15, 2018. U.S. patent application Ser. Nos. 16/261,505 and 16/262,760 and U.S. Provisional Patent Applications 62/624,102, 62/745,979, and 62/768,086 are incorporated herein by reference.

BACKGROUND

Weather forecasting systems today use expensive radars that are placed relatively far apart, so that each radar can be responsible for capturing data for a relatively large region. With advances in complex radar design and in the processing of the data captured by these radars, the existing forecasting systems have dramatically improved the accuracy of their forecasts in the last few decades. However, the resolution at which these forecasts are provided is still pretty low. Moreover, the existing systems require the use of expensive radars, with expensive backup nodes for high availability systems in case of radar failures.

BRIEF SUMMARY

Some embodiments of the invention provide a system of radars configured in a matrix that includes multiple radar cells within close proximity (e.g., separated by 100 miles or less). Each radar cell has one radar (e.g., at cell's center) in some embodiments. This system is referred to below as a "cellular radar" system as it has multiple radars in close proximity capturing overlapping data that can provide better assessment of local radar reflections. In some embodiments, this system can provide views of radar reflections with very high resolutions (e.g., as fine as 5-foot increments) and at low altitudes (e.g., as low to the horizon as ground clutter permits).

In some embodiments, the viewing perimeter of each radar cell overlaps with the viewing perimeter of one or more neighboring cells. Also, in some embodiments, the radar cells are interconnected with other radar cells in the matrix via one or more common telecommunication mediums. In some embodiments, the interconnection between the radar cells is a full mesh interconnection that connects each radar cell to every other radar cell in the matrix, while it is a partial mesh interconnection that connects each radar cell to only a subset of other radar cells in other embodiments.

Each radar is a node in the mesh network that communicates and collaborates with one or more other radars (e.g., with each of the other radars) via multiple communication paths, as well as radar-to-radar pulse modulation. When a radar fails, due to the multiplicity of radar nodes, the neighboring radars are able to compensate and maintain the network's full operational integrity. Also, the overlap and interconnectivity enable each radar cell to view its own transmitted signal in a monostatic configuration, as well as view its neighboring cell's transmissions in a bistatic configuration. This approach captures multiple perspectives of any interesting atmospheric event in an area scanned by multiple radars. With both bistatic and monostatic configurations, the collection of data from multiple sources supports tomographic and/or holographic three-dimensional viewing of selected targets. Because of the multiplicity of radars in a close-knit network, the cellular radar system of some embodiments provides high-resolution, low altitude views of radar reflections.

In some embodiments, each radar is a low-cost Pulse Doppler Polarimetric radar that has an ability to discern the composition, intensity, and direction of atmospheric constituents. The system of some embodiments applies machine learning processes to data collected by the different radars to formulate weather predictions. The machine-learning processes in some embodiments include genetic algorithms that are used for predictive and linear predictive modeling. In some embodiments, this modeling provides weather prediction on a global level with a resolution as fine as a city block or less.

The Pulse Doppler Polarimetric radars of some embodiments are configured in a manner to eliminate traditional components that contribute to the high system cost, the overall weight and the low reliability of the radars. In some embodiments, each radar includes a (1) a beam steering walking splash plate with positioning actuator(s), (2) a feed horn antenna with wave guide assembly, (3) a parabolic reflector, (4) radar electronic components, and (5) radome and mounting bracket(s) with optional configurations such as an integrated or stand-alone reflector. In some embodiments, each radar includes (1) a beam steering walking splash plate with positioning actuator(s), (2) printed circuit phase array antenna, (3) radar electronic components, and (4) radome and mounting bracket(s) with optional configurations.

The radar electronic components generate the transmitted signals and receive and interpret the return signals via the phase array antenna or waveguide. The antenna or feed horn illuminates the walking splash plate (via the parabolic reflector in embodiments using a feed horn) while the actuators position the splash plate to steer the radar's beam in the direction of interest. The system (in this embodiment) is designed to steer its beam 360° in azimuth and from 0° (horizontal) to approximately 45° in elevation. In some embodiments, the elevation angle of the walking splash plate is controlled using a set of differential gears in conjunction with the gears driving the azimuthal rotation.

Outgoing signals, in some embodiments, are modulated before being transmitted. In some embodiments, the modulation is used to distinguish signals sent (and received) from a first radar from signals sent (and received) from a second radar. In some embodiments, the modulation is amplitude modulation, while in others the modulation is frequency modulation. The modulated signal, in some embodiments, includes pseudorandom information or gold codes that can be used to identify a source radar.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

FIG. 4 illustrates two configurations with areas in which the radar power is increased due to multiple radar systems illuminating a same area.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a cellular radar system that includes a matrix of several radar cells within close proximity (e.g., separated by 100 miles or less). Each radar cell has one radar (e.g., at cell's center). In some embodiments, the viewing perimeters of the radar cells overlap, and the radar cells are interconnected in a full- or partial-telecommunication mesh with other radar cells in the matrix via any of the telecommunication mediums available. This approach allows each radar node in the mesh network to communicate and collaborate with one or more other radar nodes.

When a radar fails, due to the multiplicity of radar nodes, the neighboring radars are able to compensate and maintain the network's full operational integrity. Also, the overlap and interconnectivity enable each radar cell to view its own transmitted signal in a monostatic configuration, as well as view its neighboring cell's transmissions in a bistatic configuration. This approach captures multiple perspectives of any interesting atmospheric event. With both bistatic and monostatic configurations, the collection of data from multiple sources supports tomographic and/or holographic three-dimensional viewing of selected targets.

Because of the multiplicity of radars in a close-knit network, the cellular radar system of some embodiments provides views of radar reflections with very high resolutions (e.g., as fine as 5 foot increments) and at low altitudes (e.g., as low as the horizon as ground clutter permits). The system of some embodiments applies machine learning processes from data collected by the different radars to formulate weather predictions. The machine-learning processes in some embodiments include genetic algorithms that are used for predictive and linear predictive modeling. In some embodiments, this modeling provides weather prediction on a global level with a resolution as fine as a city block or less.

Figure 1A:
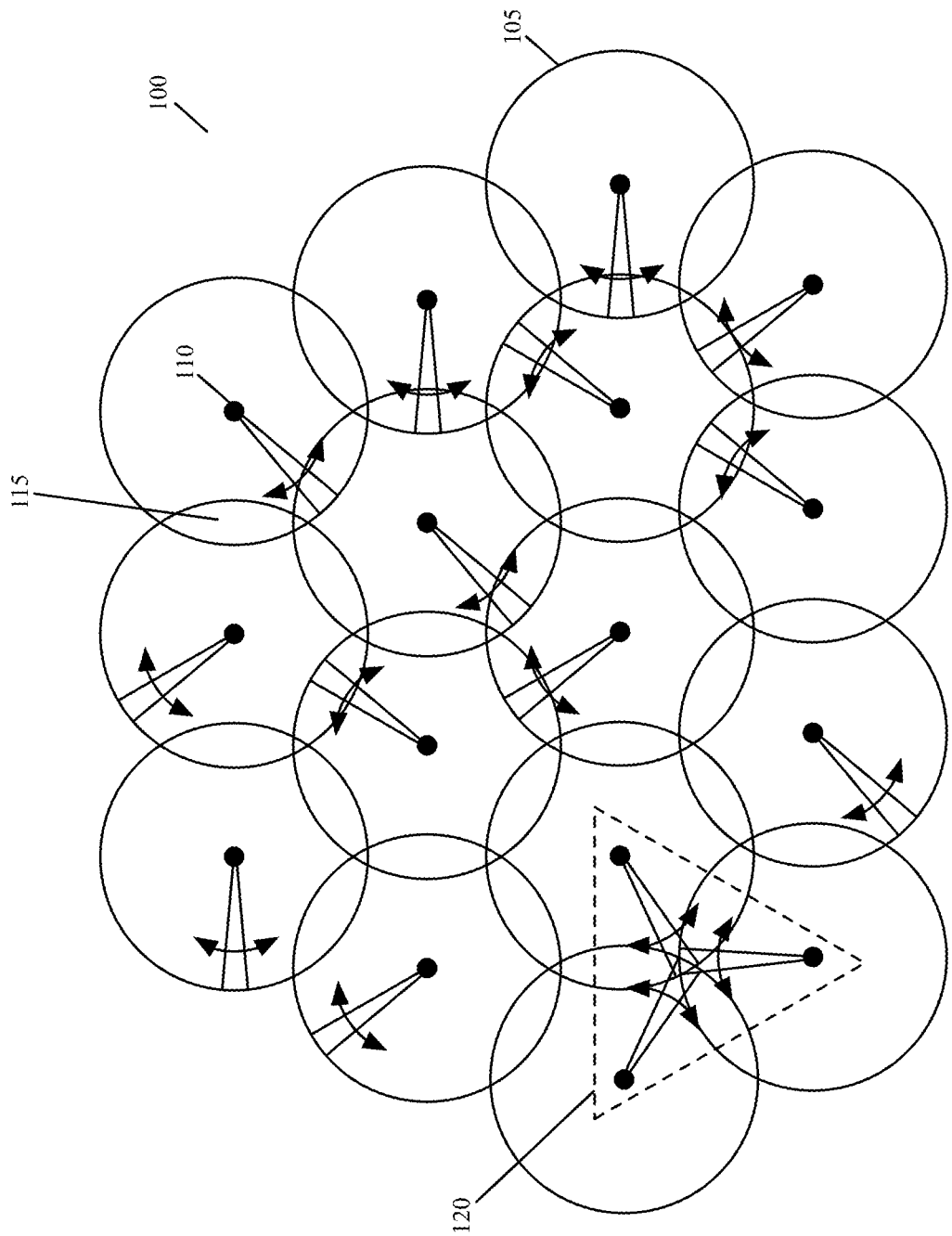
FIG. 1A illustrates an example of a cellular radar system of some embodiments.

FIG. 1A illustrates an example of the cellular radar system 100 of some embodiments. As shown, this system includes multiple radar cells 105 arranged in a matrix and placed in close proximity to each other (e.g., separated by 100 miles or less). In some embodiments, each radar cell has a radar 110 at cell's center and has a radius of about 10-50 miles (e.g., 18.78 miles). Also, in some embodiments, each radar cell has an approximately 3.5 degree beam width at 3 dB down (~50% of power at central frequency), but not necessarily limited to these numerical values. In some embodiments, individual radars 110 in array 100 are coordinated by a central controller (not shown) so that at least a subset of radars 110 are not scanning a same region at a same time, thus implementing a monostatic radar configuration in which each radar 110 receives reflections of its own outgoing radar signal. The central controller, in some embodiments, coordinates at least a subset of radars (e.g., subset 120) to collect bistatic radar data (radar data for signals not originating at the receiving radar) for a same region. In some embodiments, the individual radars 110 each send out a coded signal and/or the central controller coordinates a staggering of the pulses from each radar to differentiate the data collected from the different radars.

In the radar matrix 100, the radars 110 in neighboring radar cells 105 capture data for overlapping regions (e.g., region 115) as shown. As mentioned above, having multiple radars in close proximity capturing overlapping data provides better assessment of radar reflections. In some embodiments, this system can provide views of radar reflections with very high resolutions (e.g., as fine as 5 feet increments) and at low altitudes (e.g., as low as the horizon as ground clutter permits).

For instance, in some embodiments, the radars 110 have overlapping main beams at a nominal radius of 10 to 50 miles and at a nominal altitude of as low as 200 feet in order to monitor regional atmospheric constituents in high resolution within a typical area of a city block (e.g., 50-200 meters). This is in contrast to existing low-resolution radar systems that use main beam patterns with a nominal radius of 250 miles and at a nominal altitude of 70,000 feet due to the curvature of the earth.

In some embodiments, output data for regions such as region 115, for which multiple radars capture radar data is based on selected data captured by one of the multiple radars. In other embodiments, the output data for regions such as region 115, for which multiple radars capture radar data is based on the data captured by multiple radars (e.g., averaging or multidimensional reconstruction (tomographic or holographic)).

Figure 1B:
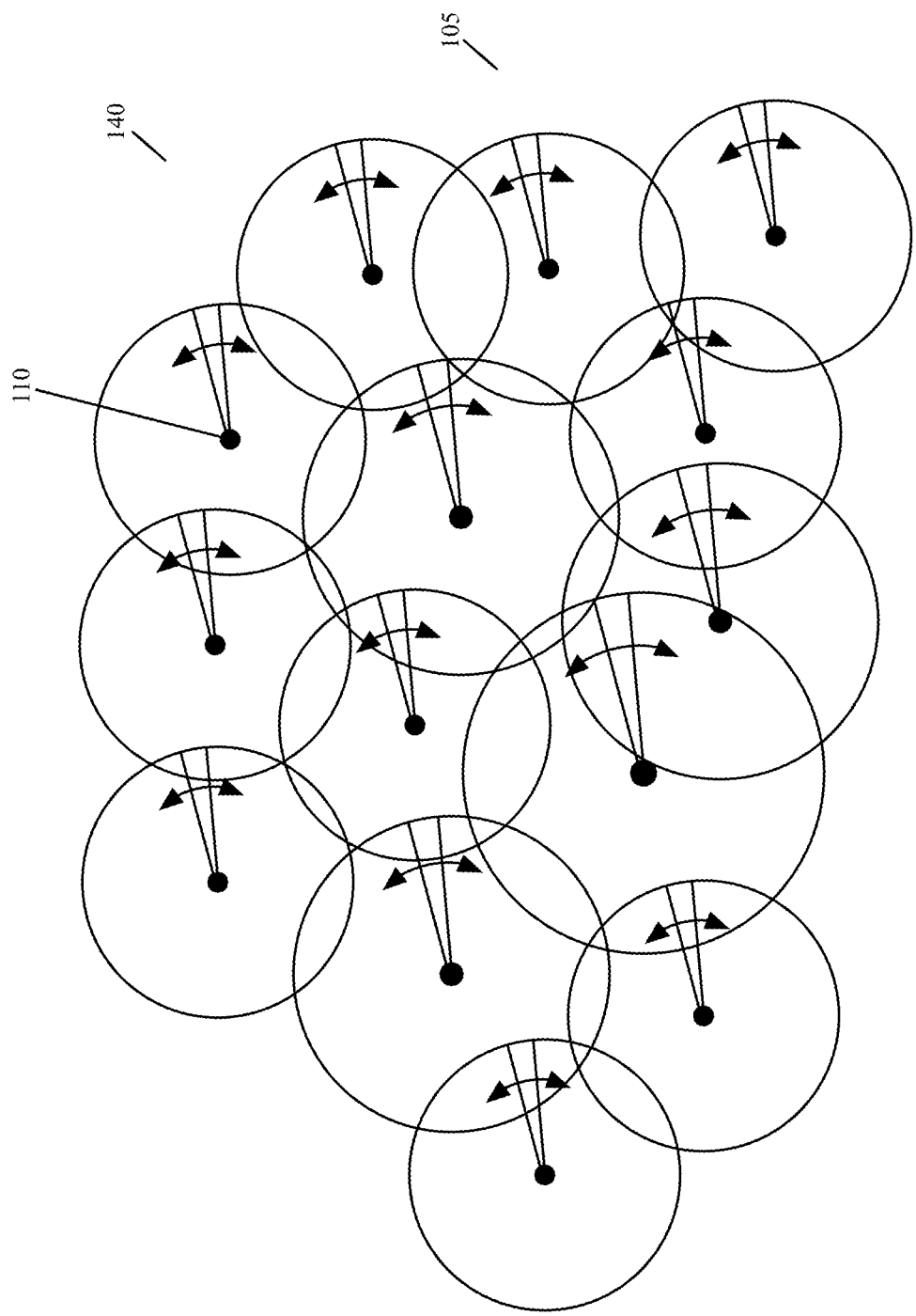
FIG. 1B illustrates an example of a cellular radar system of some embodiments using non-uniform spacing between radars.

FIG. 1B illustrates a similar system 140 as might be deployed in situations for which a regular matrix of radars 110 is not feasible (e.g., in a city with a limited selection of potential radar locations). In some embodiments, the scan region 105 of individual radars 110 is adjusted to cover more area when radars 110 are spaced farther apart. While the scan areas 105 as shown cover the entire region, in some embodiments the scan regions do not cover the entire region (e.g., small unpopulated regions are left uncovered), but if detailed data is required for the uncovered regions, a scan radius of one or multiple radars 110 is adjusted to cover the entire region. In some embodiments, the scan region of each radar (e.g., radius, range of azimuthal angle, and elevation) is controlled by a central controller that coordinates the scanning performed by the multiple radars 110 to collect desired data. As shown, all the radars are scanning a same azimuthal angle, however, one of ordinary skill in the art will appreciate that the central controller can control each radar separately to collect data at any given azimuthal and elevation angle so as to provide desired data.

The radars 110 can be set to perform a number of different scan types. For instance, radars 110 can perform (1) a plan position indicator (PPI) scan in which the azimuthal angle is adjusted through an entire revolution (0-360°) while incrementing the elevation (e.g., after each revolution or continuously) to cover a range of elevations (e.g., 0-45° at 3° intervals), (2) a range height indicator scan that scans through elevations and then increments azimuthal angle to cover a desired range, (3) a sector scan that scans a sector defined in terms of limits of azimuthal and elevation angle (e.g. from 35-100° azimuth and 10-45° elevation), or (4) a spot scan that collects data at a defined azimuth angle and elevation. With the small size and mass of the radars 110, the azimuthal and elevation angles can be adjusted very quickly (e.g., rastering through 180° azimuth and 30° elevation in 3° increments in 10's of seconds) compared to the larger radar installations (e.g., a similar scan might take tens of minutes).

Figure 2:
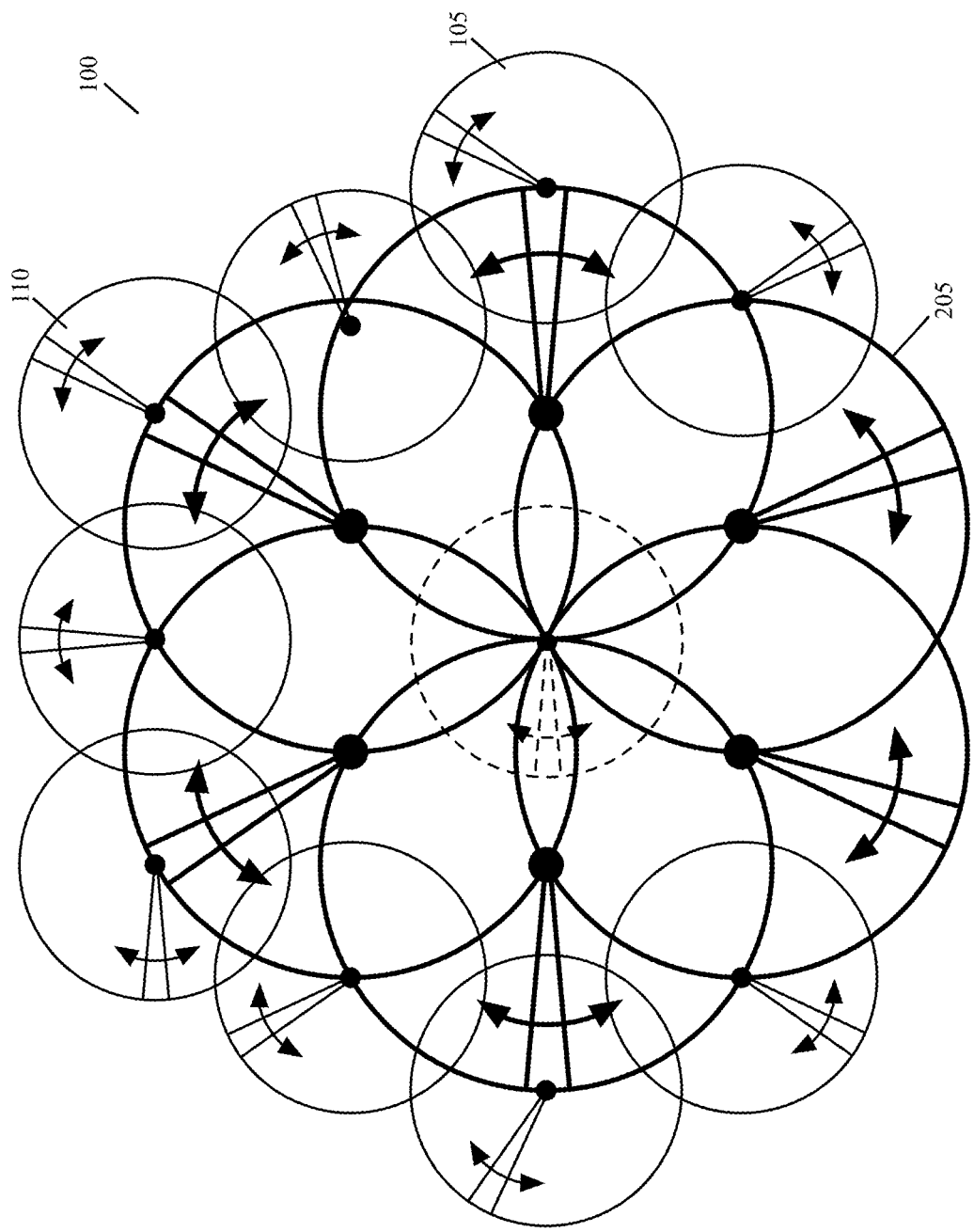
FIG. 2 illustrates an example of a system after a particular radar has failed and a central controller has adjusted the range of the surrounding radars to compensate.

FIG. 2 illustrates system 100 after a particular radar 110 has failed (indicated by dotted lines) and a central controller has adjusted the range of the surrounding radars to compensate (i.e., to fully cover the region). As shown, the radars 110 adjacent to the failed radar 110 have increased their scan region 205 to cover a radius approximately 1.66 times their original radius, thus covering the entire region originally covered by the system 100. In this way, the radar array can be said to be self-healing (i.e., able to compensate for failed radars in the radar array/cellular radar network). In some embodiments, the increased range is accomplished by increasing the power output of the radar. In other embodiments, the range is increased by adjusting the time that the system captures data for returning radar signals (e.g., increasing a time for data capture from 100 microseconds to 200 microseconds, effectively doubling the range). In some embodiments, a combination of increasing signal strength and increasing data capture time is used to ensure that signals reflected from targets farther away are powerful enough to be detected.

Figure 3:
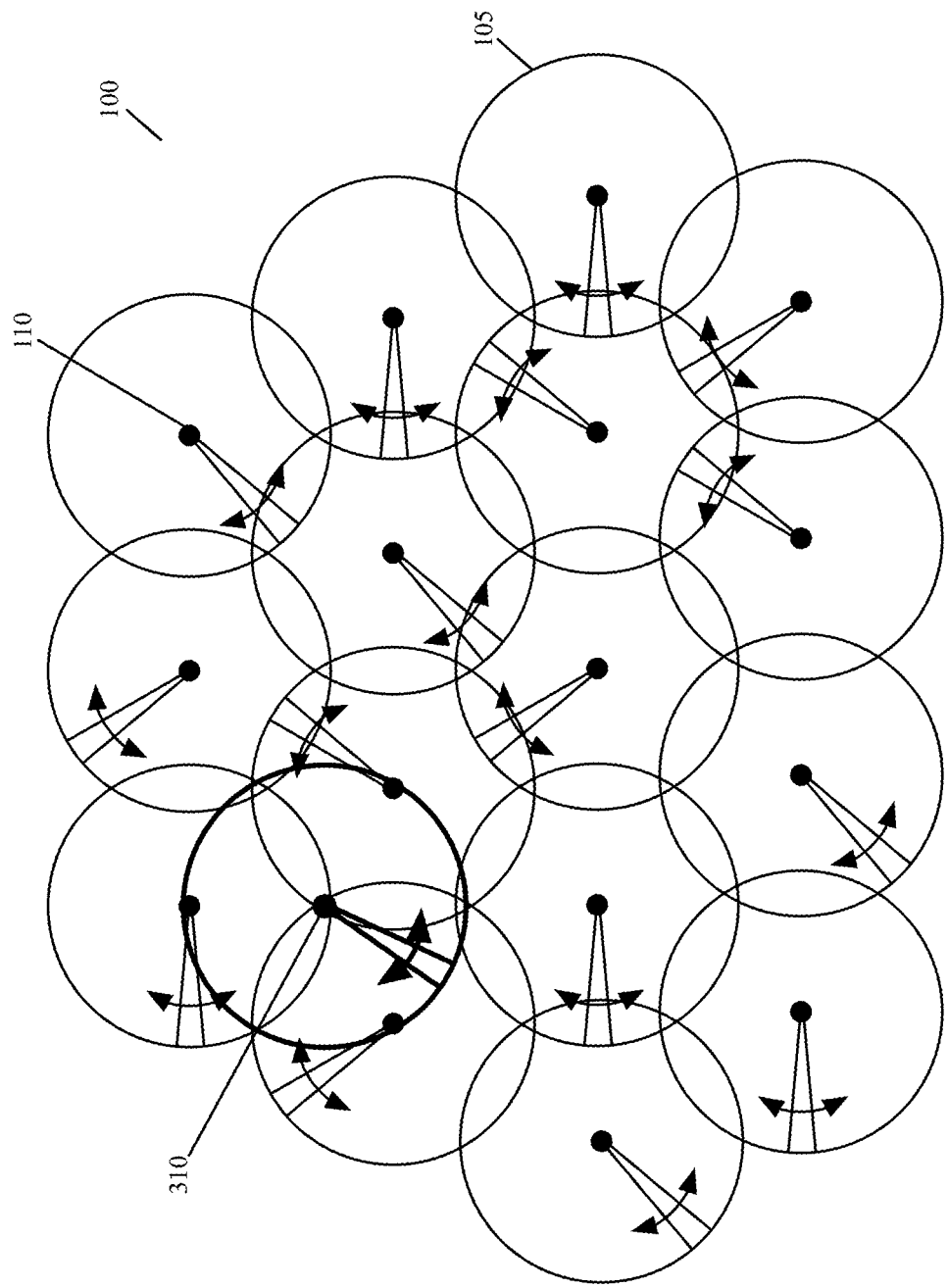
FIG. 3 illustrates a cellular radar system with the addition of a fully redundant radar that covers an area that is fully overlapping with existing radars.

FIG. 3 illustrates system 100 with the addition of a fully redundant radar 310 that covers an area that is fully overlapping with existing radars 110. A fully redundant radar such as radar 310 provides additional data for the overlapping scanned regions that can be used to produce more detailed data sets for the scanned region including tomographic or holographic data. Additionally, fully redundant radars reduce the likelihood of a particular region being left without coverage as more radars are required to fail before a given region is out of range of all radars.

FIG. 4 illustrates two configurations 410 and 420 with areas 430 and 440 in which the radar power is increased due to multiple radar systems illuminating a same area. As shown, configuration 410 includes 4 radars 110 that have scan regions that overlap in area 430. Configuration 420 includes 3 radars 110 (as in FIGS. 1 and 3) With multiple radars 110 illuminating a same area, the power of the signal, in some embodiments, increases by a factor of 3-4.5 dB (~2-3 times the power). An increase in the power by a factor of 2-3, in some embodiments, allows for the detection of targets (e.g., a fine mist) for which the returning signal might otherwise be obscured by the noise associated with the signal. Additionally, as for embodiments discussed above, looking at a particular region from multiple angles allows for greater resolution and prevents smearing effects present from current systems that view particular regions from a single angle. Additional information, in some embodiments, can also be constructed from the multiple views to provide tomographic or holographic information. In some embodiments, the additional information is able to be captured based on controlling the coherence and angle of the transmitted radar.

Figure 5:
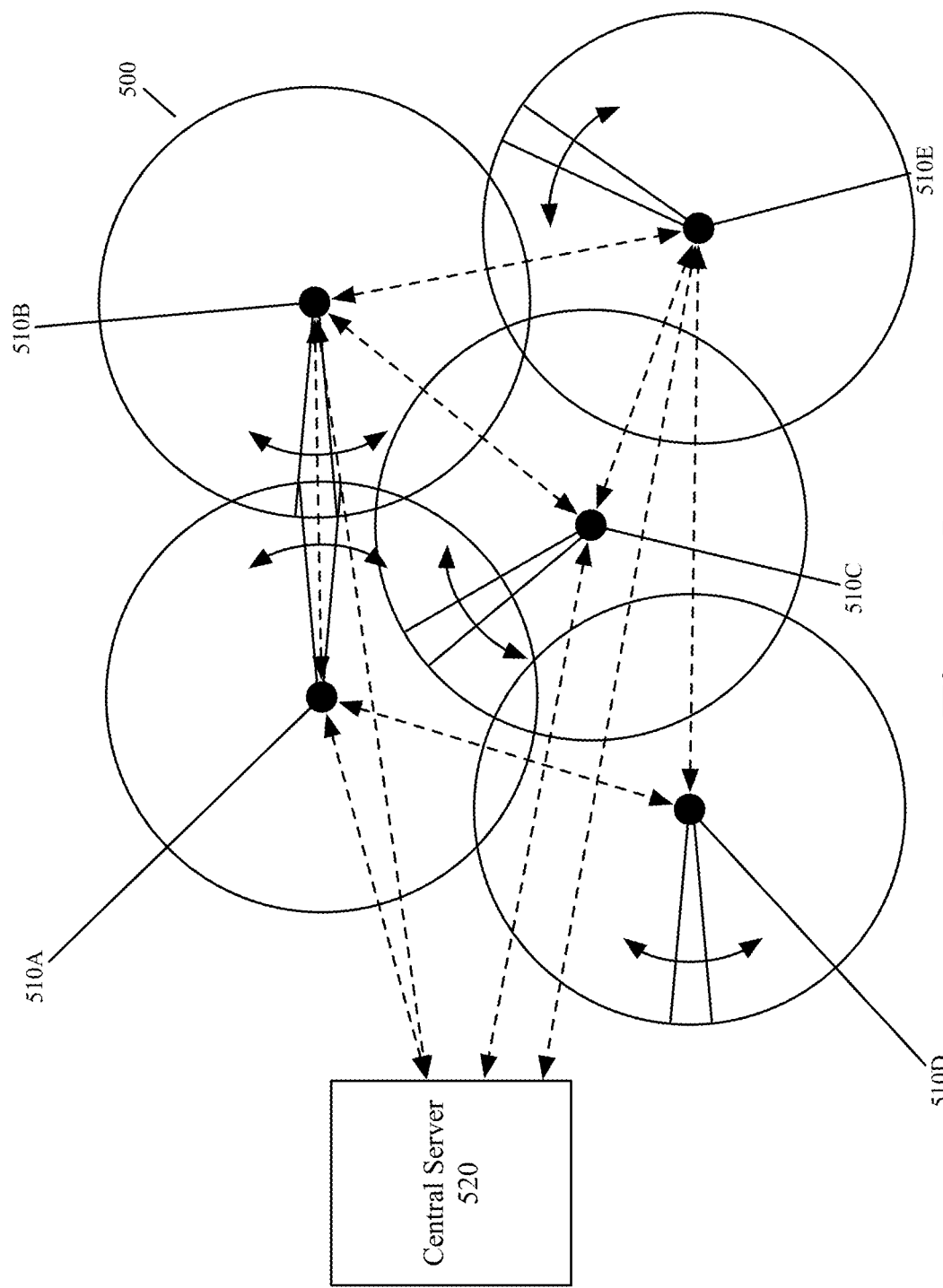
FIG. 5 illustrates a set of radars and a central server that are interconnected via one or more common telecommunication mediums.

FIG. 5 illustrates a set of radars 510 and a central server 520 that are interconnected via one or more common telecommunication mediums (e.g., wireless ethernet, wired ethernet, radar-to-radar pulse modulation, etc.). Multiple telecommunication mediums, in some embodiments, are used between pairs of interconnected elements. In some embodiments, this interconnection is a full mesh interconnection that connects each radar to every other radar in the matrix and to the central server 520 (i.e., radars 510B, 510C, and 510E), while in other embodiments the radars or the central server are connected to only a subset of the other radars (e.g., radars 510A and 510D are connected in full mesh to each other, but not to central server 520, radars 510A-C are connected to each other in a partial mesh but fully connected to central server 520). In some embodiments, the radars use radar signals that are sent from one radar and received at another radar to communicate (e.g., radars 510A and 510B are facing each other to directly communicate using radar signals). The connections between radars 510, in some embodiments, are used to allow for direct communication between radars such that if a particular radar's connection to central server 520 is interrupted, it can send captured data to the central server through its connection to a radar 510 that remains connected to the central server 520. Central server 520, in some embodiments, is a set of servers that together perform the operations described for central server 520.

In some embodiments, each radar is a node in the mesh network that communicates and collaborates with one or more other radars (e.g., with each of the other radars) via multiple communication paths, as well as radar-to-radar pulse modulation. When a radar fails, due to the multiplicity of radar nodes, the neighboring radars are able to compensate and maintain the network's full operational integrity. Also, the overlap and interconnectivity enable each radar to view its own transmitted signal in a monostatic configuration, as well as view its neighboring radar's transmissions in a bistatic configuration (e.g., radar pairs in radar set 120 of FIG. 1A). This approach captures multiple perspectives of any interesting atmospheric event.

Figure 6:
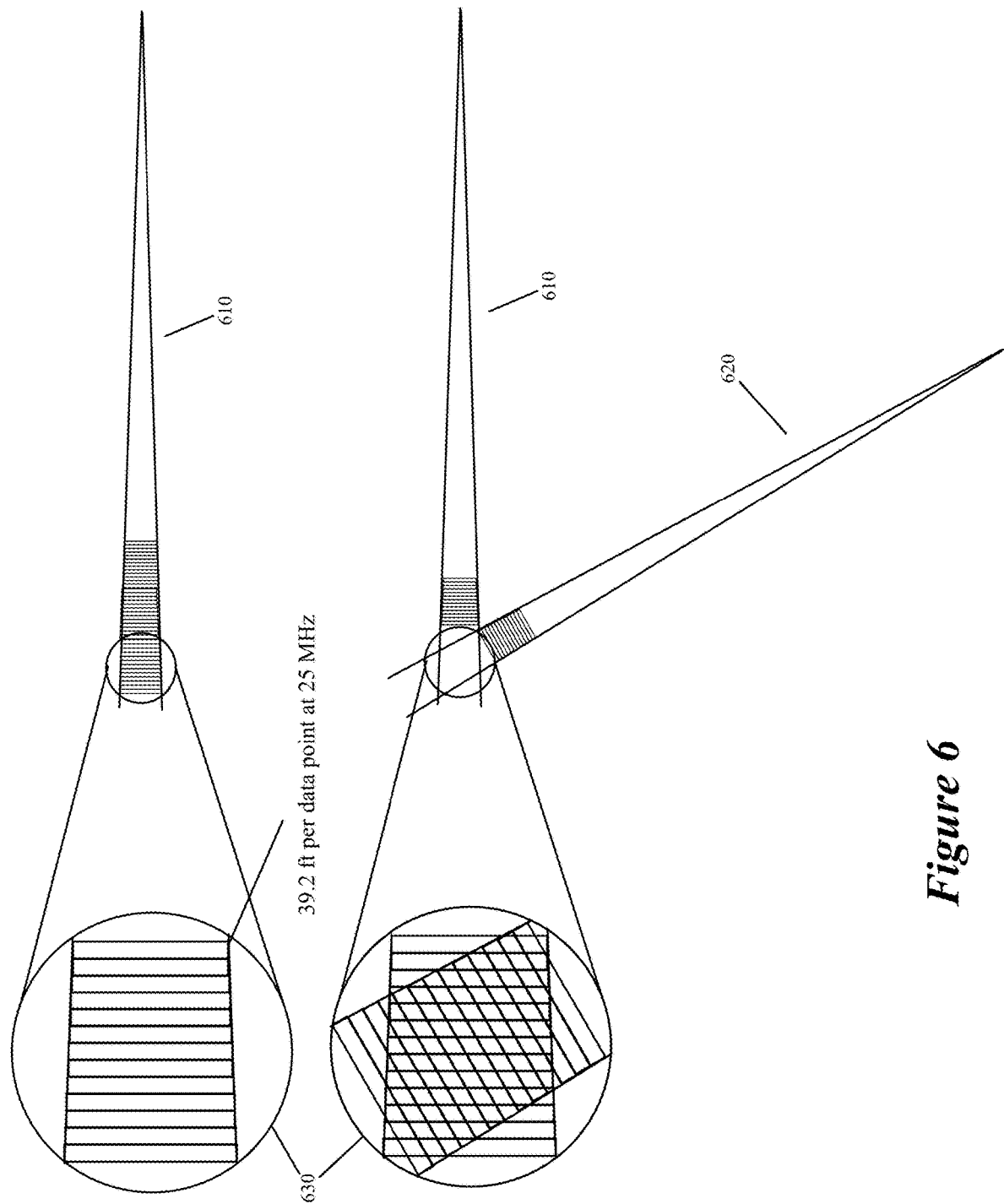
FIG. 6 illustrates data collected in a first region scanned by a single radar signal and a similar region scanned by two radar signals.

FIG. 6 illustrates data collected in a first region scanned by a single radar signal 610 and a similar region scanned by two radar signals 610 and 620. With both bistatic and monostatic configurations, the collection of data at the central server from multiple sources supports tomographic and/or holographic three-dimensional viewing of selected targets. Because of the multiplicity of radars in a close-knit network, the cellular radar system of some embodiments provides high-resolution, low altitude views of radar targets (objects in the signal path that have a radar cross section). In some embodiments, each radar sends modulated carrier inter-nodal communication to one or more of the neighboring radars. For instance, in some embodiments, each radar embeds information on its radar pulse in order to allow neighboring radars to coordinate individual beam sweeps for bistatic operation. In other embodiments, such coordination is performed by the central server.

Figure 7:
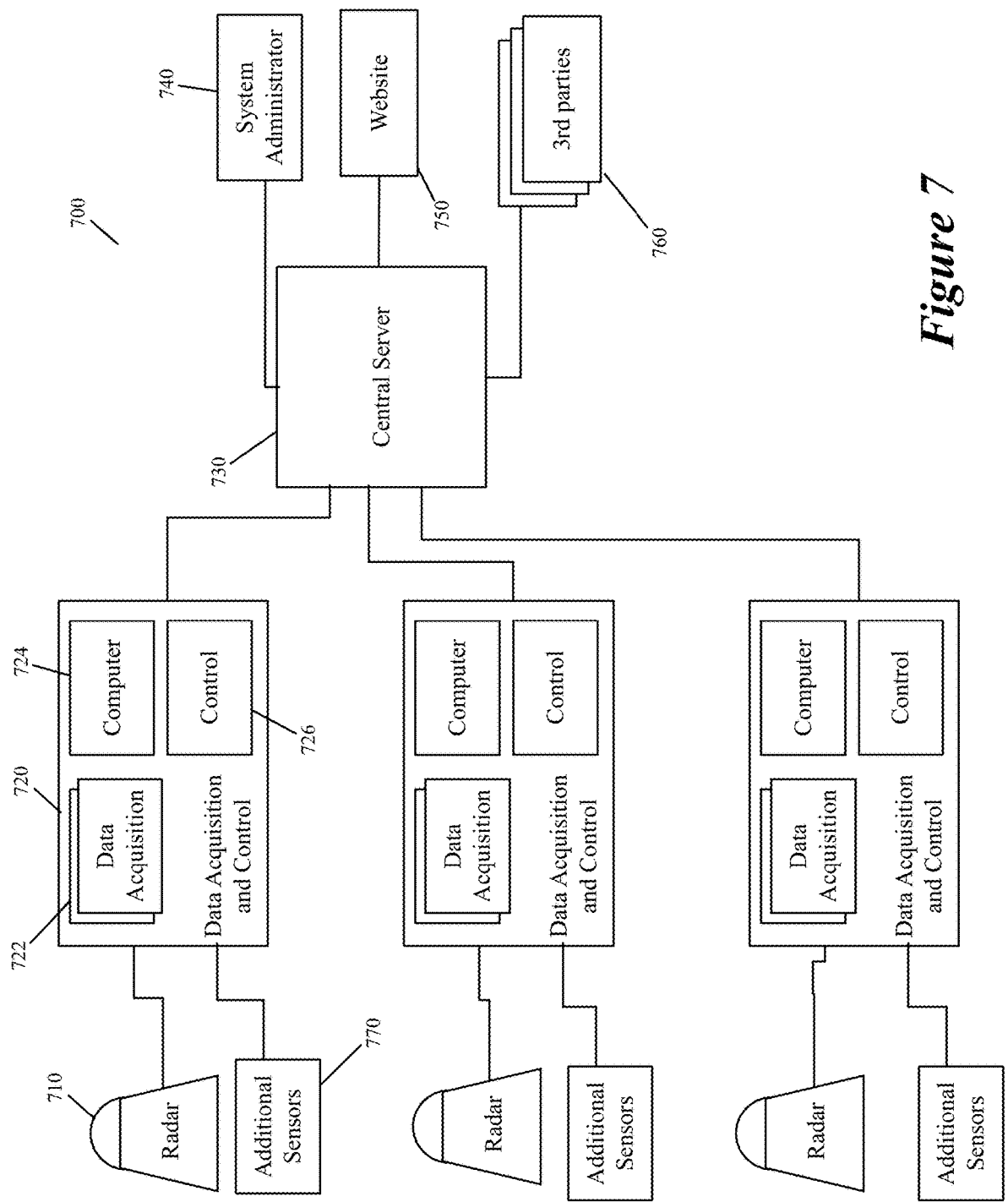
FIG. 7 illustrates components of a cellular radar network embodiment.

FIG. 7 illustrates components of a cellular radar network embodiment 700. The cellular radar network 700 includes radars 710, data acquisition and control modules 720, additional sensors 770, and central server 730 which is in communication with system administrator 740, website 750, and $3^{rd}$ parties 760. Data acquisition and control module 720, includes data acquisition module set 722 (e.g., a set of data acquisition modules receiving output data from radar 710 (e.g., an analog to digital converter) and additional sensors 770), computer 724 (e.g., a Raspberry Pi), and control module 726. Radar 710 and data acquisition and control module 720 are described in more detail below.

Additional sensors 770, in some embodiments, include sensors to detect or measure temperature, humidity, pressure, wind speed and direction, earthquakes, tilt, LORAN, shortwave transmissions, AM radio emergency broadcasts, military broadcasts, lightning detection, gas, meteor communications, TV transmissions, FM broadcasts, aviation communications, maritime communications, military communications, direction finding, spectrum surveillance, automatic dependent surveillance-broadcast (ADS-B), cell tower (multiple bands), WiFi, internet connectivity, S band weather radar, spread spectrum radios, K band weather radar, Ka band weather radar, radiometry, military radar, FAA radar, peer to peer internet (between individual radars), broadcast internet, satellite communications, spectral imaging, infrared imaging, visible imaging, and hyper spectral imaging.

In some embodiments, each radar 710 is a low-cost Pulse Doppler Polarimetric radar that collects data used to discern the composition, intensity, and direction of atmospheric constituents. The system of some embodiments applies machine learning processes discussed below from data collected by the different radars to identify current weather conditions and formulate weather predictions. The machine-learning processes in some embodiments include genetic algorithms that are used for predictive and linear predictive modeling. In some embodiments, this modeling provides weather predictions on a local level with extremely high resolution (e.g., between 1-50 meters). The generated weather model in some embodiments includes high-resolution renderings of localized, real-time atmospheric trends that can be displayed over maps (e.g., maps displaying routes being traversed by mobile devices).

Central server 730, in some embodiments, collects data from all the radars and additional sensors to determine existing weather conditions including, for example, the types of particles present and the speed at which they are moving. Central server 730, in some embodiments, also provides weather prediction based on the collected data. As described briefly above, in some embodiments, the central server applies the machine learning processes to the data collected from the radars 710 to determine and predict the weather. In some embodiments, the output from the machine learning or other analysis is provided to a website 750 (e.g., a weather service website) or to third parties 760 to use to provide their own services or perform their own analysis. The output data, in some embodiments is provided to be displayed as overlay information by a mapping or routing program.

Figure 8:
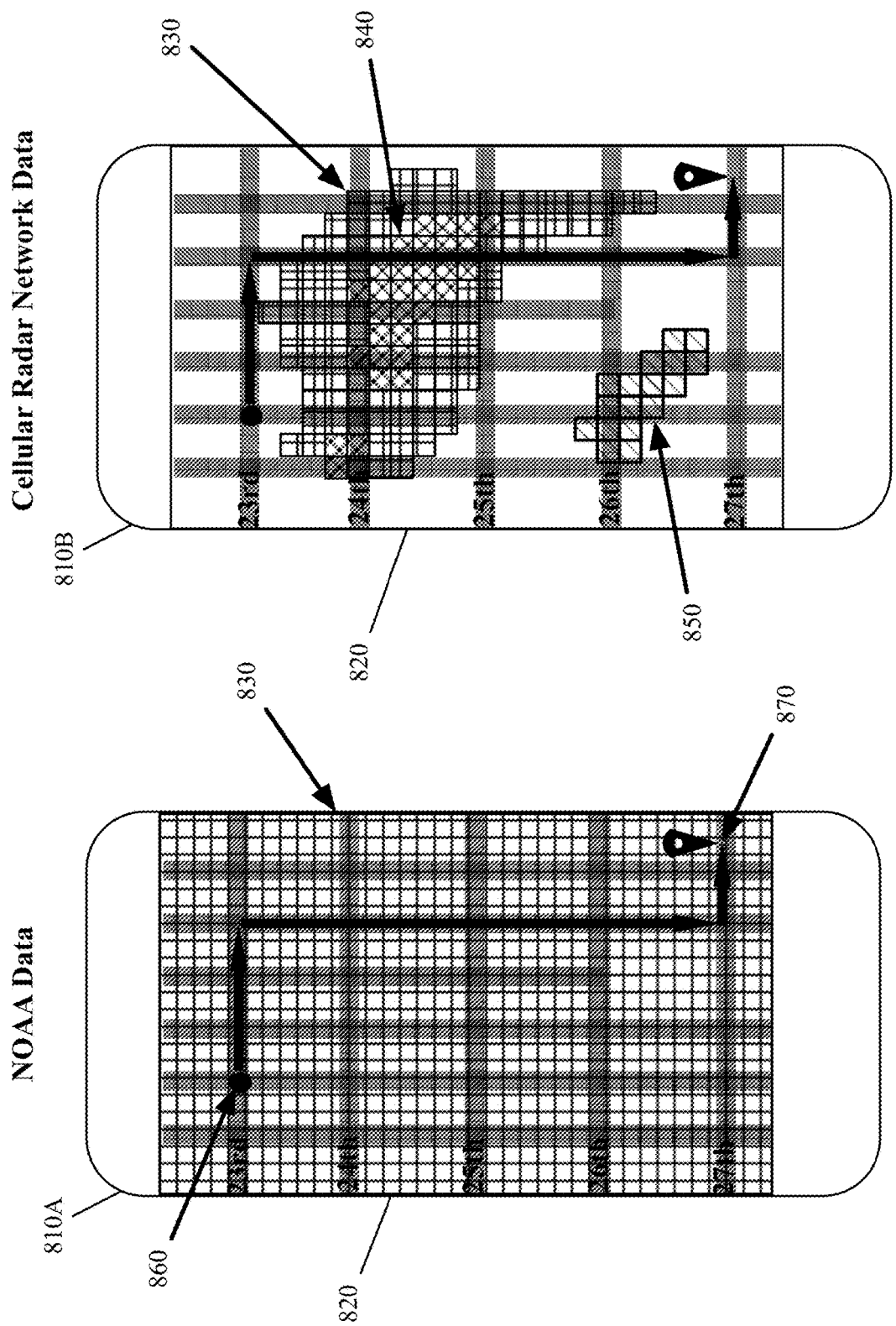
FIG. 8 illustrates a mobile device displaying a mapping and routing program display that displays weather data based on National Oceanic and Atmospheric Administration (NOAA) weather data and a similar mobile device displaying a mapping and routing program display that displays weather data based on the cellular radar network data.

FIG. 8 illustrates a mobile device 810A displaying a mapping and routing program display 820 that displays weather data based on National Oceanic and Atmospheric Administration (NOAA) weather data and a similar mobile device 810B displaying a mapping and routing program display 820 that displays weather data based on the cellular radar network data. Mapping and routing display 820 is depicted here providing a route from current location 860 to destination 870. Mobile device 810A illustrates that the NOAA data includes a single type of identified weather 830 (e.g., rain, snow, etc.) and that the individual pixel covers the entire viewed area comprising several city blocks. Mobile device 810B illustrates that the cellular radar network provides additional details. For example, mobile device 5010B displays three different types of weather 830, 840, and 850 which in some embodiments are different weather conditions (e.g., snow 830, hail 840, and sleet 850). In some other embodiments, the different identified conditions relate to intensity as well as type of weather condition, e.g., areas 830 and 840 represent lighter and harder rain while 850 represents one of snow or an even lighter rain. The cellular radar network data in some embodiments provides data at extremely high resolution (e.g., between 1 and 50 meters). In some embodiments, the resolution provided by each individual radar is increased by combining data from multiple radars and, in some cases, by machine learning processes.

Figure 9A:
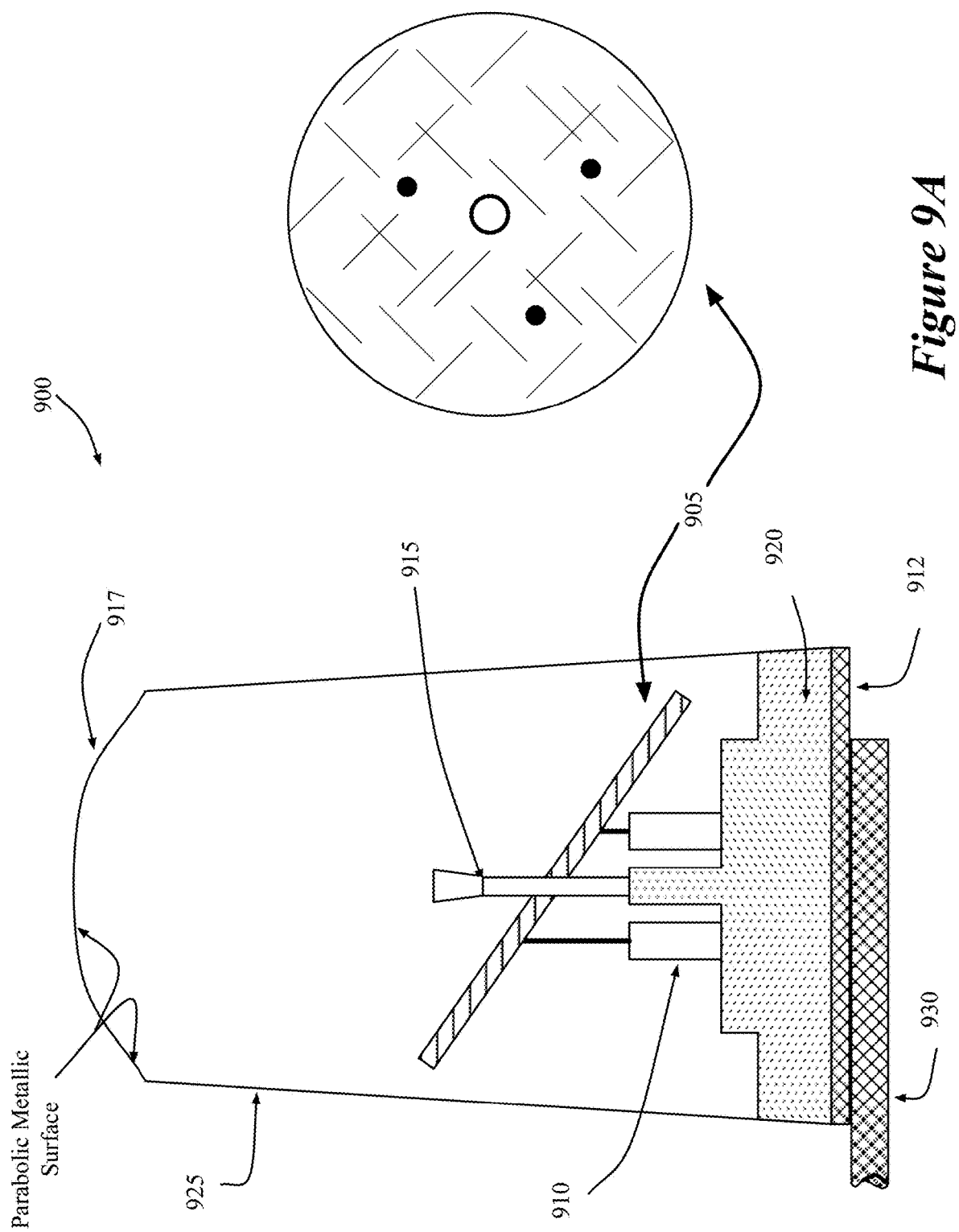
FIG. 9A illustrates a low-cost radar of some embodiments.

The Pulse Doppler Polarimetric radars of some embodiments are configured in a manner to eliminate traditional components that contribute to high system cost, overall weight and low reliability. For example, as will become clear below, slip rings and rotary joints which require frequent maintenance are not required in the embodiments described below. FIG. 9A illustrates a low-cost radar 900 of some embodiments. As shown, the radar 900 of this figure includes (1) a beam steering walking splash plate 905 with positioning actuators 910 placed on top of a base plate 912, (2) a waveguide and feed horn assembly 915, (3) parabolic reflector 917, (4) radar electronic and waveguide components 920, (5) a radome 925 and (6) mounting brackets 930. In addition, because the feed horn assembly 915 points to the sky, the background radar signal from the sky that leaks around the parabolic reflector contributes much less noise to the received radar signal than traditional radars that get background noise from terrestrial objects (e.g., ground, buildings, etc.) at a much higher temperature.

The radome 925 is a structural, weatherproof enclosure that protects the feed antenna assembly 915, positioning actuators 910, beam steering splash plate 905, and associated electronics 920 as well as being the substrate and support for the parabolic reflector 917 composed of a metallized interior surface of the "top cap" area. With the exception of the metallized parabolic surface, the remaining area of radome 925 is made of a low loss material that does not inhibit the passing of electromagnetic signals used in this embodiment. The radar electronic components 920 generate the transmit signals, and receives and records the return signals, via the beam steering walking splash plate 905, parabolic reflector 917, feed horn and waveguide assembly 915, and radar electronic components 920. In some embodiments, the feed antenna is a circular waveguide with a diameter of approximately 3 cm. In other embodiments, the feed antenna is a dielectric rod or dielectrically loaded or air dielectric horn type antenna. In other embodiments, the feed antenna has a different structure.

The feed horn assembly 915 illuminates the parabolic metallic surface 917 of the interior "top cap" area of the radome 925, which in turn illuminates the walking splash plate 905 that steers the beam direction through the side of the radome 925 determined by the positions of actuators 910. In some embodiments, feed horn assembly 915 and parabolic metal surface 917 are designed such that feed horn assembly 915 is placed at the focal point of parabolic reflector 917 and the illumination of parabolic reflector 917 by feed horn assembly 915 results in a collimated signal reaching the splash plate 905. In the reverse direction, reflected signals returning to the splash plate 905 are focused by parabolic reflector 917 on feed horn assembly 915 and passed to the radar electronic and waveguide components 920.

In some embodiments, the splash plate 905 has a center opening for passing through the feed antenna waveguide. The splash plate 905 in some embodiments is a nominal ¼" to ½" thick aluminum honeycomb panel covered with an aluminum skin of a nominal ¹⁄₃₂" thick creating a rigid, flat, lightweight, low distortion, efficient reflective surface. In some embodiments, the splash plate 905 is also curved so as to further focus the radar signal. The actuators 910 position the splash plate 905 to steer the radar's beam in the direction of interest. In some embodiments, the radar 900 is designed to steer its beam 360° in azimuth and from 0° (horizontal) to 45° in elevation. The actuators 910, in some embodiments, are driven by a differential gear that allows the elevation to change independently of the azimuthal angle.

Figure 9B:
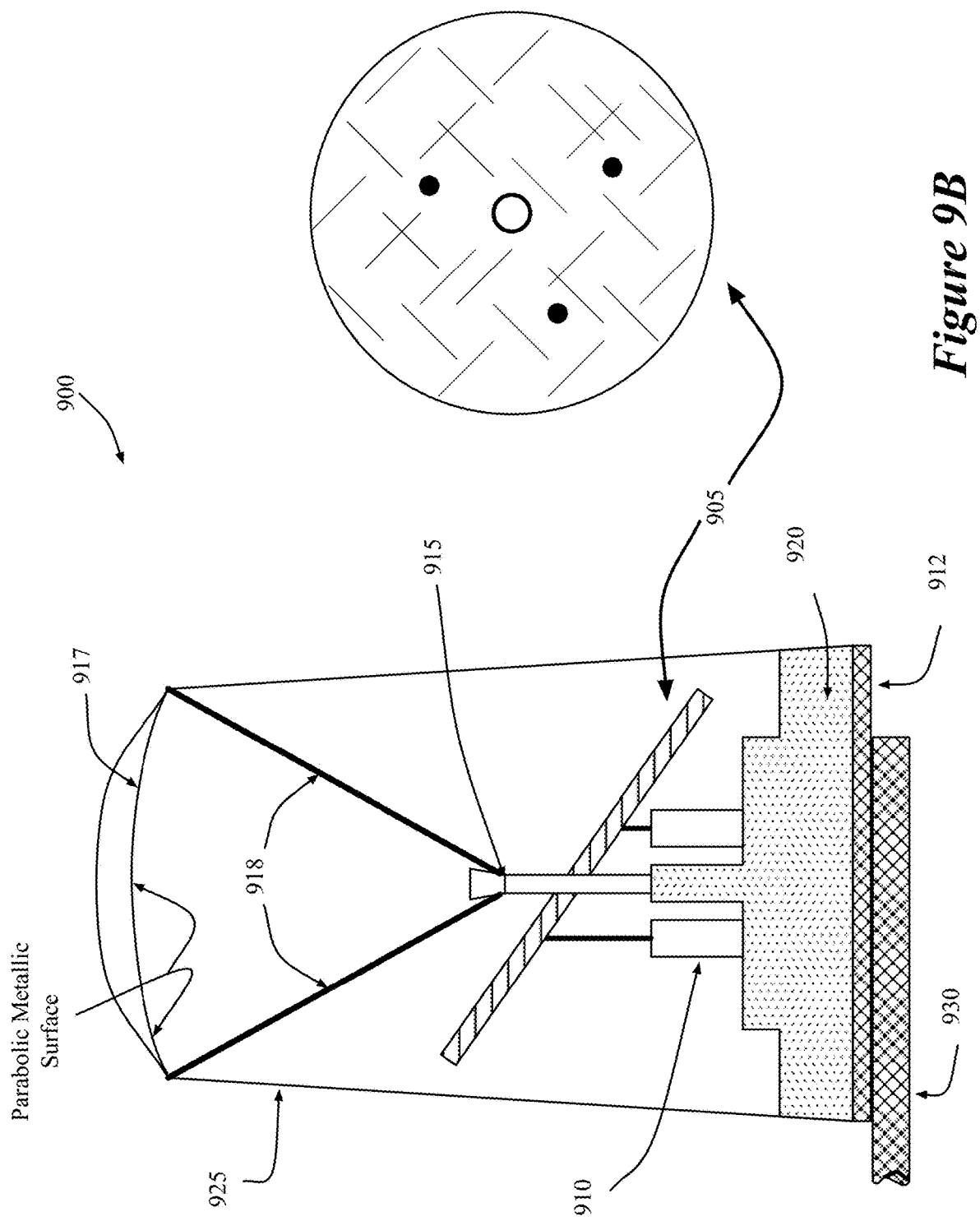
FIG. 9B illustrates another low-cost radar of some embodiments.

FIG. 9B illustrates another low-cost radar 900 of some embodiments. As shown, the radar 900 of this figure includes (1) a beam steering walking splash plate 905 with positioning actuators 910 placed on top of a base plate 912, (2) a waveguide and feed horn assembly 915, (3) parabolic reflector 917 supported by rods 918, (4) radar electronic and waveguide components 920, (5) a radome 925 and (6) mounting brackets 930.

Again, the radome 925 is a structural, weatherproof enclosure that protects the feed antenna assembly 915, positioning actuators 910, beam steering splash plate 905, parabolic reflector 917, and associated electronics and waveguide components 920, however, as opposed to the embodiment of FIG. 9A, the radome is not the substrate and support for the parabolic reflector 917, rather it is merely a structural, weatherproof enclosure made of a low loss material that does not inhibit the passing of electromagnetic signals used in this embodiment.

Figure 10A:
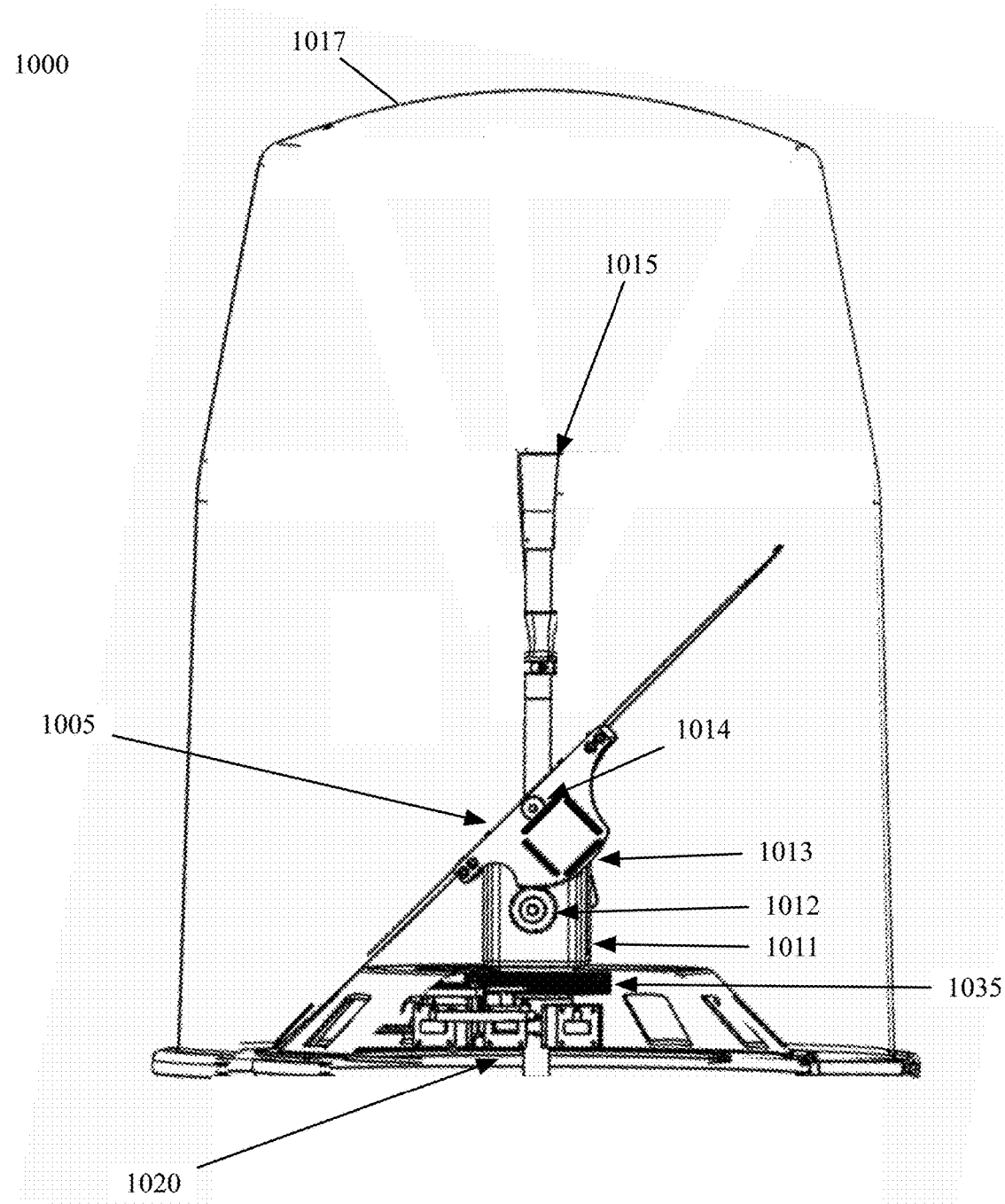
FIG. 10A provides further illustration of an embodiment similar to that illustrated in FIG. 9A.

FIG. 10A provides further illustration of an embodiment similar to that illustrated in FIG. 9A. Elements of FIG. 10A are similarly numbered as in FIG. 9A, however, more details are provided regarding the actuators 1010, radar waveguide components 1020, and radar electronic components 1035. As shown beam steering splash plate 1005 sits atop a rotating support structure 1011 that includes gear 1012 driving gear (or pinion) 1013 that causes splash plate 1005 to rotate around axis 1014. Gear 1012, in some embodiments, is driven by a differential gear. For example, gear 1012 is stationary relative to support structure 1011 as support structure 1011 rotates (i.e., is driven by a first motor) unless a second gear also connected to the differential gear is driven by an elevation control motor (not shown). The use of stationary waveguide components and simple mechanical structures to drive the beam directionality allow the system to avoid using slip rings and rotary joints in the radar system. Further details of the radar waveguide and electronic components 1020 and 1035 that allow for the avoidance of slip rings and rotary joints are provided in FIGS. 11, 12, and 14. The computing and electronic components of the radar system, in some embodiments, are placed above the waveguide components 1120 within the base of the radar, while in other embodiments, the electronic and computer components are housed in the radar below the waveguide components 1120.

Figure 10B:
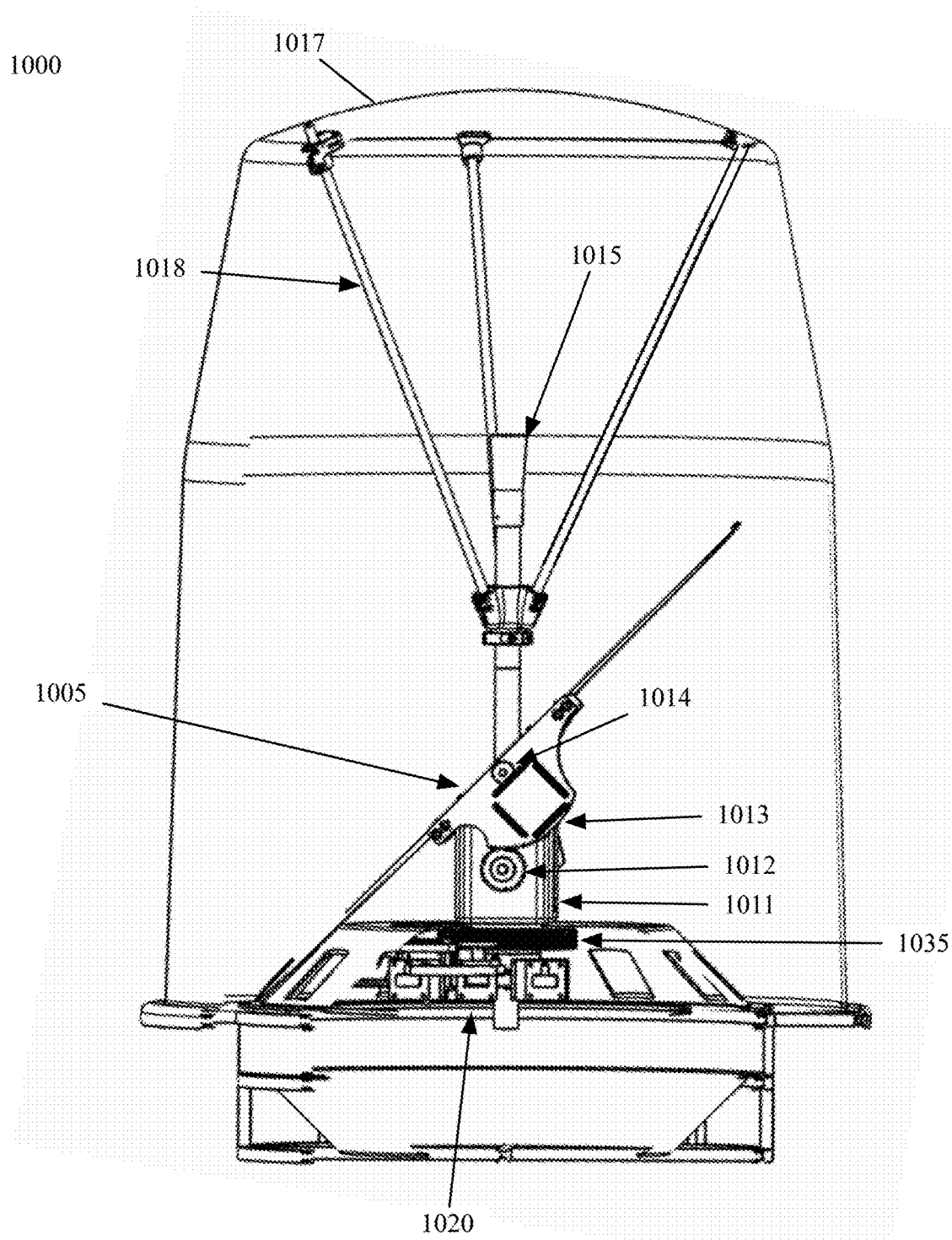
FIG. 10B provides further illustration of an embodiment similar to that illustrated in FIG. 9B.

FIG. 10B provides further illustration of an embodiment similar to that illustrated in FIG. 9B. Elements of FIG. 10B are similarly numbered as in FIG. 9B, however, more details are provided regarding the actuators 1010, radar waveguide components 1020, and radar electronic components 1035. As shown beam steering splash plate 1005 sits atop a rotating support structure 1011 that includes gear 1012 driving gear (or pinion) 1013 that causes splash plate 1005 to rotate around axis 1014. Gear 1012, in some embodiments, is driven by a differential gear. For example, gear 1012 is stationary relative to support structure 1011 as support structure 1011 rotates (i.e., is driven by a first motor) unless a second gear also connected to the differential gear is driven by an elevation control motor (not shown). The use of stationary waveguide components and simple mechanical structures to drive the beam directionality allow the system to avoid using slip rings and rotary joints in the radar system. Further details of the radar waveguide and electronic components 1020 and 1035 that allow for the avoidance of slip rings and rotary joints are provided in FIGS. 11, 12, and 14. The computing and electronic components of the radar system, in some embodiments, are placed above the waveguide components 1120 within the base of the radar, while in other embodiments, the electronic and computer components are housed in the radar below the waveguide components 1120. In some embodiments, the radar electronic components 1035 include a trigger board that controls the triggering and timing of the radar emission and a positioner control board for steering the splash plate 1005.

Figure 11:
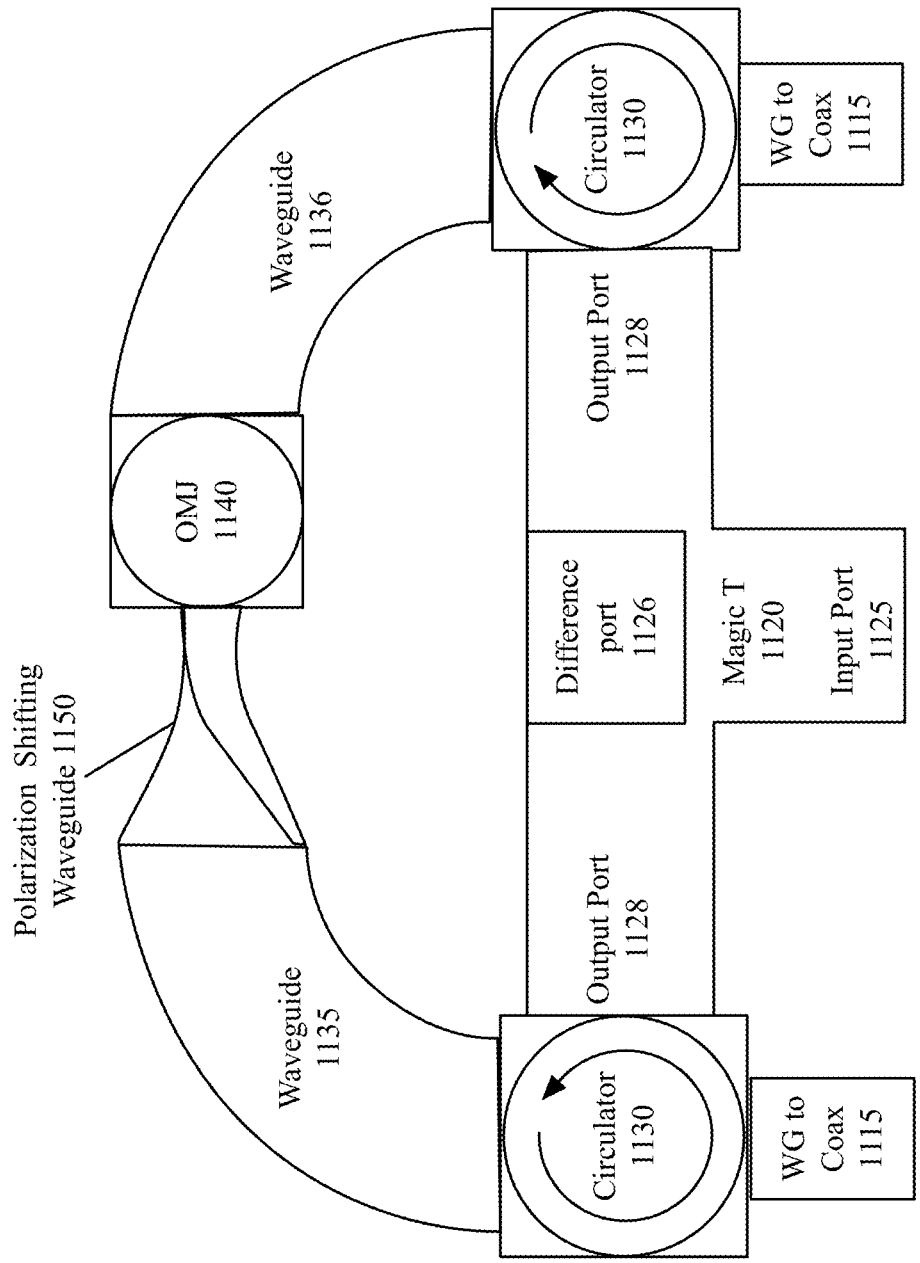
FIG. 11 illustrates components of a waveguide assembly that is included in some embodiments of radar electronic and waveguide components.

FIG. 11 illustrates components of a waveguide assembly that is included in some embodiments of radar electronic and waveguide components 920. FIG. 11 illustrates magic T junction 1120, Circulators 1130, waveguides 1135 and 1136, polarization shifting waveguide 1150, and ortho-mode junction (OMJ) 1140 (also referred to as ortho mode transducer (OMT)). Magic T 1120 includes input (sum) port 1125 and output ports 1128 that connect respectively to a transmitter (not shown) and circulators 1130. An additional output (difference) port 1126 in some embodiments is a port coming out of the plane of the paper used to balance the impedance of the arms of the magic T or is connected to an additional sensor to collect additional data. The generated signal from the transmitter is transmitted to magic T junction 1120 that will split the generated signal between two arms of the waveguide. In some embodiments, the magic T junction 1120 is an H-plane T that splits the signal received at input (sum) port 1125 between the two arms with no change in phase and outputs the split signal to each circulator 1130.

Circulators 1130 with circulation direction indicated by the arrow receive the transmitted signals from output ports 1128 and provide them to waveguides 1135 and 1136. In some embodiments, a change in phase (e.g., 90 degrees of phase shift) between the signals propagating down the two arms) is introduced at one or both circulators 1130. The signal propagating through waveguide 1135 then passes through polarization shifting waveguide 1150 which is a physically twisted waveguide that converts the horizontally polarized incoming signal into a vertically polarized signal by the time it reaches the OMJ 1140. OMJ 1140 combines orthogonally polarized signals and is sent out (in a direction that would be normal to the plane of the page), in some embodiments, through a circular waveguide and feed horn assembly that allows for both polarizations (horizontal and vertical) to propagate and illuminate the parabolic reflector.

Figure 12:
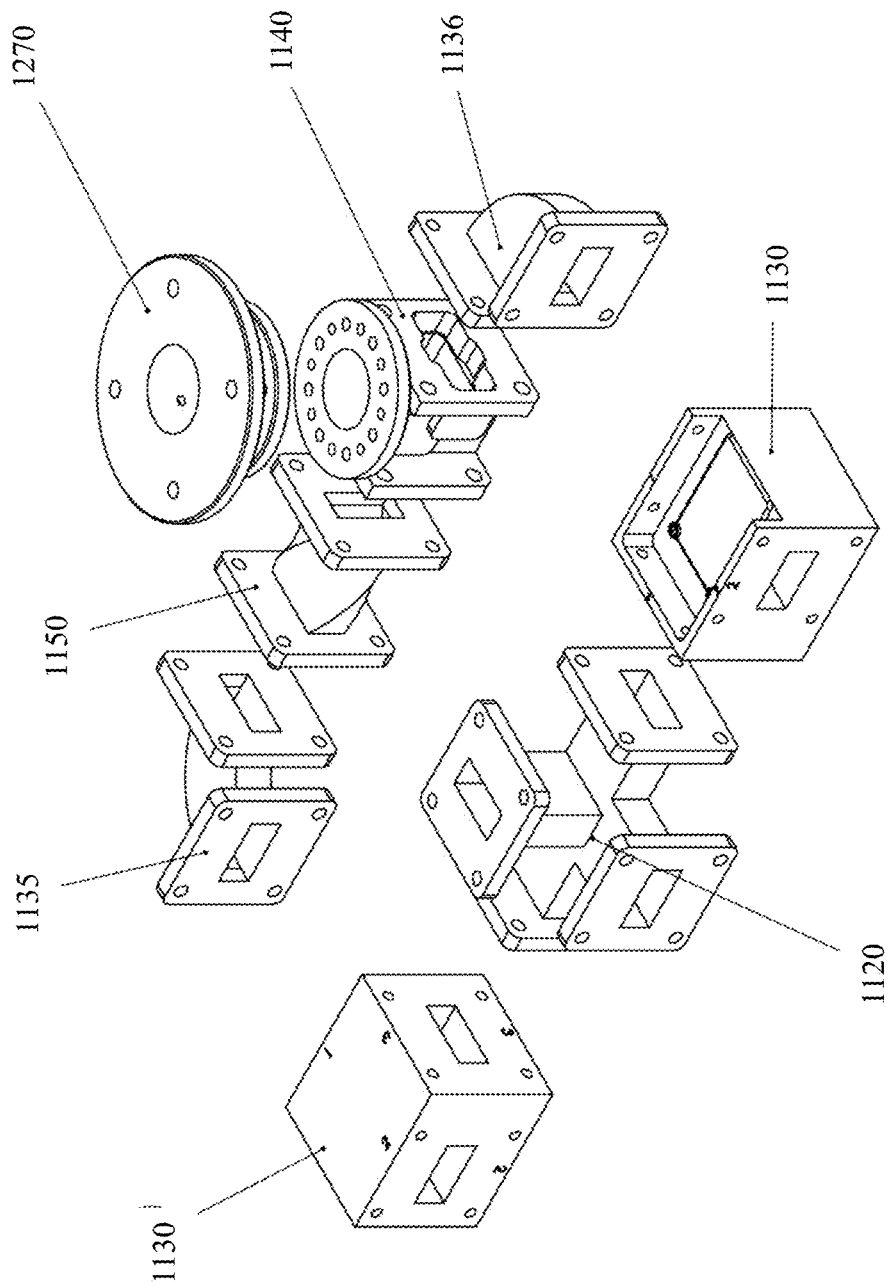
FIG. 12 illustrates a 3-dimensional drawing of the waveguide components including a coupler.

Return signals are captured by the feed horn and waveguide assembly (e.g., element 1015 of FIG. 10) and pass through the waveguides 1135 (and polarization shifting waveguide 1150) and 1136 back to the circulators 1130 which pass them to waveguide to coaxial converters 1115. The converted signal is then passed to the data acquisition components described in detail below. In some embodiments, some of the signal from the output port 1128 bleeds through the circulator to the waveguide to coaxial converter 1115 and is captured by the data acquisition assembly to be used as a reference signal for performing analysis of the return signals. In some embodiments, the transmitted signal is redirected to at least one port of the data acquisition assembly by incorporating a splitter in the transmission path (e.g., before the magic T 1120) and a switch that allows a particular set of electronic components along a path from the circulator to the data acquisition assembly to process the transmitted signal before receiving the return signal. FIG. 12 illustrates a 3-dimensional drawing of the waveguide components including a coupler 1270. In some embodiments, waveguide components 1135 and 1136 are standard WR 90 components.

Figure 13:
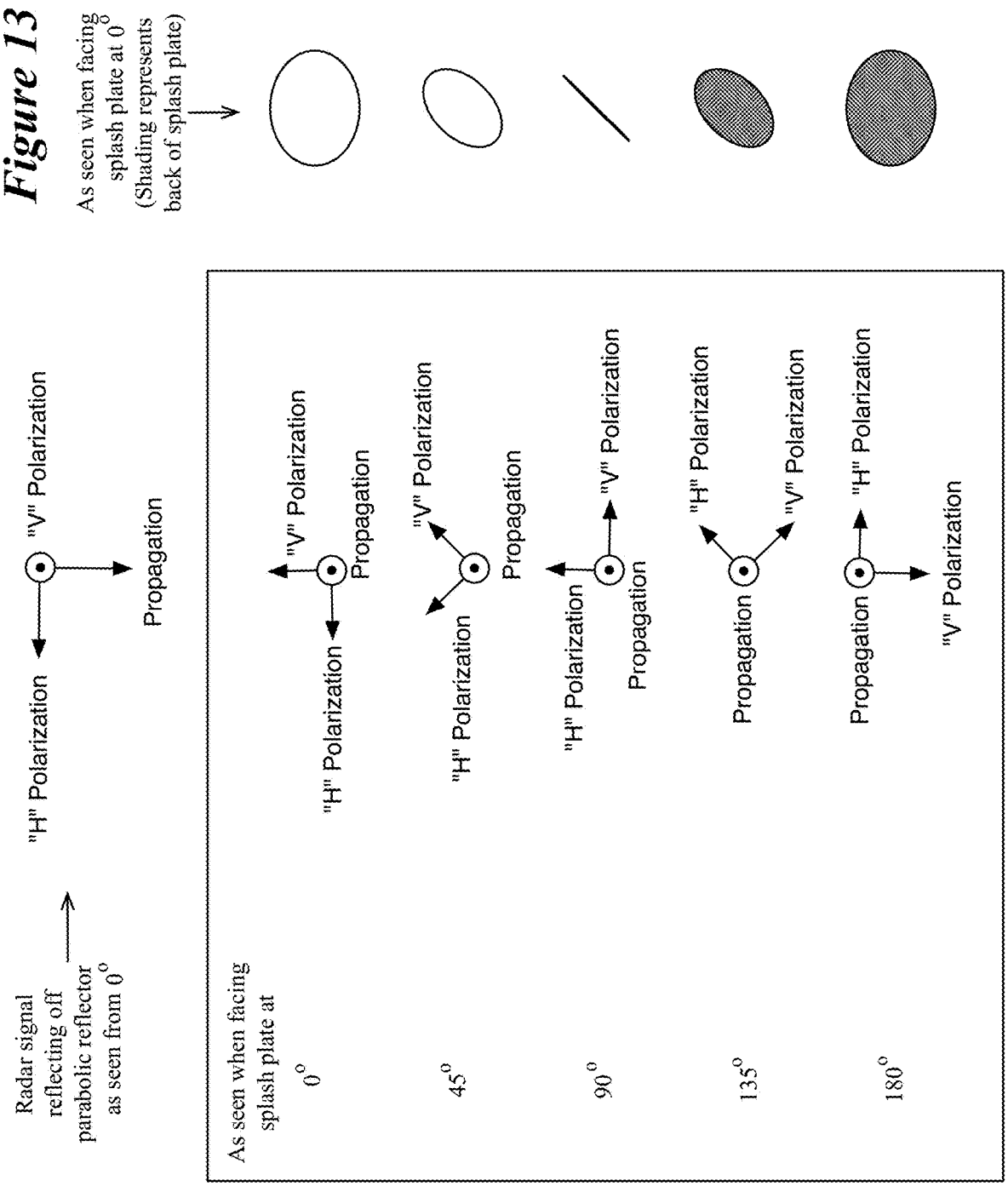
FIG. 13 illustrates polarizations of the original horizontally ("H") and vertically ("V") polarized signals using vector notation with a dot indicating a vector coming up out of the surface of the plane of the paper.

While the signals sent to the waveguide and feedhorn assembly (e.g., 1415) are horizontally and vertically polarized, the beam exiting the radome has its polarization affected by the orientation of the splash plate. FIG. 13 illustrates polarizations of the original horizontally ("H") and vertically ("V") polarized signals using vector notation with a dot indicating a vector coming up out of the surface of the plane of the paper. At the top, the polarization as seen from a position defined arbitrarily as 0° (in azimuth) indicates that the signal is comprised of a first and second component with orthogonal polarization ("H" and "V" polarizations) that propagate down from the parabolic reflector to the splash plate. Along the right side of the figure are a set of illustrations depicting the splash plate as it rotates 180° in azimuth in 45° increments as seen from the arbitrarily defined 0° position (white indicating the reflecting surface, shading indicating the non-reflecting back surface of the splash plate).

In the boxed area, the signal exiting the radome (after being reflected off the splash plate) as seen from a viewer directly facing the reflecting surface of the splash plate is depicted (i.e., propagation direction directly toward the viewer). At 0° the "H" polarization is seen by the imaginary viewer as horizontal while the "V" polarization is seen as vertical. As the splash plate rotates the "H" and "V" polarizations rotate so that at 45° each original polarization now has both vertically and horizontally polarized components. At 90° the original polarizations switch so that the "H" polarization is now vertically polarized while the "V" polarization is now seen as horizontally polarized. At 135°, each original polarization again has both vertically and horizontally polarized components, while at 180° the signals "H" and "V" polarizations are once again seen, respectively, as horizontally and vertically polarized. Not shown are phase shifts that occur at different azimuthal angles for the "H" and "V" components. Because the splash plate does not move significantly in the time between transmission and of the signals and reception of the return signals, return signals with the same polarization as the "H" ("V") arm of the waveguide are passed to the circulator and data acquisition port from which the "H" ("V") polarized signal was sent.

In some embodiments, software executed by the central server or the radar computer performs analysis based on captured data for the "H" and "V" polarizations and associated azimuthal and elevation data to derive data for vertically and horizontally polarized signals for the central server to use to perform particle detection functions based on differences in scattering of horizontal and vertical components. In other embodiments, raw data for each of the "H" and "V" channels is sent to the central server to be fed directly into the machine-trained network along with the azimuthal and elevation data. In some embodiments, the data sent to the central server includes the sample data captured from the portion of the original signal that bleeds through to the waveguide to coaxial converter.

Figure 14:
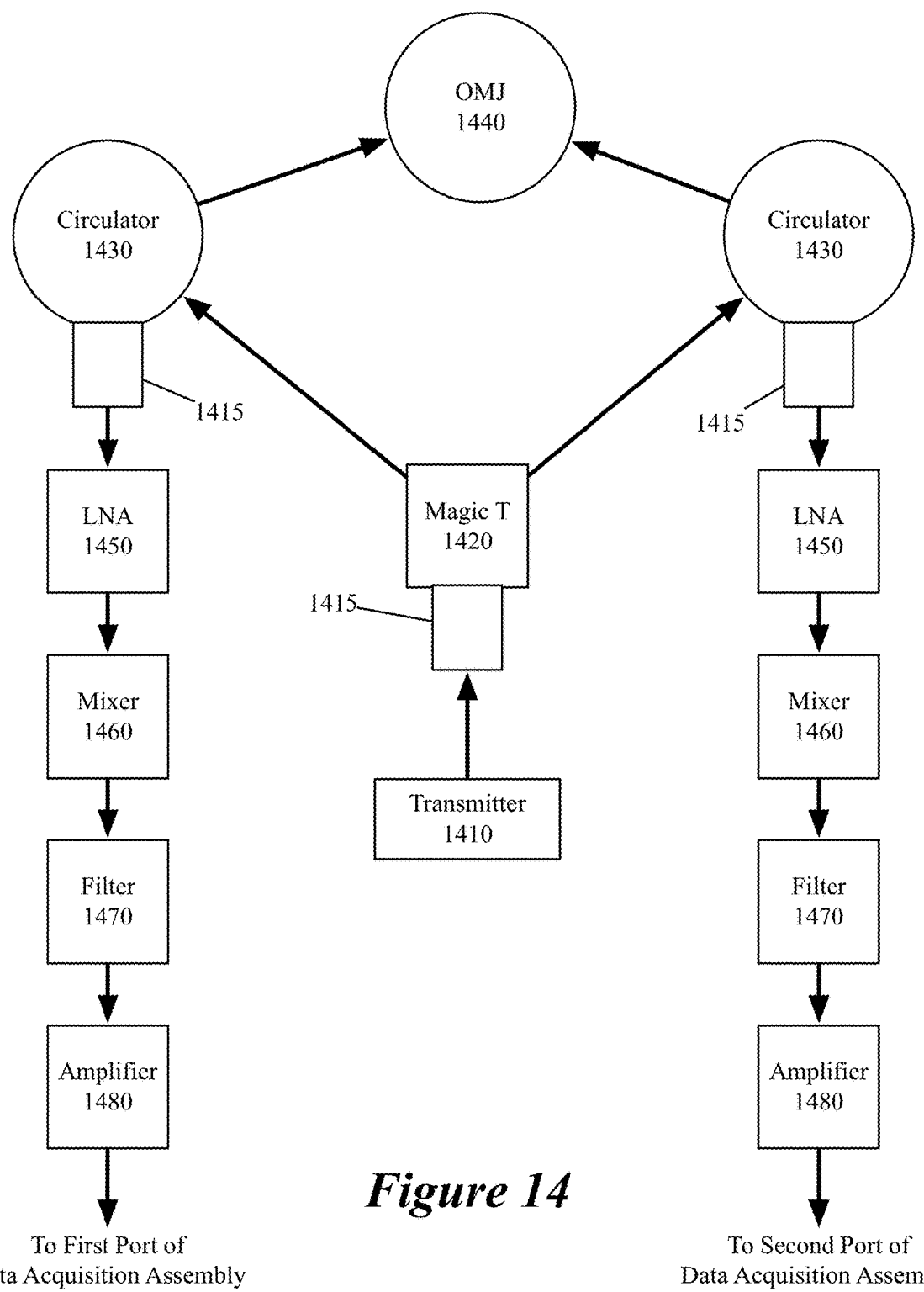
FIG. 14 illustrates components of the waveguide assembly that process the radar transmission.

FIG. 14 illustrates components of the waveguide assembly that process the radar transmission. Beginning from the generation of the radar signal, FIG. 14 illustrates transmitter 1410. Transmitter 1410, in some embodiments includes a phase locked dielectric resonator oscillator configured to output a 9375 MHz central frequency signal (PLDRO). In some embodiments, the PLDRO is driven by a lower frequency signal (e.g., a 10 MHz signal generated by a global-positioning-system synchronized oscillator). The generated signal is transmitted to magic T junction 1420 that will split the generated signal between two arms of the waveguide. In some embodiments, the magic T junction 1420 is an H-plane T that splits the signal between the two arms with no change in phase. In some embodiments, the transmission to magic T 1420 is facilitated by a coaxial to waveguide connection 1415.

From magic T 1420, the signals go through circulators 1430 that are each oriented to pass the transmitted signals to ortho-mode junction (OMJ) (or ortho mode transducer (OMT)) 1440 and pass received returning signals from OMJ 1440 to low noise amplifier 1450 and ultimately to the data acquisition assembly for data acquisition. However, as described above, before arriving at OMJ 1440, the signal in one arm (e.g., the left arm) of the waveguide is twisted such that it is polarized orthogonally (e.g., vertically polarized) to the signal propagating through the other arm (e.g., horizontally polarized). OMJ 1440 combines the orthogonally polarized signals and directs them out a waveguide/feedhorn assembly such as feedhorn 915 of FIGS. 9A, 9B, and 10 \.

As described above, return signals arrive at OMJ 1440 and the vertically and horizontally polarized components of the returning signals, respectively, propagate down the vertically and horizontally oriented waveguides to circulators 1430. Circulators 1430 pass the return signals (or transmitted signals that have bled through the circulator 1430) to waveguide to coaxial converter 1415 to be processed before being sent to a port of the data acquisition assembly. After waveguide to coaxial converter 1415, the signal is processed by a low noise amplifier 1450 to increase the signal strength. After amplification the signal is processed by a mixer 1460 that mixes the processed return signal with a reference signal having a central frequency close to, but not the same as, the transmitted signal (e.g., 9375 MHz transmitted signal, 9370 MHz reference signal) to produce new signals at the sum and difference of the frequencies (e.g., 5 MHz and 18745 MHz). In some embodiments, the new signals include information that was encoded in the transmitted signal along with any distortion caused by the reflection from atmospheric constituents. The distortions are used in some embodiments to determine the type of particle from which the signal was reflected.

Figure 15:
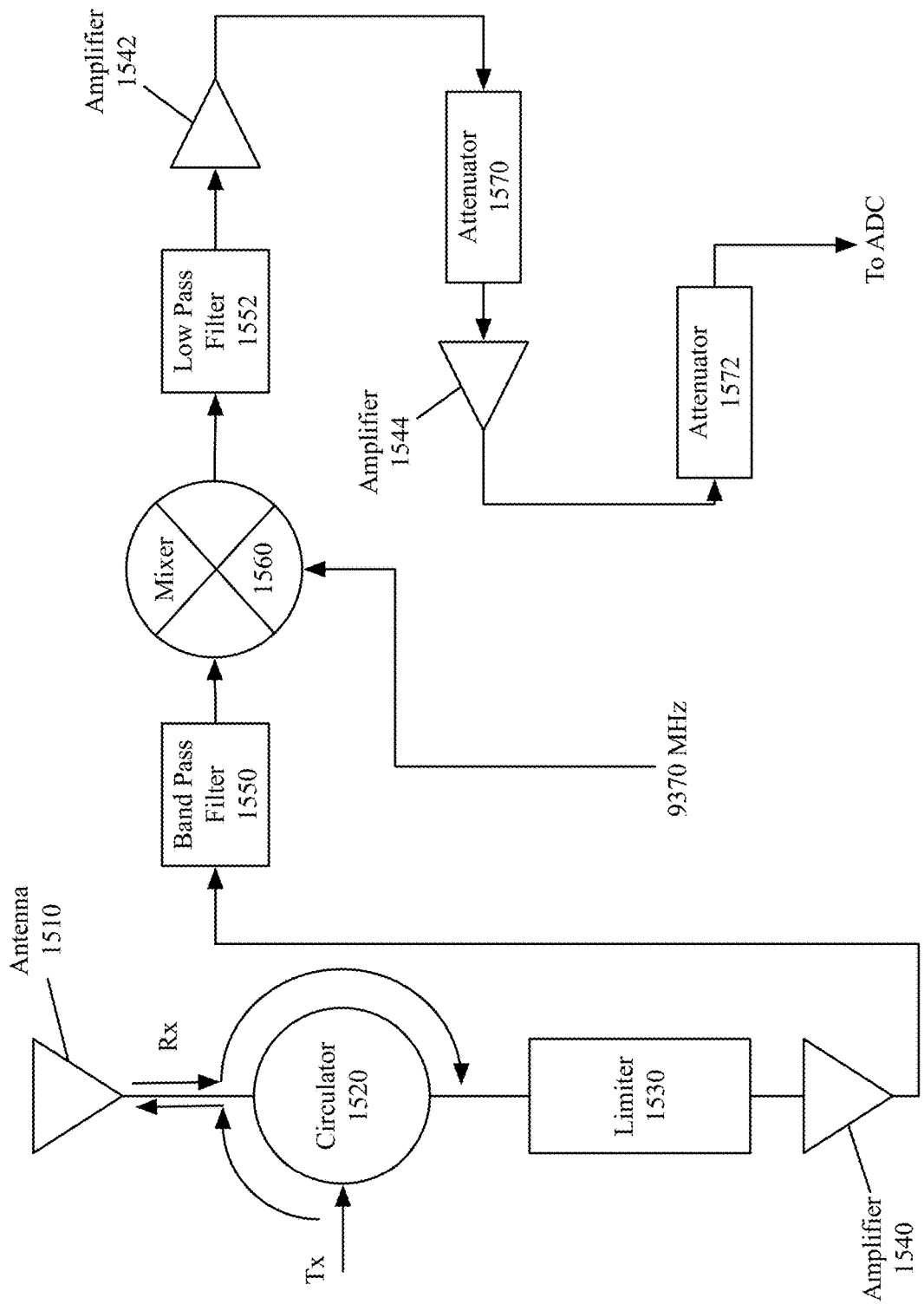
FIG. 15 illustrates a set of electronic components that make up a path traversed by signals coming from the circulator to the analog to digital converter.

After the mixer 1460, the signal comprising the sum and difference signal is processed by filter 1470 that filters out the higher frequency signal (e.g., a low pass filter with a 10 MHz cutoff). The filtered signal is then passed to a final amplifier (or set of amplifiers) 1480 for a round of amplification prior to being sent to a port of the data acquisition assembly (e.g., an Analog Devices AD9650 family analog to digital converter in communication with a raspberry pi computing device). One of ordinary skill in the art will appreciate that the amplification, mixing, and filtering operations may be adjusted for a particular application. FIG. 15 illustrates another embodiment of the electronic components along the path from circulator 1520 to the port of the analog to digital converter.

FIG. 15 illustrates a set of electronic components that make up a path traversed by signals coming from the circulator to the analog to digital converter. In some embodiments, some of the depicted electronic components are placed above the waveguide components, while others (e.g. limiter 1530) are in the plane of the waveguide components. Other embodiments place some of the electronic components below the waveguide components with other components in the plane of the waveguide components. FIG. 15 includes antenna 1510, circulator 1520, limiter 1530, amplifiers 1540-1544, filters 1550 and 1552, mixer 1560, and attenuators 1570 and 1572. Similarly to the design described above in relation to FIG. 14, the signal is transmitted through circulator 1520 and antenna 1510 and the reflected signal is received through antenna 1510 and passes through the circulator 1520. In the depicted embodiment, the received signal is first passed through a limiter 1530 to protect the downstream components from signals having too much power. In some embodiments, the limiter is a Pasternak PE8022 or similar limiter with a limit of 11 dB.

After passing through the limiter, the signal is then amplified by amplifier 1540 (e.g., a low noise amplifier such as a Mini Circuits ZX60-123LN+ amplifier). After amplification the signal is passed to band pass filter 1550. In some embodiments using a central frequency of 9375 MHz, the band pass filter passes 8-11 GHz (e.g., a combination of a high pass filter such as a Mini Circuits ZHSS-8G+ and a low pass filter such as a Mini Circuits ZLSS-11G+). After filtering out undesired frequencies, the filtered signal is processed by mixer 1560 (e.g., a Mini Circuits ZX05-153+) using a local oscillator frequency of 9370 MHz (assuming a 9375 MHz signal central frequency and a 5 MHz desired central frequency for conversion and analysis). As described above, the output of mixer 1560 includes signals at the sum and difference of the signal and the local oscillator frequencies. In order to remove the higher frequency signal, the signal is then passed to low pass filter 1552 with, for example, a 10 MHz cutoff frequency (e.g., a Mini Circuits SLP-10.7+ filter).

After the filtering and mixing operations are performed, the signal is amplified by amplifier 1542, attenuated by attenuator 1570, amplified by amplifier 1544, and finally attenuated by attenuator 1572. In some embodiments, amplifiers 1542 and 1544 are identical amplifiers (e.g., Mini Circuits ZFL-500HLN+ amplifiers) or provide a similar level of amplification. In other embodiments, each amplifier provides a different amount of amplification. Attenuators 1570 and 1572, in some embodiments, provide a fixed level of attenuation (e.g., 2 dB for a Mini Circuits VAT-2+). In other embodiments, one or both of attenuators 1570 and

1572 are variable attenuators that attenuate the signal by 0-20 dB. After the final attenuation, the signal is sent to a port of an analog to digital converter that will capture data sent to the central server.

Figure 16:
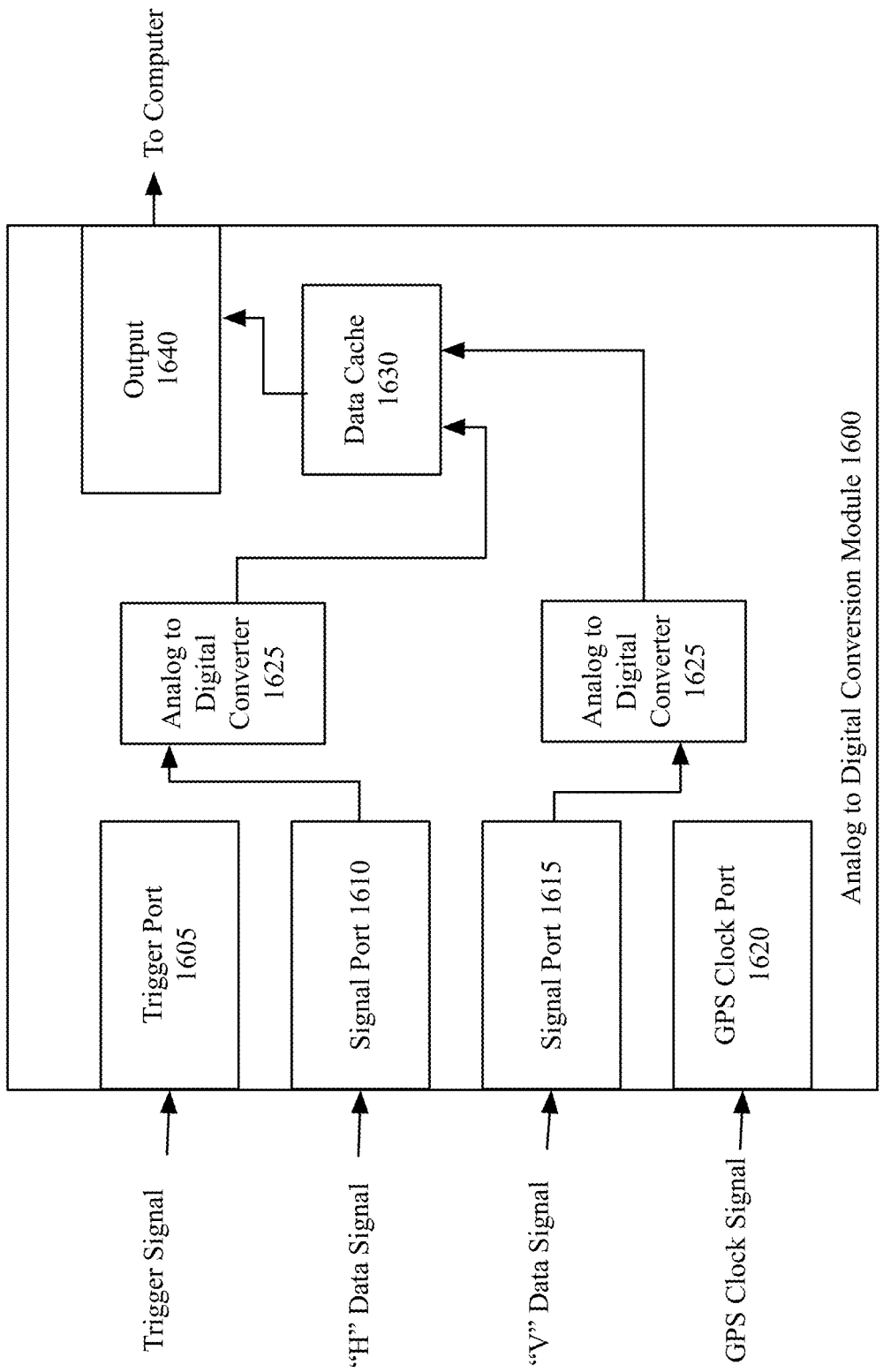
FIG. 16 illustrates components of an analog to digital converter module used in some embodiments as part of the data acquisition assembly.

FIG. 16 illustrates components of an analog to digital converter module 1600 used in some embodiments as part of the data acquisition assembly. Analog to digital conversion module 1600, in some embodiments, includes at least 4 ports: (1) a trigger port 1605 that receives a trigger signal that initiates data acquisition, (2) two signal ports 1610 and 1615 for analog to digital conversion of the "H" and "V" signals (signals coming from the two different arms of the waveguide assembly) respectively, and (3) a GPS clock port 1620 for receiving a clock signal from a GPS oscillator used to synchronize and drive elements of the radar electronic components. Analog to digital conversion (ADC) module 1600 also includes analog to digital converters 1625 for converting analog signals coming into ports 1610 and 1615 into digital signals. Additional common elements of an ADC modules such as reference voltage ports and additional connections are omitted for clarity. In some embodiments, the incoming analog signal is a 5 MHz central frequency signal sampled at a rate of 25 MHz and the digital output data is a 16-bit value. In some embodiments, the output is affected by a noise of approximately 1.5 least significant bits. In some embodiments, the GPS clock signal is a reference signal at 25 MHz used to drive the sampling rate.

In some embodiments, the signal received at the trigger port is also received by a component of the signal transmission circuitry that controls the pulse timing of a transmitted pulse in order to synchronize the transmission and data collection. In some embodiments, pulses last 0.1-10 microseconds and are repeated with a frequency of 10-1000 Hz. Based on the trigger signal received at the analog to digital conversion module 1600 data collection is initiated for a configurable period of time that defines an outer radius of radar detection (based on the time of flight for electromagnetic radiation). For example, a data collection period of approximately 100 microseconds collects data for electromagnetic radiation within approximately 15 km (~10 miles) (100 microsecond being the time it takes electromagnetic radiation in air to travel approximately 15 km out and back for a total of 30 km (~20 miles)). The range of the radar can thus be adjusted by changing the data collection period (and the power, if necessary).

Once collected the data is stored in data cache 1630 in order to ensure that all data is communicated to the central server and is not limited by the data transmission rate between the analog to digital conversion module 1600 and a computer responsible for sending data to the central server. Cached data is then passed to output 1640 to be transmitted to the computer (e.g., a raspberry pi system) for the computer to send to the central server with associated data regarding the azimuthal angle of the radar, the elevation of the radar, and, in some embodiments, some combination of data regarding, additional position and timing data provided by a GPS oscillator, and additional data captured by additional sensors such as wind speed, temperature, humidity, and pressure as detailed above. In some embodiments, the data is formatted in a proprietary format that is compressed to conserver bandwidth.

Figure 17:
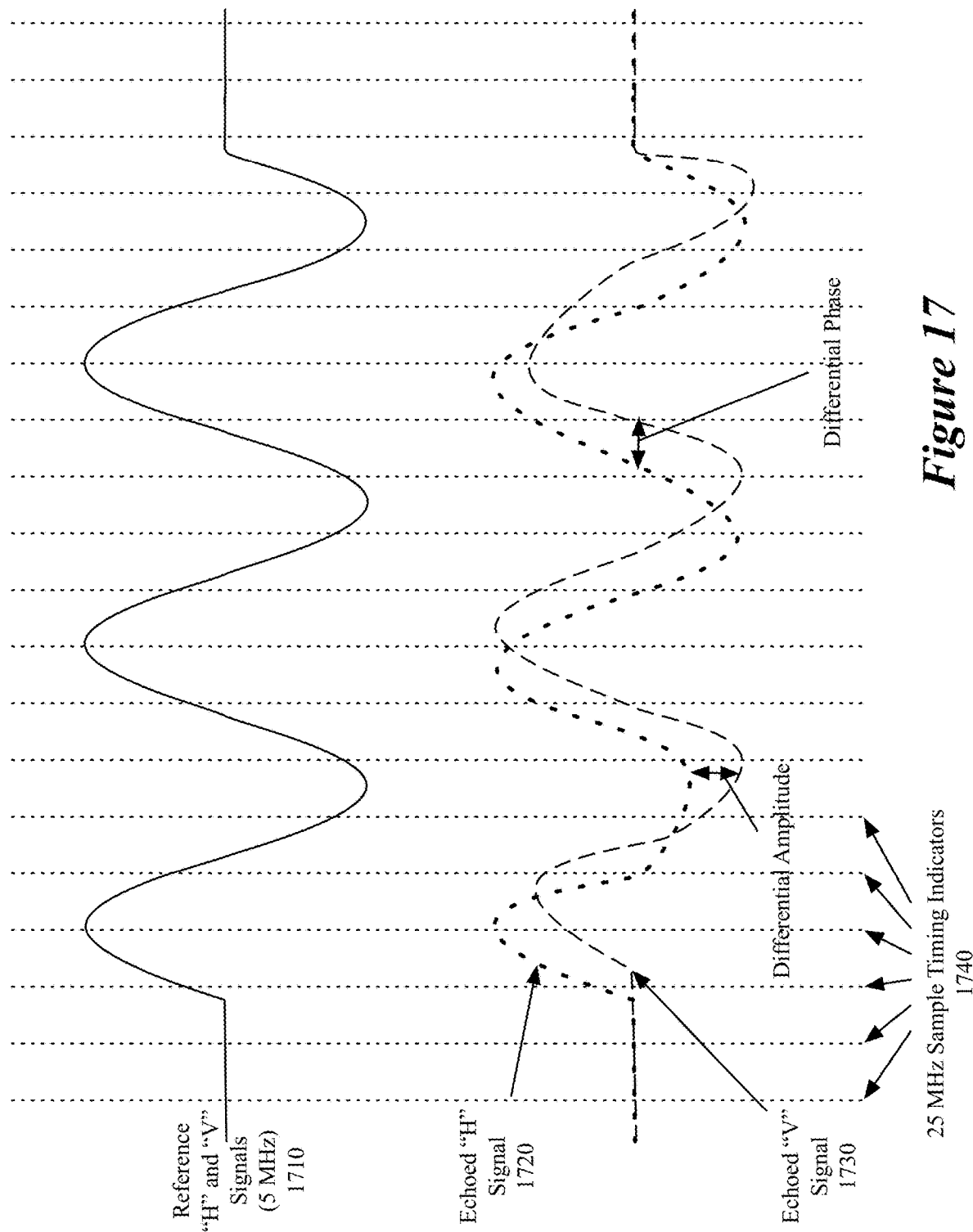
FIG. 17 illustrates analog signals received at the ports of an analog to digital converter.

FIG. 17 illustrates analog signals 1710, 1720, and 1730 received at the ports of an analog to digital converter (e.g., an Analog Devices AD9650-105EBZ analog to digital converter). Signal 1710 is the reference (transmitted) signal received at the ports of the analog to digital converter and is sampled at each of the sample timing indicators 1740 (vertical dashed lines). Signals 1720 and 1730 are the echoed (or return) signals from the "H" and "V" arms of the waveguide assembly. The return signals, in some embodiments, display phase shifts (differential phase) from the reference signal and from each other. Additionally, in some embodiments the amplitude of the return signals differs from the reference signals and from each other. In some embodiments, the differential amplitude and phase between the returning "H" and "V" signals is used to identify particles from which the radar is reflected. For example, a heavy rain may have greater radar cross section for horizontally polarized radar signals than for vertically polarized radar signals and the echoed "V" signal (which, in the example, propagates with vertical polarization) thus has a smaller amplitude than the echoed "H" signal.

Figure 18:
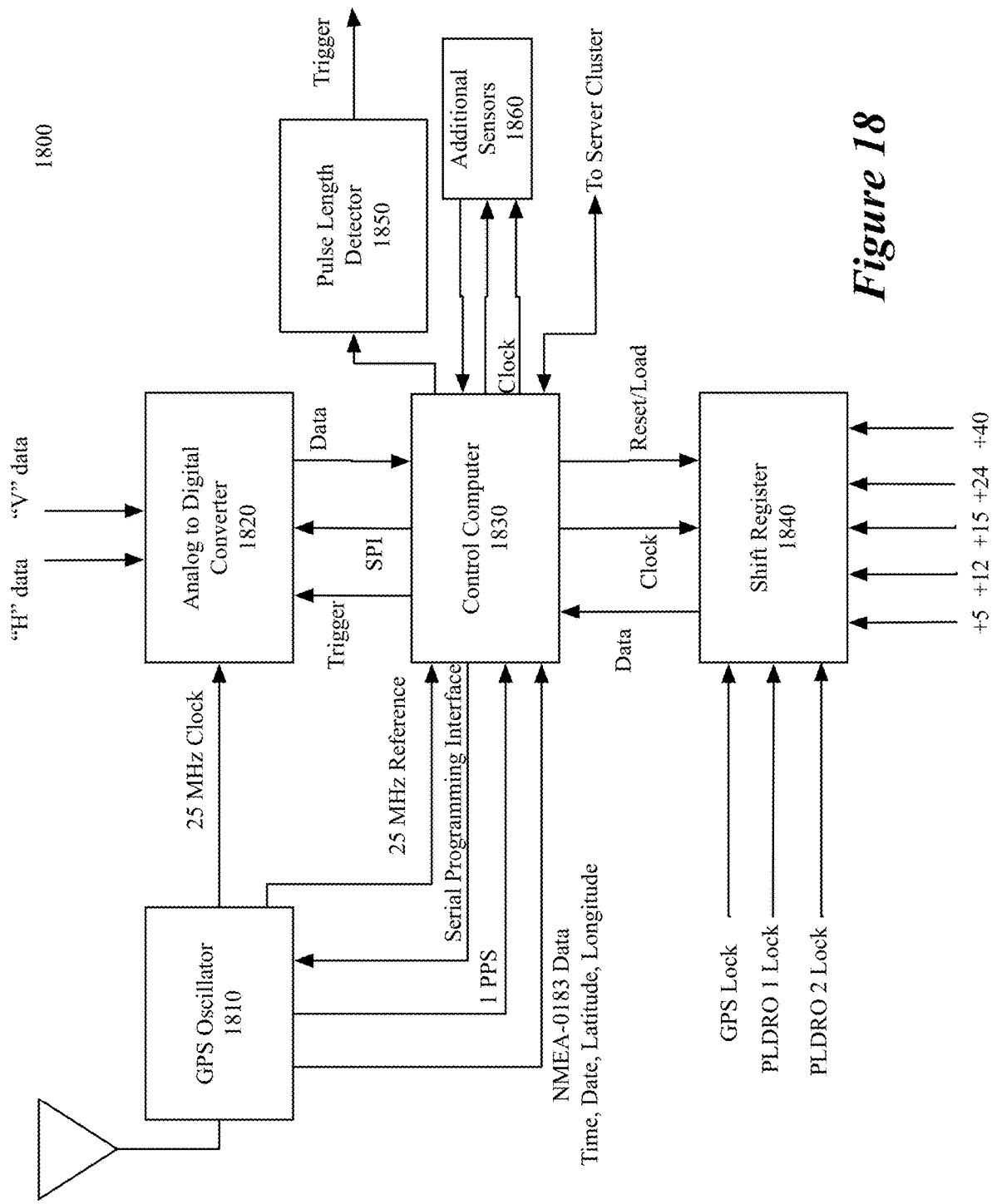
FIG. 18 illustrates a data acquisition system that receives the analog signals from the waveguide and electronic signal processing components of the radar system.

FIG. 18 illustrates a data acquisition system 1800 that receives the analog signals from the waveguide and electronic signal processing components of the radar system. Data acquisition system 1800 includes GPS oscillator 1810 that, in some embodiments, is a multi-GNSS disciplined oscillator that outputs a 25 MHz reference and clock signal as well as NMEA-0183 data, and as described in relation to FIG. 19, a 10 MHz signal used to drive phase locked dielectric resonator oscillators (PLDROs) set to central frequencies in the radar band (~10 GHz). As shown, control computer 1830 communicates with GPS oscillator 1810 through a serial programming interface and receives a 25 MHZ reference signal and NMEA-0183 data (e.g., time, date, latitude, and longitude) from GPS oscillator 1810.

Data acquisition system 1800 also includes analog to digital converter 1820, shift register 1840, pulse length detector 1850, and additional sensors 1860. In some embodiments, pulse length detector 1850 is a module that ensures that the transmitter is not harmed by exceeding the duty cycle.

Figure 19:
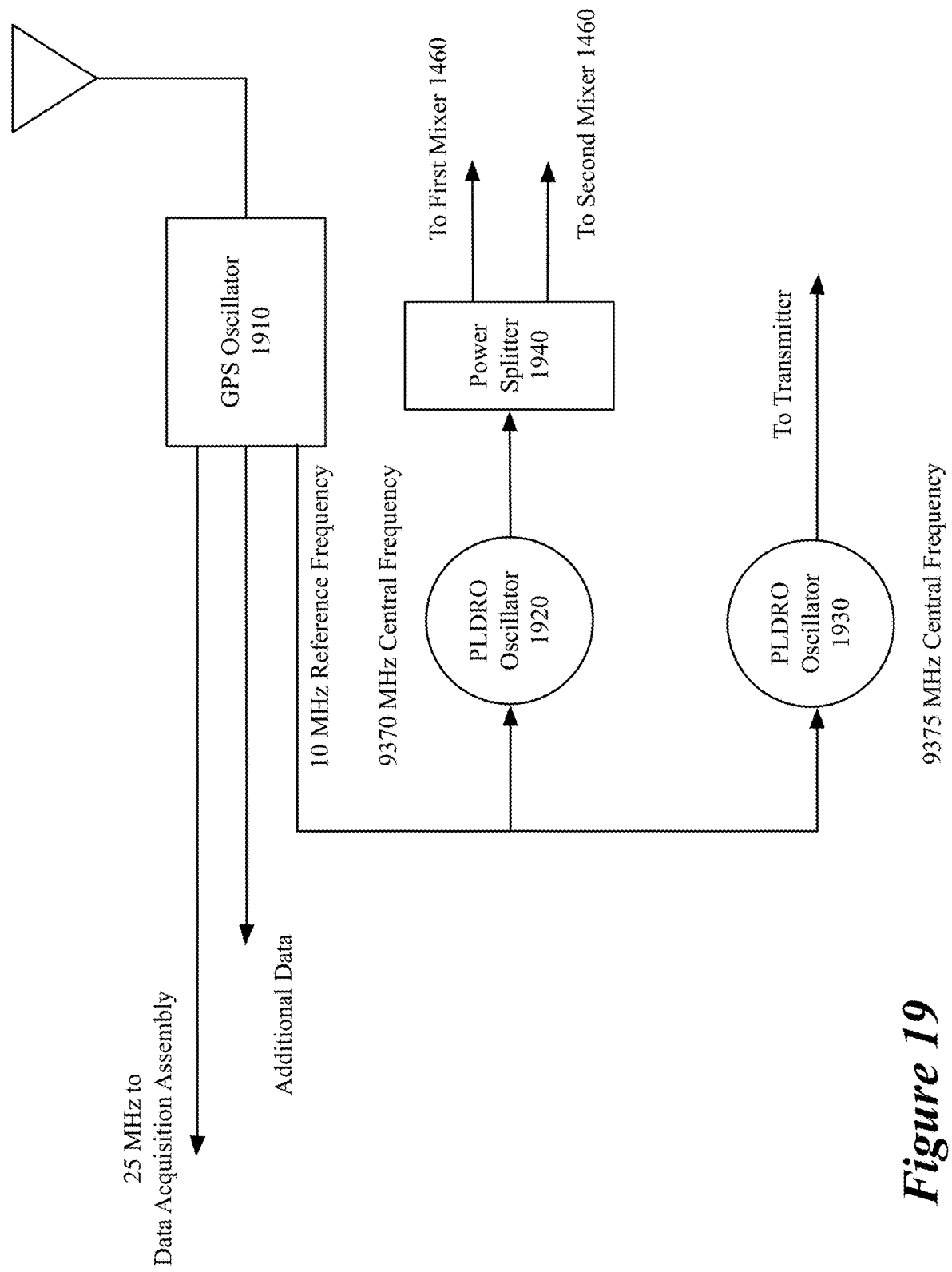
FIG. 19 illustrates the interaction between GPS oscillator and phase locked dielectric resonator oscillators (PLDROs).

GPS oscillator 1810 is also used to drive the transmitted signal and the signal that is mixed with the transmitted (and return) signals to perform the downconversion from the transmitted signal central frequency (e.g., 9375 MHz) to the frequency that is sampled by the analog to digital converter 1820. FIG. 19 illustrates the interaction between GPS oscillator 1910 and PLDROs 1920 and 1930. As shown, GPS oscillator 1910 outputs the 25 MHz signal to the data acquisition assembly as indicated in FIG. 18. Additionally, GPS oscillator 1910 outputs a 10 MHz signal that is used by both PLDROS 1920 and 1930 to generate higher frequency signals (in this example, 9370 MHz and 9375 MHz, respectively). PLDRO 1920 outputs a signal at a frequency that is lower than the frequency output by PLDRO 1930 such that the difference in the frequencies is the frequency that is desired for a signal sampled at the analog to digital converter (in this example, 5 MHz). The lower frequency signal is then split at power splitter 1940 and sent to each mixer in the downconversion pipeline (as in FIG. 15) between a circulator and an analog to digital converter.

In some embodiments, modulation of the 10 MHz reference occurs before driving the PLDRO 1930 such that the multiplied frequency includes the information encoded in the modulation. In other embodiments, modulation of the transmitted signal is performed after PLDRO 1930 generates the high frequency carrier wave. In some embodiments, the modulation includes frequency modulation (e.g., using a 100 MHz bandwidth) or amplitude modulation. In some embodiments, encoded signals include encoding that is used to differentiate between signals sent by different radars (e.g., using gold codes). In some embodiments, the codes used by different radars in the system are coordinated by the central server and the radar transmissions are controlled by a control computer of the individual radar systems (e.g., control computer 1830 of FIG. 18 or control module 726 of FIG. 7). Some embodiments use a digital to analog converter to convert digital signals to analog signals that are used to modulate the transmitted radar signals. Some embodiments use a digital to analog converter in place of PLDRO 1930 in order to generate the transmitted signals.

Figure 20:
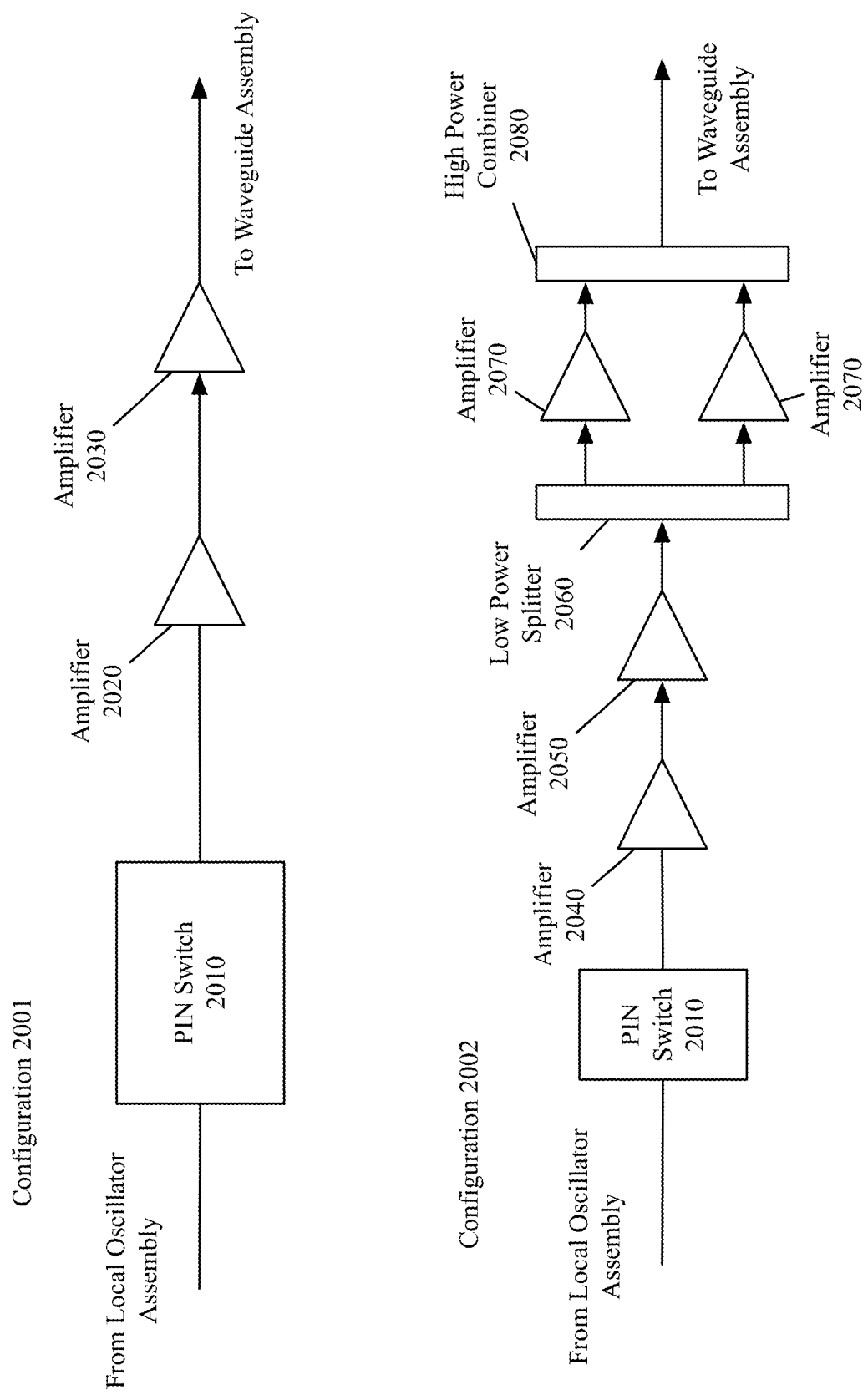
FIG. 20 illustrates configurations of electronic components along the path from the PLDRO that generates the transmission signal to the waveguide that transmits the signal outside of the radar system.

FIG. 20 illustrates configurations of electronic components along the path from the PLDRO (or digital to analog converter) that generates the transmission signal to the waveguide that transmits the signal outside of the radar system. After generating the signal for transmission, in some embodiments, the generated signal is passed to a PIN switch 2010 that is driven by a pulse generator that determines the length and timing of a pulse. Configurations 2001 and 2002 represent different possibilities for post switch amplification. Configuration 2001 includes two amplifiers 2020 (e.g., a 25-Watt CREE CMPA801B025F MMIC amplifier driven by a 28-volt supply) and 2030 (e.g., a 100-Watt CREE CGHV96100F2 MMIC amplifier driven by a 40-volt supply) that provide an output signal at approximately 125 Watts. Configuration 2002 includes a first amplifier 2040 that in some embodiments is a 1-watt amplifier, followed by amplifier 2050 (e.g., a 25-Watt CREE CMPA801B025F MMIC amplifier driven by a 28-volt supply). The amplified signal is then split by power splitter 2060 and each portion of the split signal is amplified by amplifiers 2070 (e.g., 100-Watt CREE CGHV96100F2 MMIC amplifiers driven by a 40-volt supply). The amplified portions of the split signal are then combined by high power combiner 2080 and the result is an approximately 200-Watt output signal transmitted using the waveguide assembly described above.

Figure 21:
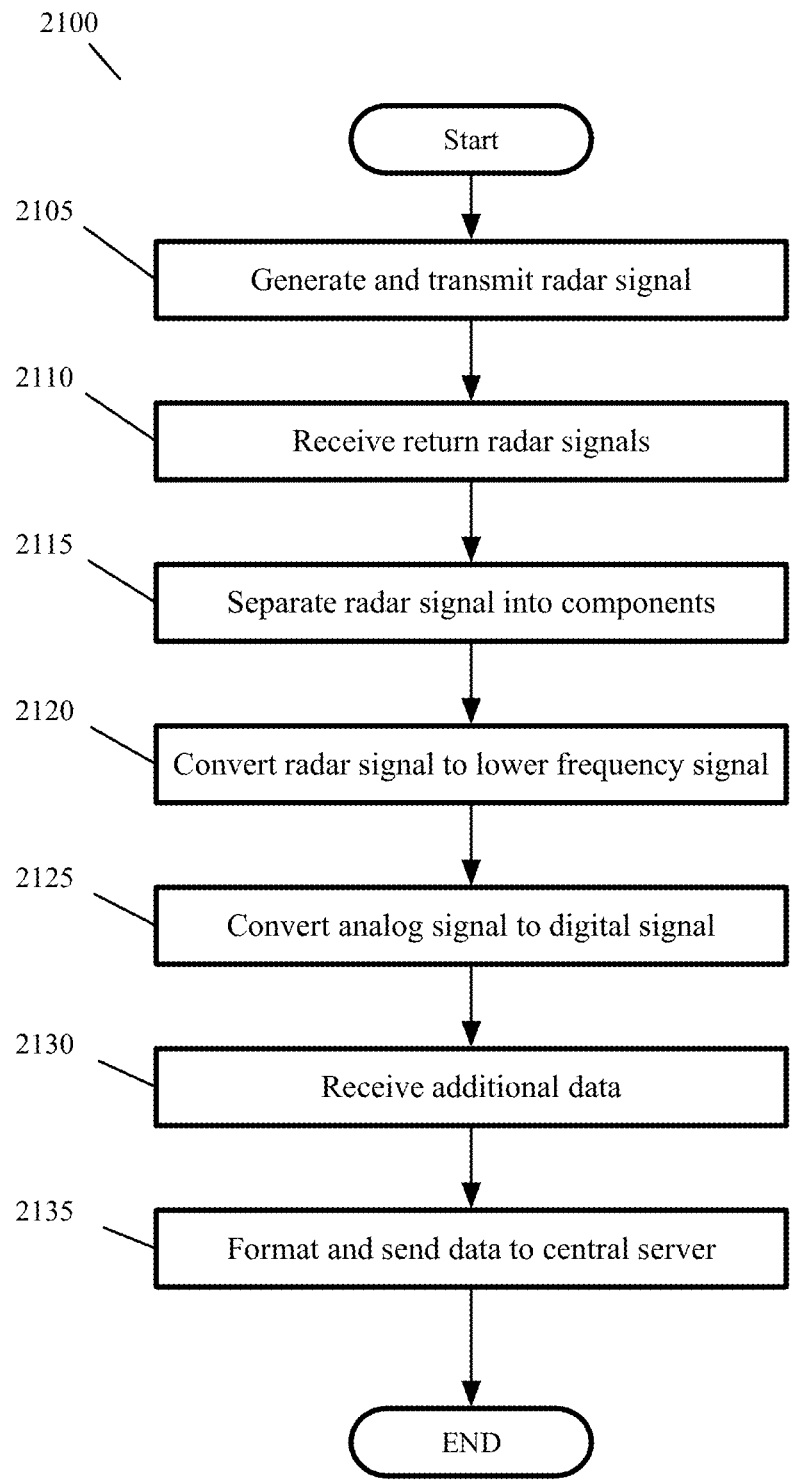
FIG. 21 conceptually illustrate a process performed by the individual radar systems.
Figure 22:
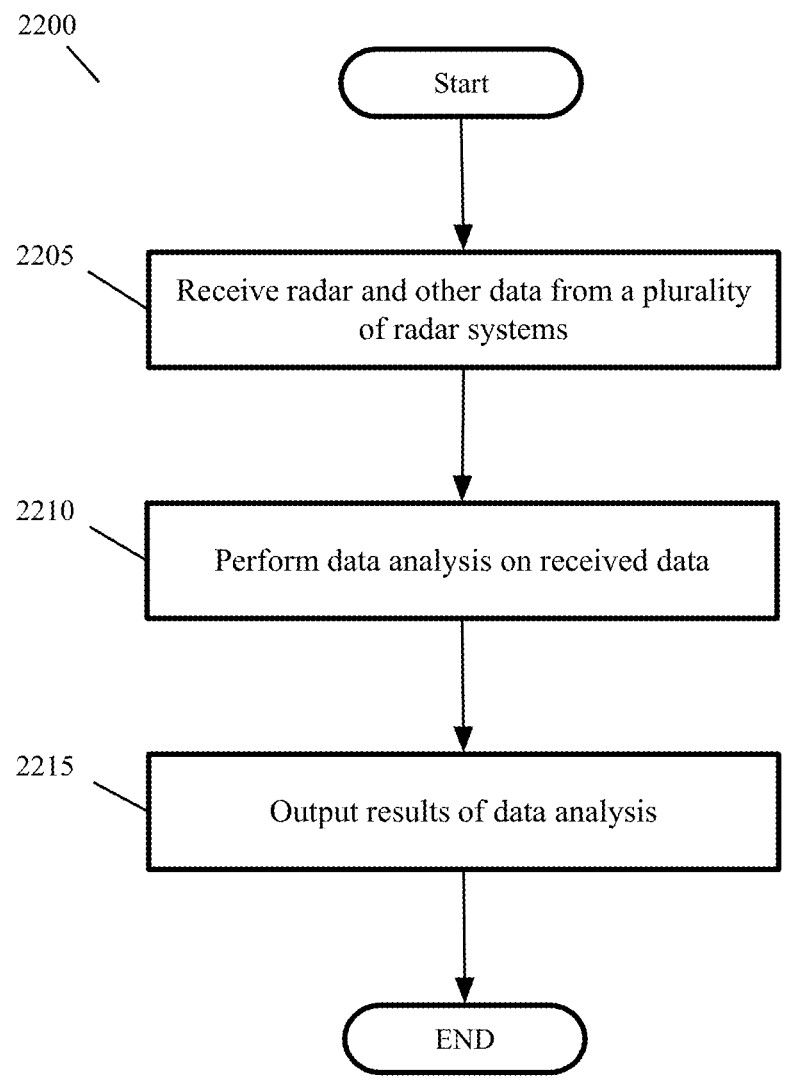
FIG. 22 conceptually illustrates a process performed by the central server to generate weather data for the region covered by the cellular radar network.

FIGS. 21 and 22 conceptually illustrate processes performed by the individual radar systems and by the central server respectively. However, one of ordinary skill in the art will appreciate that some preprocessing can be offloaded to the radar systems if so desired. Process 21 begins by generating and transmitting (at 2105) a radar signal. As described above, the transmission signal, in some embodiments, is modulated with encoded information to distinguish the signal from a first radar from the signal generated by a second radar. This distinguishability is especially important in bistatic or other configurations in which a radar receives signals from multiple radars and needs to distinguish one from the other to extract useful information. The transmitted signal includes, in some embodiments, components with orthogonal polarizations ("H" and "V").

After transmitting the radar signal the process continues by receiving (at 2110) return radar signals that reflect off targets (rain, sleet, birds, etc.) in the signal (or beam) path. The return signals are reflected off the splash plate to the parabolic reflector which focuses them on the feed horn. The received signals comprise orthogonally polarized components in some embodiments that are reflected differently by the targets or objects in the radar signal path.

To extract additional information from the received signals, the received radar signals are separated (at 2115) into orthogonally polarized components by the OMJ which splits the components to match the orientation of the different arms that feed the OMJ. Upon being split by the OMJ, the orthogonal components are vertically and horizontally polarized, however, this does not necessarily correspond to vertical and horizontal polarization outside the radar system as indicated in FIG. 13.

After splitting the orthogonally polarized components, the individual component signals are converted (at 2120) to lower frequency signals for sampling. The downconversion in some embodiments uses a series of limiters, mixers, amplifiers, and attenuators as described in relation to FIGS. 14 and 15. One of ordinary skill in the art will appreciate that a slightly different arrangement or combination of the components of FIGS. 14 and 15 will be used in different applications based on the different needs but based on the same principles.

The downconverted signals are then converted (at 2125) from analog signals to digital data (e.g., a 16-bit value for each sample point). In some embodiments, the conversion is based on a 25 MHz sampling rate with conversion to 16-bit values, although different sampling rates and bit values are used in other embodiments. In some embodiments, the digital data is cached by the analog to digital conversion before being sent to a computer of the radar system. Caching allows a higher conversion (sampling) rate than a communication channel with the computer can handle as long as the duty cycle allows enough time to provide assurance that the cache be emptied before the next data is captured. The conversion is performed in some embodiments by an analog to digital converter (ADC) similar to those discussed in relation to FIGS. 16-18.

The process then receives (at 2130) additional data. In some embodiments, the data includes data regarding the azimuthal angle and elevation of the splash plate as well as any data from additional sensors (e.g., pressure, temperature, humidity, etc.). In some embodiments, the azimuthal and elevation data is received from a separate controller or sensor specific to the splash plate. One of ordinary skill in the art will understand that, in some embodiments, the additional data is received before the converted digital data, as the systems responsible for different data types are not dependent on each other. Azimuthal and elevation data is associated with a particular set of data captured for that azimuthal angle and elevation so that appropriate processing can be performed either at the radar or at the central server.

The captured data (including azimuthal and elevation data) is then formatted and sent (at 2135) to the central server for additional processing. In some embodiments, the formatting is a proprietary format and the data is compressed for sending to the central server. In some embodiments, the raw data (from the different ports of the ADC) is sent to the central server, while in other embodiments, the radar preprocesses the data based on the azimuthal and elevation angle to compute data related to outgoing vertically and horizontally polarized radar signals (i.e., with vertical and horizontal polarizations when viewed from a radar target's perspective). The process then ends.

Process 2200 describes a process performed by a central server. Process 2200 begins at 2205 by receiving radar and other data from a plurality of radar systems. Data for individual radar systems is analyzed, in some embodiments, to produce a first set of analyses based only on the individual radar data. In some embodiments, central server additionally or exclusively correlates all the data from a given time to be processed as a single unit. The received data, in some embodiments, is formatted for analysis either before, after, or independently of the correlation operation.

Once the data is received, the central server performs (at 2210) analysis of the data. The central server in some embodiments computes different parameters from the raw or preprocessed radar data (e.g., radar reflectivity factor, differential reflectivity, differential propagation phase shift, specific differential phase, circular depolarization ration, linear depolarization ratio, correlation coefficient, etc.). In some embodiments, the analysis is performed using a machine trained network as described below in relation to FIGS. 29-32.

Once the analysis has been performed, the results are output (at 2215). In some embodiments, the output data is weather data including velocity data, particle identification, precipitation rates, and other relevant parameters. The resolution of the data, in some embodiments, is as low as 1-10 meters. The output data, in some embodiments, is provided to third parties for their own use. For example, as described in relation to FIG. 8, the data are used in some embodiments to provide an overlay for a mapping program. The process then ends.

Figure 23:
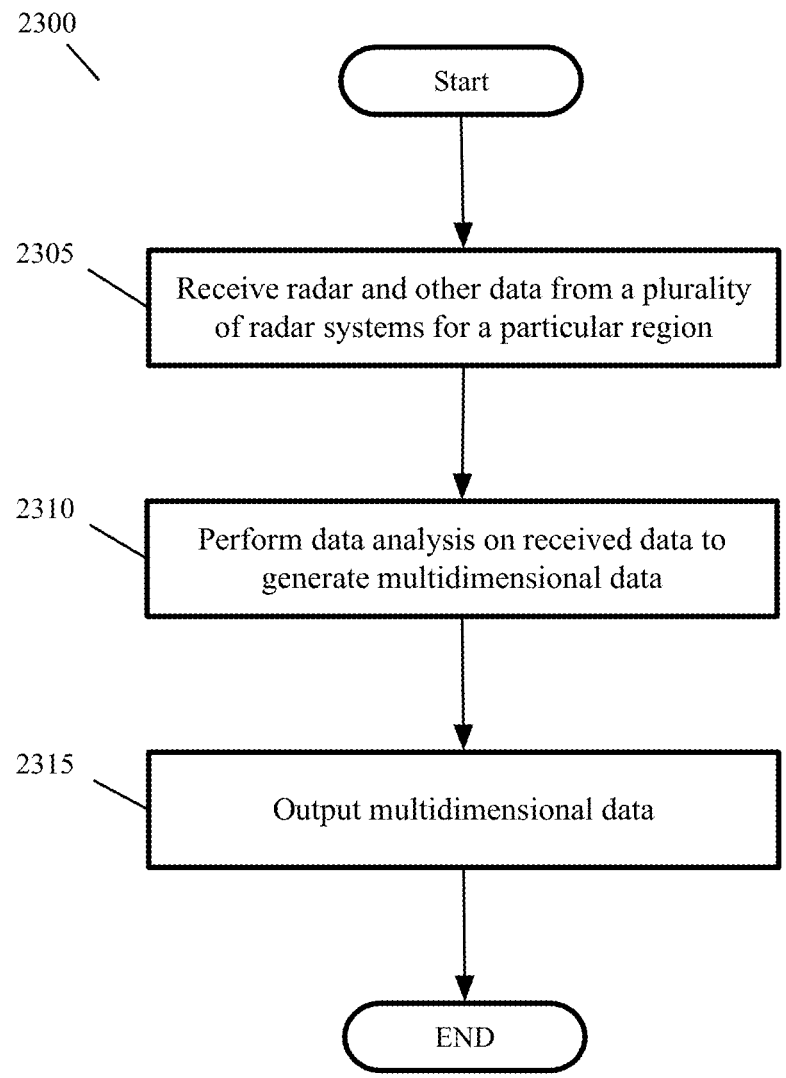
FIG. 23 conceptually illustrates a process performed by the central server to generate multidimensional data for a particular region covered by more than one radar.

FIG. 23 conceptually illustrates a process 2300 performed by the central server to generate multidimensional data for a particular region covered by more than one radar. Process 2300 begins by receiving (at 2305) radar and other data (e.g., azimuthal and elevation data) from a plurality of radar systems for a particular region. The radar data from the different individual radars represent different views of the targets (e.g., meteorological conditions) in the particular region. The different views, in some embodiments, in their aggregate include more information than the individual radar data. In some embodiments, the received data includes data captured using a bistatic configuration in which pairs of radars are oriented such that they receive reflected signals that originated at the other radar in the radar pair. In some embodiments, the radar signals are coordinated such that holographic interferometry provides additional information beyond a standard radar reflection or even standard bistatic configurations.

Analysis is then performed (at 2310) on the received data to reconstruct multidimensional data (e.g., tomographic or holographic data). The analysis, in some embodiments, uses standard tomographic or holographic reconstruction techniques. In other embodiments, the standard techniques are complimented or are replaced by a machine learning approach using a network trained as described below. In addition to being multidimensional, the data produced by the analysis, in some embodiments, is higher resolution data than the data received from any individual radar. In some embodiments, the resolution of the individual radars is approximately 10 meters while the resolution of the multi-dimensional data is as low as 1 meter.

The multidimensional data is then output (at 2315) for consumption by a consumer. In some embodiments the data is provided to a mapping software provider to be available as an overlay in the mapping program. Other embodiments provide the multidimensional data to other 3rd parties to use for varied purposes or provide access to the data via a website. The process then ends.

Figure 24:
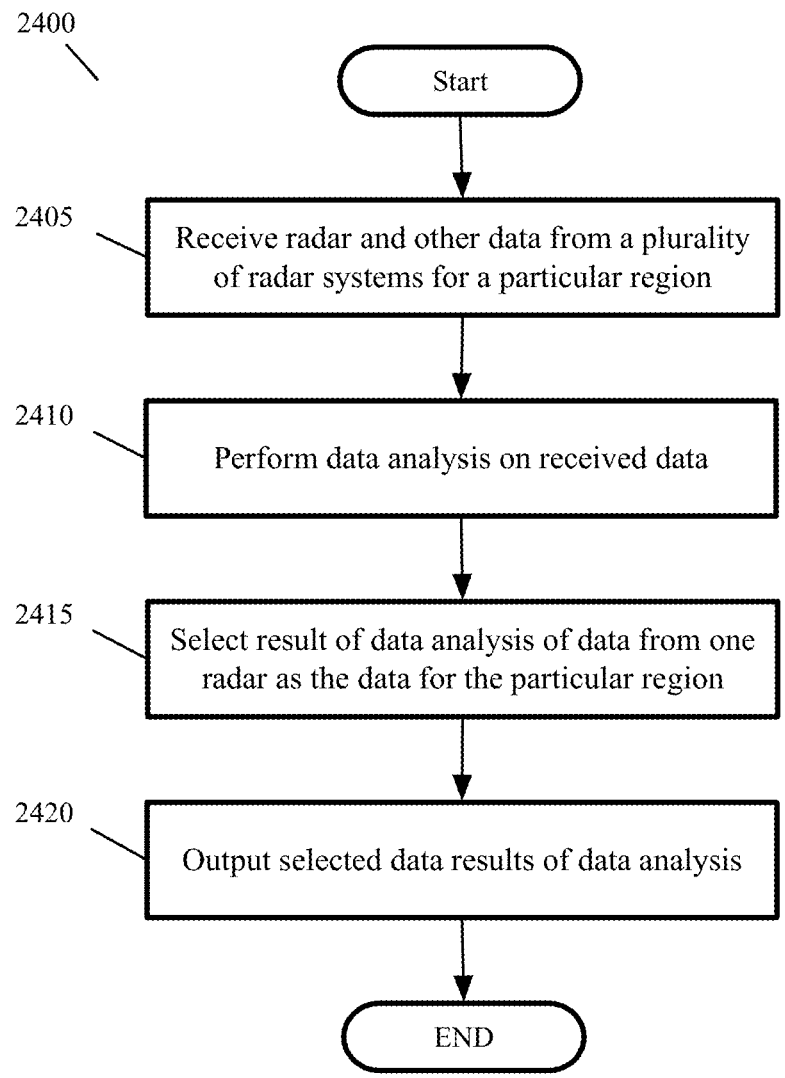
FIG. 24 conceptually illustrates a process performed by the central server to generate data for a particular region covered by more than one radar.

FIG. 24 conceptually illustrates a process 2400 performed by the central server to generate data for a particular region covered by more than one radar. Process 2400 begins by receiving (at 2405) radar data from multiple radar systems covering a particular region. In some embodiments, the radar data is collected at different times, but within a time period over which the meteorological conditions are not expected to change (e.g., 1-100 seconds). In some embodiments, the radars are coordinated to collect data at the same time.

After the data is received, analysis is performed (at 2410) on the received data from each of the individual radars. The analysis, in some embodiments, identifies meteorological conditions, such as rain, snow, hail, etc. and speeds at which the conditions are travelling. The process then (at 2415) selects, from the data representing the detected conditions for each radar, data from a particular radar to use as the output data for the particular region. The selected data is then output (at 2420) to any of a website, or 3rd party (e.g., a mapping software provider for display as an overlay in the mapping software) and the process ends.

Figure 25:
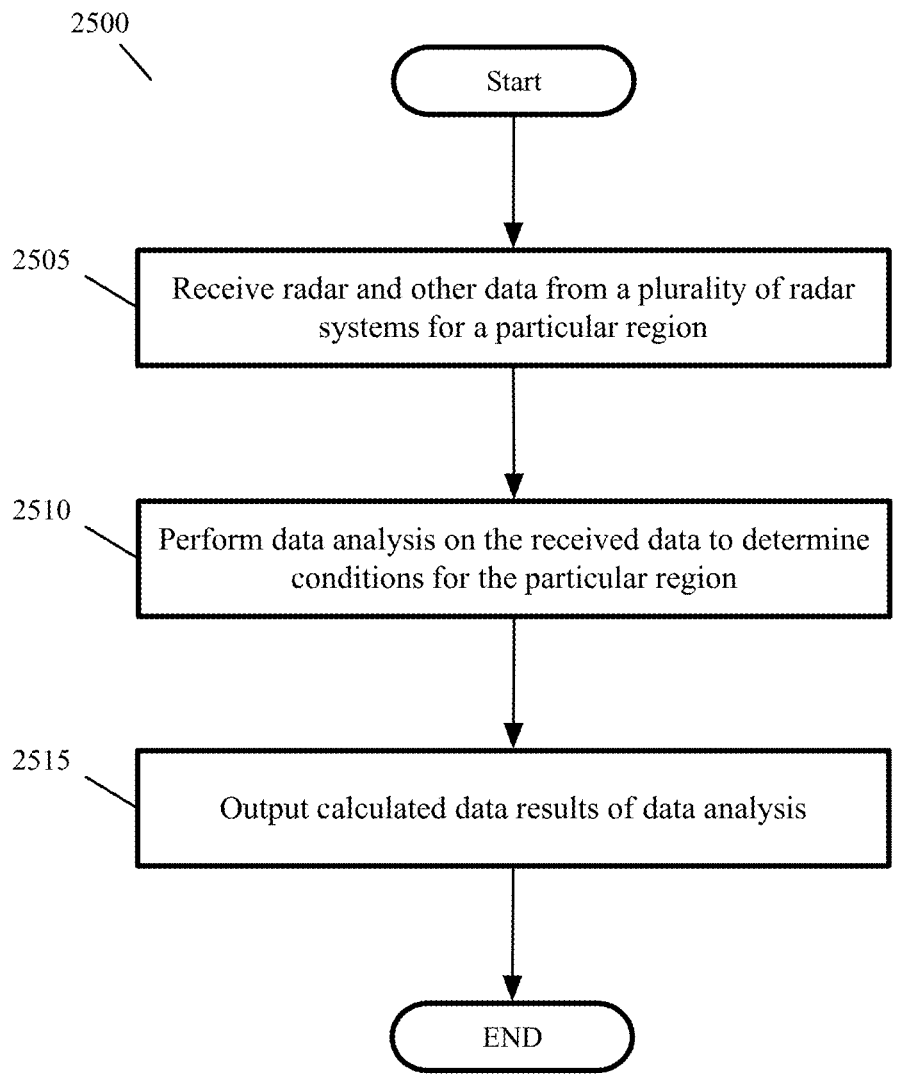
FIG. 25 conceptually illustrates another process performed by the central server to generate data for a particular region covered by more than one radar.

FIG. 25 conceptually illustrates a process 2500 performed by the central server to generate data for a particular region covered by more than one radar. Process 2500 begins by receiving (at 2505) radar data from multiple radar systems covering a particular region. In some embodiments, the radar data is collected at different times, but within a time period over which the meteorological conditions are not expected to change (e.g., 1-100 seconds). In some embodiments, the radars are coordinated to collect data at the same time.

After the data is received, analysis is performed (at 2510) on the received data from each of the individual radars to determine conditions for the particular region. The analysis, in some embodiments, identifies meteorological conditions, such as rain, snow, hail, etc. and speeds at which the conditions are travelling based on data from each individual radar and then averages or interpolates the data to generate a set of output data for the particular region. In other embodiments, the data from the multiple radars is analyzed as a unit of data. In some embodiments, a machine trained network produces the output based on the combined data from all the individual radars. The generated data is then output (at 2415) to any of a website, or 3rd party (e.g., a mapping software provider for display as an overlay in the mapping software) and the process ends.

Figure 26:
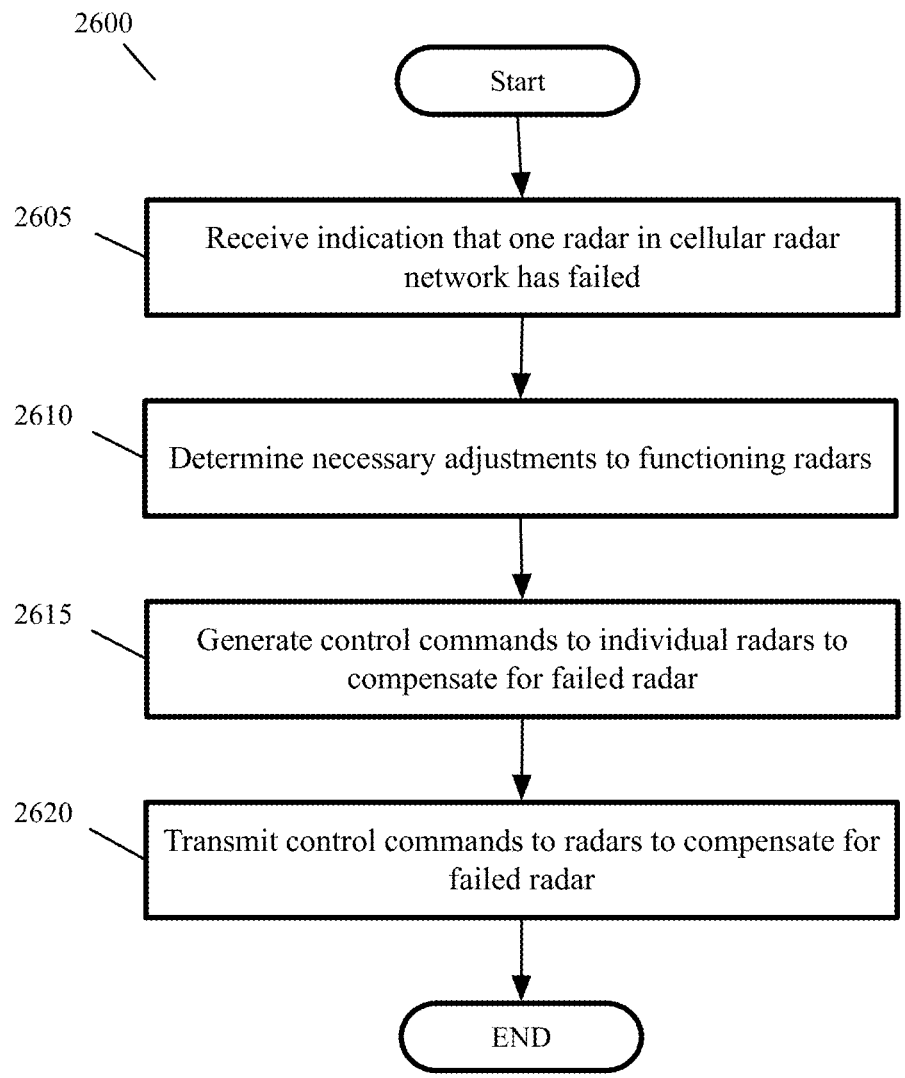
FIG. 26 conceptually illustrates a process performed by the central server to generate and send control commands to individual radars in the case of a radar failure.

FIG. 26 conceptually illustrates a process 2600 for a central controller to perform to compensate for a failed radar in the cellular radar network. Process 2600 begins by receiving (at 2605) an indication that a particular radar in a cellular radar network has failed. In some embodiments, the indication is a lack of a response to a heartbeat signal used to identify failed or disconnected systems. In some embodiments, the indication is a failure message sent from the computer associated with the radar. In other embodiments, any radar that fails to provide data for a certain configured time period is assumed to have failed.

Once the central controller determines that a particular radar has failed, the central controller determines (at 2610) the necessary adjustments to other radars in the cellular radar network. In some embodiments, the determination includes identifying the adjacent or nearest radars (e.g., those radars that share overlapping scanning regions) that must be adjusted. Once the radars to be adjusted are identified, the type and scope of the change are determined. For example, in FIG. 2 the range of the six radars surrounding the failed radar are increased to cover the region formerly scanned by the failed radar. The necessary change to the data capture timing and, in some embodiments, output power of the radars (e.g., increasing pulse length to increase total power transmitted, or increasing transmission power of the transmitter) are determined.

After determining the necessary adjustments, the central controller generates (at 2615) a set of commands for each individual radar to implement the necessary adjustments. Once the commands are generated for each individual radar, the commands are transmitted at 2620 to the individual radars and the process ends. In some embodiments, a separate control channel is established between the central controller and the computers at the individual radars. In other embodiments, the same connection (e.g., wired or wireless Ethernet or internet connection) that is used to send data from the radar to the central controller is used for control messages. In some embodiments, a control computer at each radar with an independent connection to the central controller is used to communicate commands to the individual radars.

Figure 27:
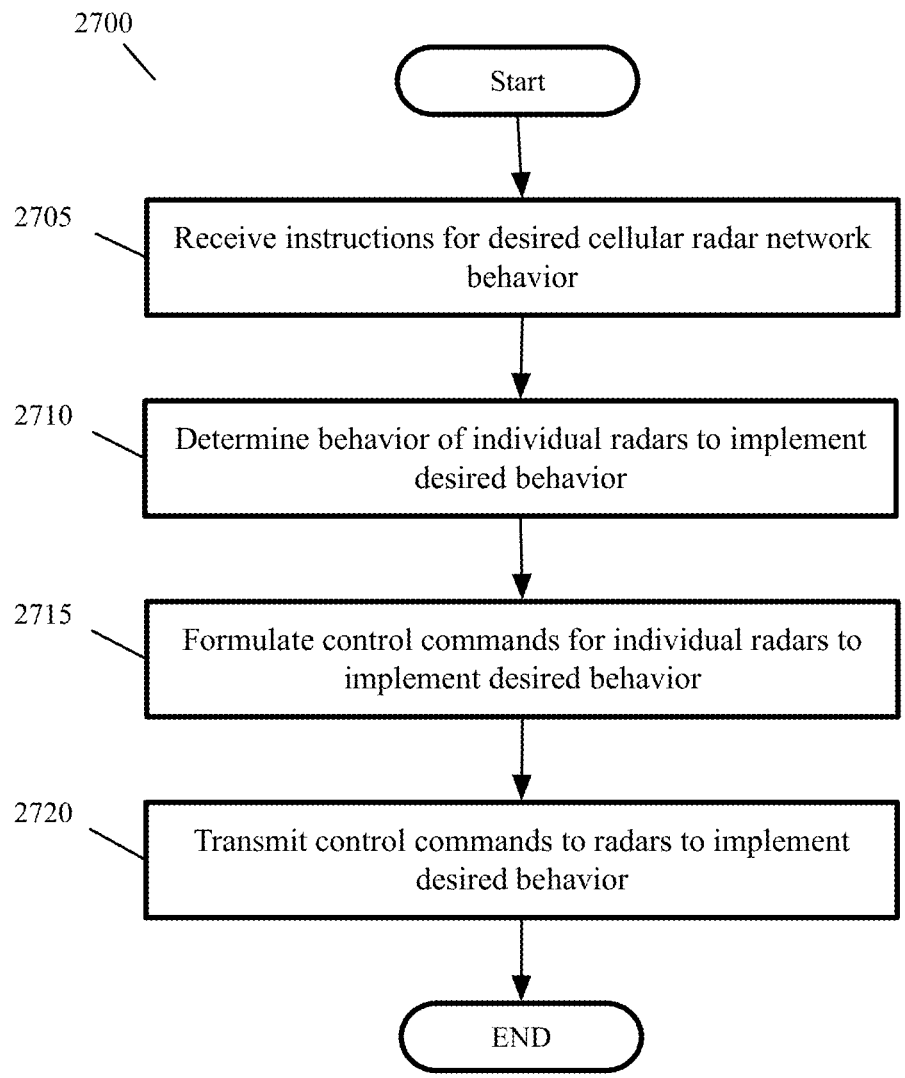
FIG. 27 conceptually illustrates a process performed by the central server to implement a desired behavior of a cellular radar network using the individual radars.

FIG. 27 conceptually illustrates a process 2700 for a central controller to perform to implement desired cellular radar networks. Process 2700 beings by receiving (at 2705) instructions for desired behavior of the cellular radar network. In some embodiments, the instructions are received from a system administrator. The instructions, in some embodiments, define a particular rate of data capture or type of scan (e.g., PPI, RHI, sector, or spot) and the associated parameters (e.g., step size in azimuth and elevation, range of azimuth and elevation). In some embodiments, the instructions define a region to be covered with the central controller left to determine how best to implement the instructions (e.g., determine the type of scan, ranges of individual radars, etc.).

Once the instructions are received by the central controller, the central controller determines (at 2710) the behavior of the individual radars in the cellular radar network necessary to implement the desired behavior. In some embodiments, the determination includes determinations as to the type of scan (e.g., PPI, RHI, sector, spot, etc.) and associated parameters (e.g., sample rate, data capture timing, step sizes and ranges for azimuth and elevation) for each individual radar. Additionally, in some embodiments, the determination includes a determination as to whether the radars are to be operated in monostatic or bistatic configuration and whether gold codes or pseudorandom signals should be encoded to distinguish signals from different radars.

Once the behavior of individual radars has been determined (at 2710), commands for each radar are formulated (at 2715) to implement the desired behavior. Once the commands are formulated and generated for each individual radar, the commands are transmitted at 2720 to the individual radars and the process ends. In some embodiments, a separate control channel is established between the central controller and the computers at the individual radars. In other embodiments, the same connection (e.g., wired or wireless Ethernet or internet connection) that is used to send data from the radar to the central controller is used for control messages. In some embodiments, a control computer at each radar with an independent connection to the central controller is used to communicate commands to the individual radars.

Figure 28:
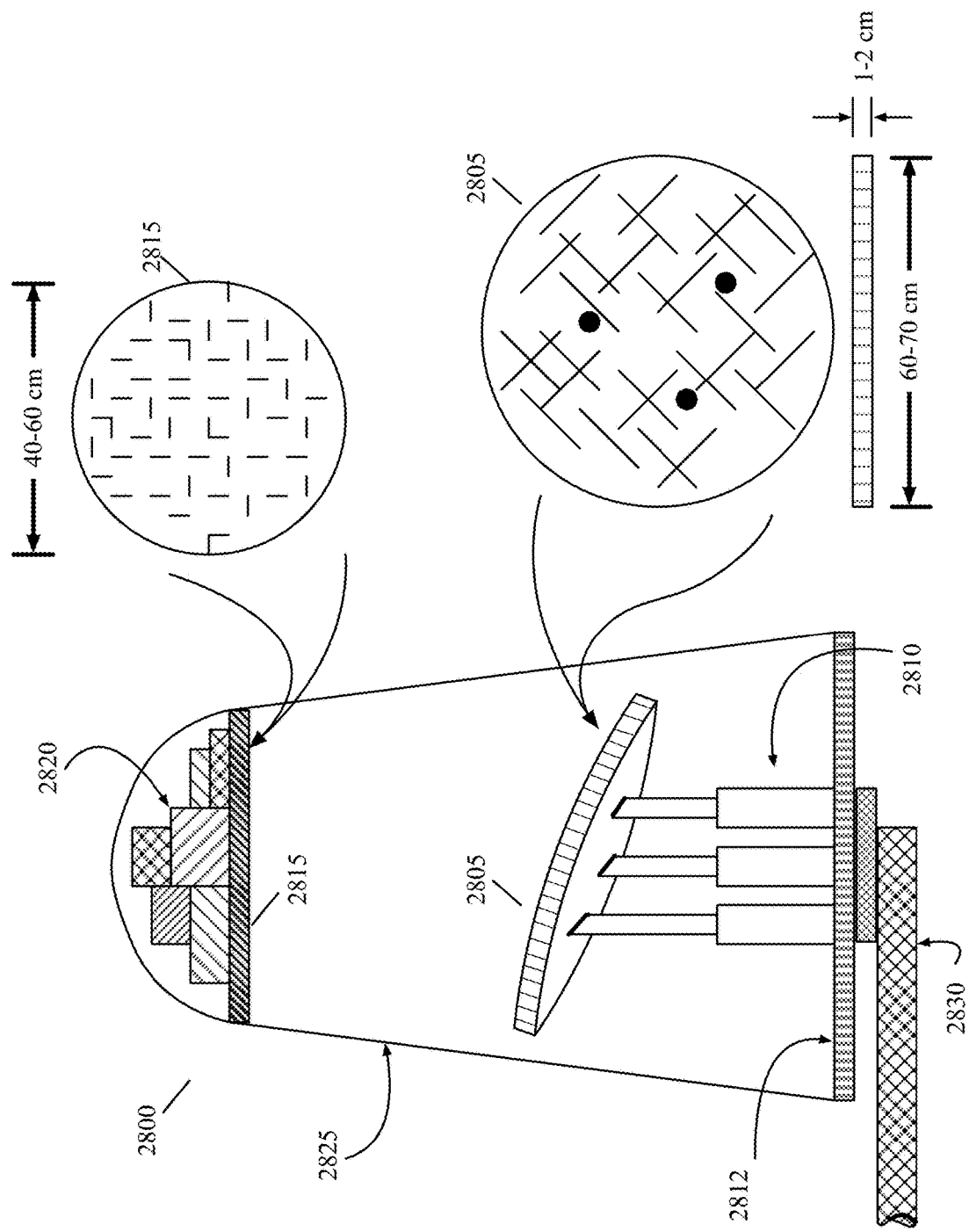
FIG. 28 illustrates a low-cost radar of some embodiments.

FIG. 28 illustrates a low-cost radar of some embodiments. As shown, the radar 2800 of this figure includes (1) a beam steering walking splash plate 2805 with positioning actuators 2810 placed on top of a base plate 2812, (2) a printed circuit phase array antenna 2815, (3) radar electronic components 2820, (4) a radome 2825 and (5) mounting brackets 2830.

The radome 2825 is a structural, weatherproof enclosure that protects the antenna 2815 and associated electronics 2820. The radome is a passive bell jar radome in some embodiments. The radar electronic components 2820 generate the signals to transmit, and receive and interpret the return signals, via the phase array antenna 2815. In some embodiments, the antenna is dual polarized, and is manufactured on a printed circuit board. The dimensions of this printed circuit board in some embodiments are sized to accommodate the requirements of the radar.

The antenna 2815 illuminates the walking splash plate 2805. The actuators 2810 position the splash plate 2805 to steer the radar's beam in the direction of interest. In some embodiments, the radar 2800 is designed to steer its beam 360° in azimuth and from 0° (horizontal) to 45° in elevation.

The radars 2800 and 900 in some embodiments are small, lightweight devices and are sized to accommodate the requirements of the radar. In some embodiments, the radars 2800 and 900 are Pulse Doppler Polarimetric radars that can view different radar reflections and generate output displays of detailed high-resolution radar reflections. These radar reflections include, in some embodiments, reflections from dust, rain, hail, snow, ice, birds, drones, airplanes, etc.

In some embodiments, a novel machine trained (MT) network is provided that is trained on radar data captured by the novel cellular radar network to predict solutions to problems. A basic structure of a multi-layer machine-trained network is described in relation to FIG. 29. FIGS. 30-33 describe the training and use of the trained network.

Figure 29:
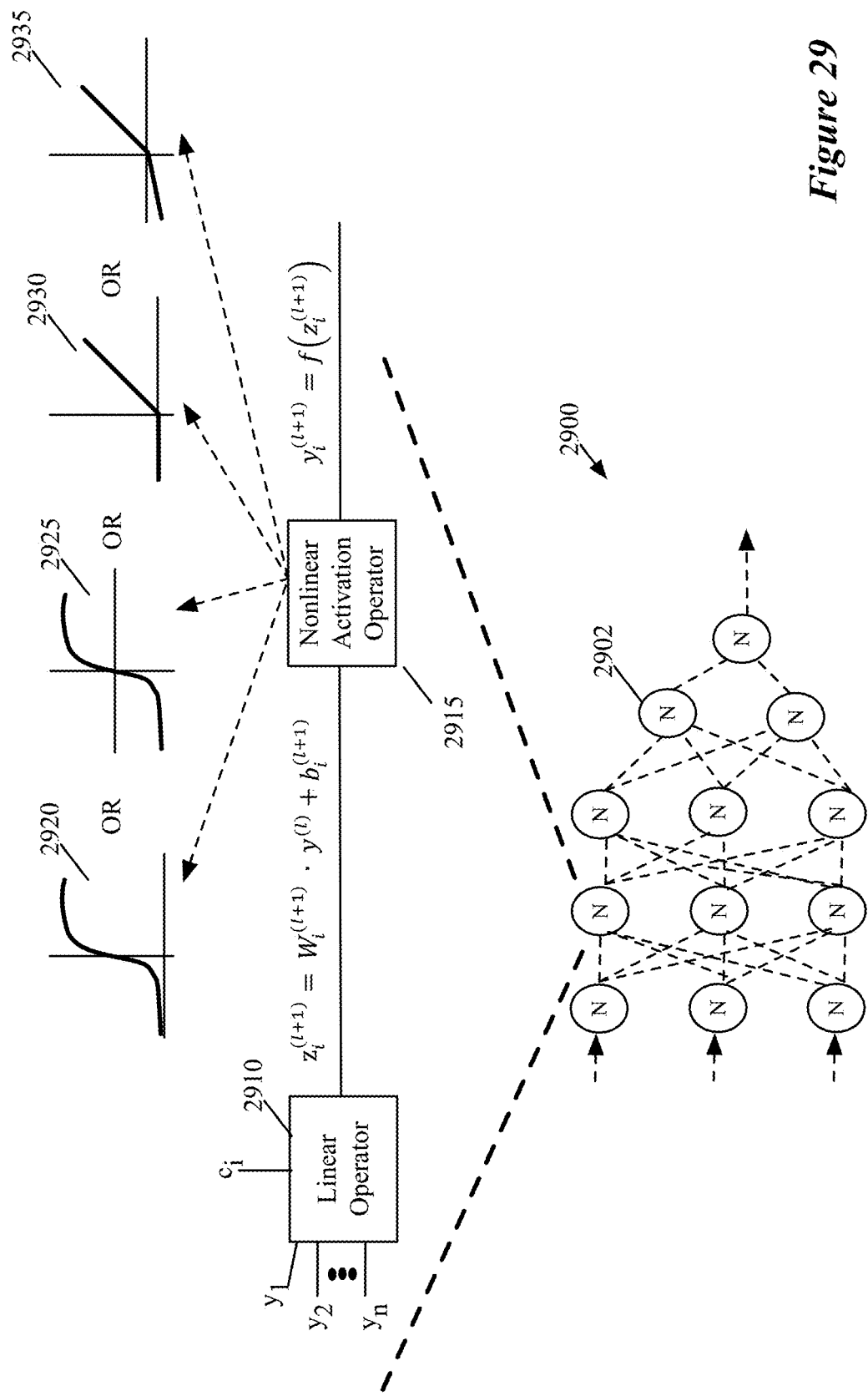
FIG. 29 illustrates a simple feed-forward neural network with three hidden layers having multiple nodes, and a single output layer with one output node.

FIG. 29 illustrates an example of a multi-layer machine-trained network of some embodiments. This figure illustrates a feedforward neural network 2900 that has multiple layers of processing nodes, called neurons 2902. In all but the first (input) and last (output) layer, each neuron 2902 receives two or more outputs of neurons from earlier processing node layers and provides its output to one or more neurons in subsequent layers. The output of the neuron in the last layer represents the output of the network 2900. In some embodiments, the output of the network 2900 is a number in a range of values (e.g., 0 to 1). In this example, the neural network 2900 only has one output node. Other neural networks of other embodiments have several output nodes that provide more than one output value. In addition, the neural networks of other embodiments may be types of networks other than feed forward networks (e.g., recurrent networks, convolutional networks, etc.).

As shown in FIG. 29, each neuron in neural network 2900 has a linear component 2910 and a nonlinear component 2915. The linear component 2910 of each hidden or output neuron in this example computes a dot product of a vector of weight coefficients and a vector of output values of prior nodes, plus an offset. In other words, a hidden or output node's linear operator computes a weighted sum of its inputs (which are outputs of the previous stage neurons that the linear operator receives) plus an offset. Similarly, the linear component 2910 of each input neuron of some embodiments computes a dot product of a vector of weight coefficients and a vector of input values, plus an offset. In other embodiments, each input neuron receives a single input and passes that input as its output. Each neuron's nonlinear component 2915 computes a function based on the output of the neuron's linear component 2910. This function is commonly referred to as the activation function.

The notation of FIG. 29 can be described as follows. Consider a neural network with L−1 hidden layers (i.e., L+1 layers including the input layer and the output layer). The variable l can be any of the hidden layers (i.e., l∈{1, . . . , L−1} index the hidden layers of the network, with l=0 representing the input layer and l=L representing the output layer). The variable $z_i^{(l+1)}$ represents the output of the linear component of a hidden neuron i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l plus an offset $b_i$, typically referred to as a bias.

$$z_i^{(l+1)} = W_i^{(l+1)} \cdot y^{(l)} + b_i^{(l+1)} = \Sigma_{k=1}^n (w_{ik}^{(l+1)} * y_k^{(l)}) + b_i^{(l+1)} \quad (A)$$

The symbol * is an element-wise product, while the symbol · is the dot product. The weight coefficients $W^{(l)}$ are parameters that can be adjusted during the network's training in order to configure this network to solve a particular problem.

The output $y_i^{(l+1)}$ of the nonlinear component 2915 of a neuron in layer l+1 is a function of the neuron's linear component and can be expressed as by Equation (B) below.

$$y_i^{(l+1)} = f(z_i^{(l+1)}) \quad (B)$$

In this equation, f is the nonlinear activation function for node i. Examples of such activation functions include a sigmoid function 2920 ($f(x)=1/(1+e^{-x})$), a tanh function 2925, a ReLU (rectified linear unit) function 2930 or a leaky ReLU function 2935, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015.

Equation (B) can be expressed in the following expanded format of Equation (C).

$$y_i^{(l+1)} = f(z_i^{(l+1)}) = f[(\Sigma_{k=1}^n w_{ik} * y_k) + b_i^{(l+1)}] \quad (C)$$

In this equation, $w_{ik}$ are weight values associated with the inputs $y_k$ of the neuron i in layer l+1.

Figure 30:
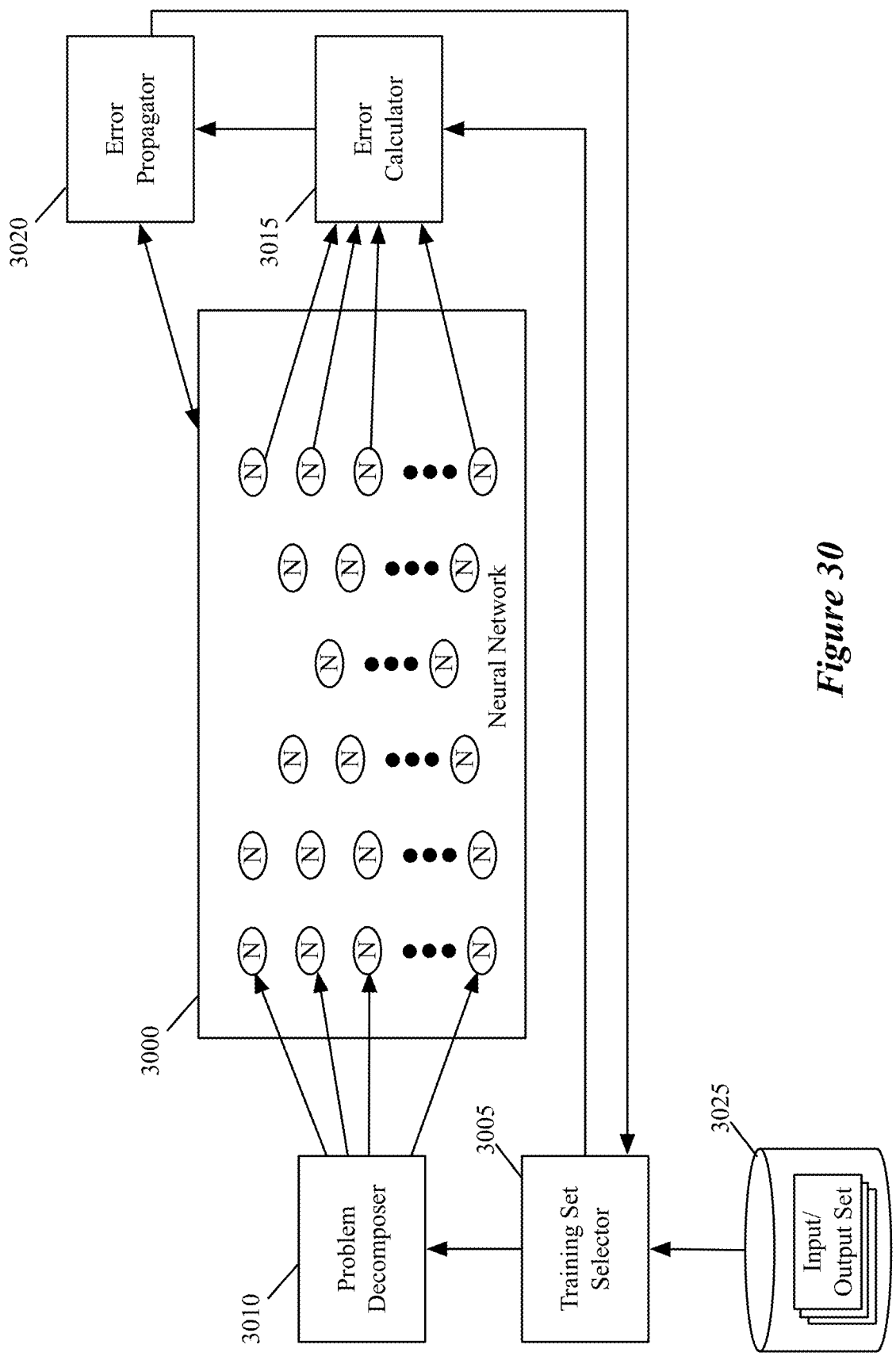
FIG. 30 illustrates a set of modules of some embodiments that perform a back propagation process that uses multiple known training sets to train the MT network.
Figure 31:
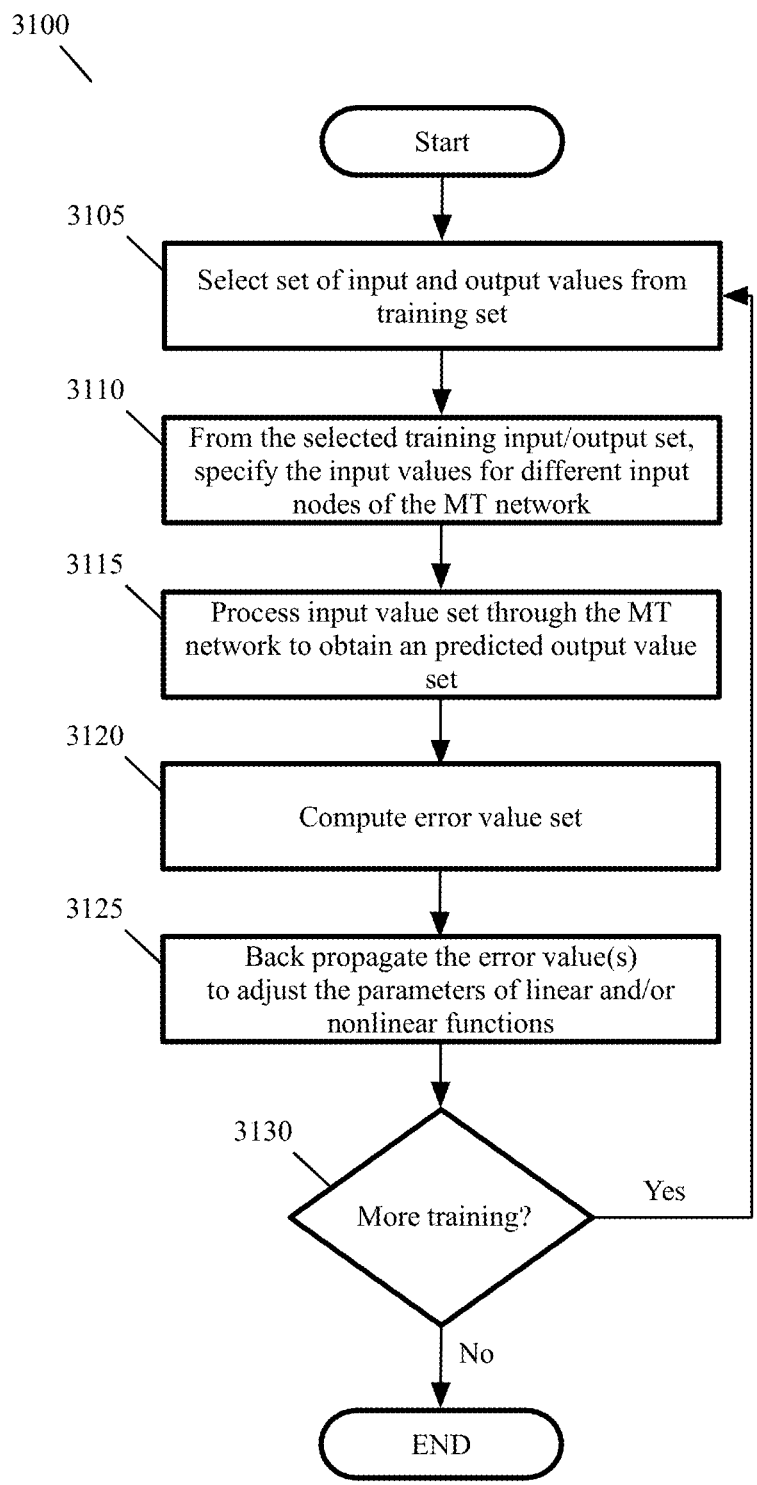
FIG. 31 illustrates the back-propagation process that the modules of FIG. 30 perform.

The MT network, in some embodiments, is a multi-layer node network trained on large numbers (e.g., 1,000-100,000) of radar data sets from the novel cellular radar network with known solutions (e.g., meteorological conditions) and is trained to reproduce the known solutions given the radar data sets. FIG. 30 illustrates a set of modules of some embodiments that perform a back-propagation process that uses multiple known training sets to train the MT network 3000. As shown, these modules include a training set selector 3005, an input selector 3010, an error calculator 3015, and an error propagator 3020. In some embodiments, all of these modules are executed by a single server or set of servers. In other embodiments, these modules are performed on a different device than the device that eventually executes the MT network 3000. FIG. 31 illustrates the back-propagation process 3100 that the modules of FIG. 30 perform.

As described in FIG. 31, the training set selector 3005 initially selects (at 3105) a training set from the training sets that are stored in a data storage 3025. In some embodiments, the data storage 3025 is on the same device that executes the modules 3005-3020 of FIG. 30, while in other embodiments, this data storage is on a remote server. The selected training set includes a set of input values and a set of output values. The output value set is the set of output values that the MT network should generate for the input value set of the selected training set. In other words, the output value set is the known/desired output value set (e.g., meteorological conditions) for the input value set. For example, in some embodiments, the MT network 3000 determines current or predicted meteorological conditions (e.g., rain, snow, intensity, particle types, and velocity). For these embodiments, each input/output set in the training set includes (1) captured radar data (e.g., the raw signals captured by the individual radars in a cellular radar network, or processed data that separates data from horizontal and vertically polarized transmitted radar signals) as the input value set, and (2) a weather type, particle type, and/or subsequent weather associated with a particular location/radar orientation as the output value set.

In other embodiments, the MT network produces a set of predicted (raw) radar data for a particular region at a particular height or range of heights for a particular period in the future. For such embodiments, each input set in the training set includes captured radar data (e.g., the raw signals captured by the individual radars in a cellular radar network) while the output set in the training set includes captured radar data for the particular region at the particular height or range of heights at the particular later time or time period that will be predicted by the trained network. For example, for training the MT network to predict conditions in the low atmosphere (e.g., ground conditions) 15 minutes in the future, radar data collected for a period of 1 hour can be broken up into 45 training data sets for each of the first 45 minutes with the input data being the data captured at a particular minute and the output data being the data that is captured for the particular region 15 minutes later. In some embodiments, the input set of raw data represents data for as little as a single pulse while in other embodiments up to an hour of raw data (e.g., all data captured in the hour or a second's worth of data every 1-30 minutes) can be used as an input set. For some such embodiments, the predicted data, after appropriate formatting, is fed to the same program (e.g., thunderstorm identification, tracking, analysis and nowcasting (TITAN)) that is used, in some embodiments, to analyze current radar data in order to translate captured data (e.g., raw data formatted for the particular program) into identified weather patterns.

At 3110, the input selector 3010 selects the inputs to the MT network's input nodes from the set of input values selected at 3105. For example, the input selector 3010, in some embodiments, uses radar data from the individual radars in the cellular radar network. Next, at 3115, the MT network 3000 processes the supplied input values to produce a set of output values. In some embodiments, this processing entails each processing node of the MT network first having its linear operator 2910 compute a weighted sum of its input, and then having its nonlinear activation operator 2915 compute a function based on the output of the linear component.

At 3120, the error calculator 3015 computes a set of error values from (1) the output value set produced by the MT network for the supplied input value set, and (2) the output value set from the selected training set (selected at 3105). As shown, the error calculator 3015 receives the training set's output value(s) from the training set selector 3005 in some embodiments. In the example illustrated in FIG. 30, the MT network 3000 has multiple output processing nodes that each produce one output value. In other embodiments, the MT network produces a single value from one processing node.

For each output value in the output value set, the error calculator 3015 computes (at 3120) an error value by subtracting the MT-network produced output value from the desired output value. At 3125, the error calculator 3015 provides the error value set that it computes to the error propagator 3020, which then coordinates the back propagation of this error value set through the processing nodes of the MT network. In some embodiments, each processing node is an instantiated object that includes a back-propagation function for handling back-propagation calls from the error propagator 3020. In these embodiments, each time the error propagator 3020 calls a processing node's back-propagation function, this function computes adjustments to the parameter(s) of the node's linear operator and/or nonlinear operator and returns to the error propagator 3020 error values to propagate back to each of the inputs of the node's linear operator. To call the propagating function of a particular processing node that is not an output processing node, the error propagator 3020 in some embodiments aggregates (e.g., sums) the error values that it has receives from all processing nodes when more than one processing node receives the particular processing node's output, and then supplies the aggregated error value to the particular processing node's propagating function.

After the computed error value is back propagated through the processing nodes of the MT network and one or more of these nodes adjust their linear and/or nonlinear operator parameters during this back propagation, the error propagator 3020 notifies the training set selector 3005 that it has completed its error propagation. Next, at 3130, the training set selector 3005 determines whether it should stop the training of the MT network. In some embodiments, the training set selector 3005 uses a minimization process (e.g., a stochastic gradient descent minimizer) to determine when it should stop the training of the MT network. When the training set selector 3005 determines that it should continue the training, the process 3100 returns to 3105 to select another training set from the storage 3025, and then repeats operations 3110-3130 for this selected training set. In some embodiments, the process 3100 can iterate multiple times through one training set (i.e., one input/output set), while this process is training the configurable parameters of the MT network 3000. The process 3100 ends when the training set selector 3005 determines that it does not need to continue the training. In some embodiments, training is performed for a specific cellular radar network configuration (e.g., training a MT network for use with a specific cellular radar network configuration corresponding to a specific set of locations of radar systems).

Figure 32:
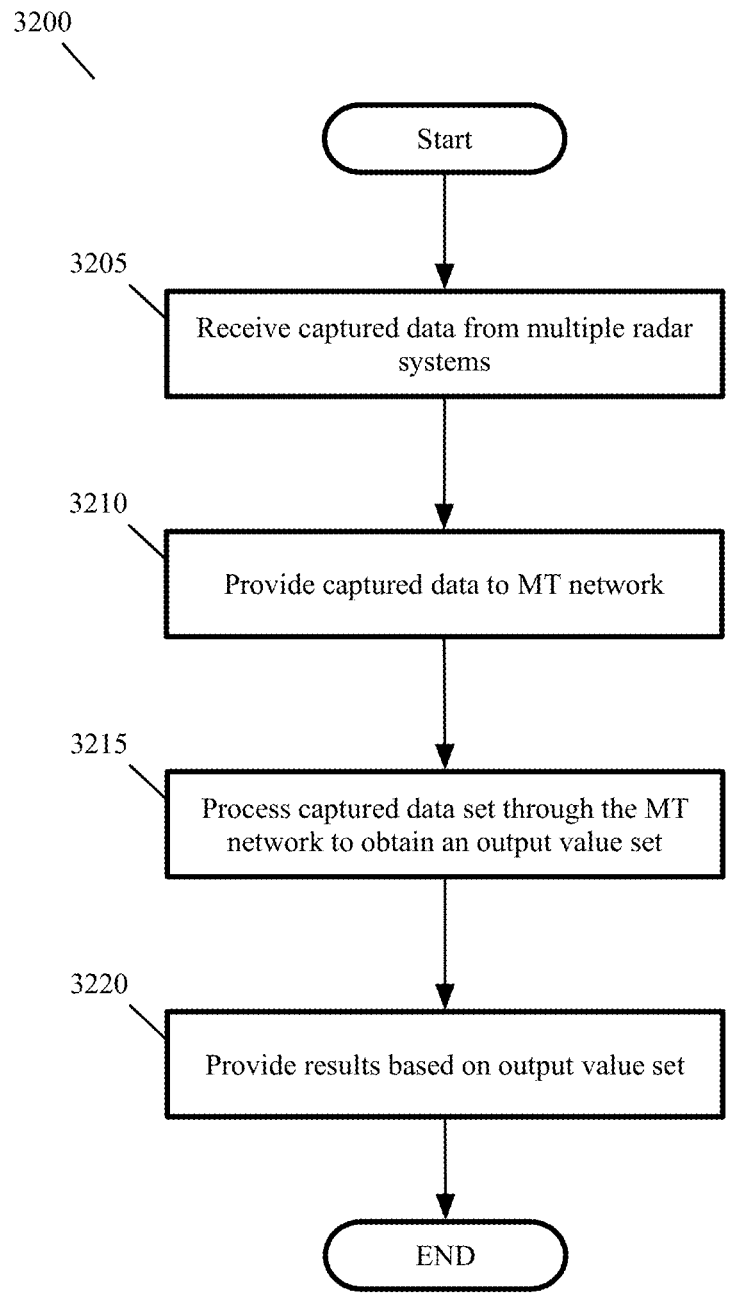
FIG. 32 conceptually illustrates a process for using the MT network in a device to produce output for captured image data and provide a service based on that output.

After training the multi-layer network, the network is loaded in a device or at the central server, in some embodiments, to provide detected weather data, detected particle identification data, and/or weather prediction data. FIG. 32 conceptually illustrates a process 3200 for using the MT network in a device to produce output for captured radar data and provide results based on that output. Process 3200 begins by capturing (at 3205) data from multiple radars in the cellular radar network. In some embodiments, the captured data is raw data captured from the two channels of the individual radar systems as well as azimuthal and elevation positioning data. In some embodiments, the captured data is horizontal and vertical polarization data derived from the raw data captured over the two channels of the individual radar systems using the azimuthal and elevation positioning data, the azimuthal and elevation positioning data also included as the captured data.

The process then provides (at 3210) the captured data to the machine trained network for processing. In some embodiments, providing the captured data includes processing the data to put it into a format accepted by the machine-trained network. After the captured data is in the proper format to be processed by the machine-trained network, the process processes (at 3215) the captured data set through the machine-trained network to produce an output value set. In other embodiments, the raw data is the input into the machine trained network. The output value set, in different embodiments, is one of detected (e.g., raw) weather data, detected particle identification data, and/or weather prediction data.

After the captured data is processed by the machine-trained network, the process provides (at 3220) results based on the output value set. In some embodiments, the output value set is raw data that is then formatted for feeding into a standard weather interpretation program (e.g., TITAN) to produce weather data. In some embodiments, the results are then used to provide overlay weather data for a map display on a mobile device or another computing device. In some embodiments, the results are used to provide warnings of severe weather events with greater specificity than currently available.

Figure 33:
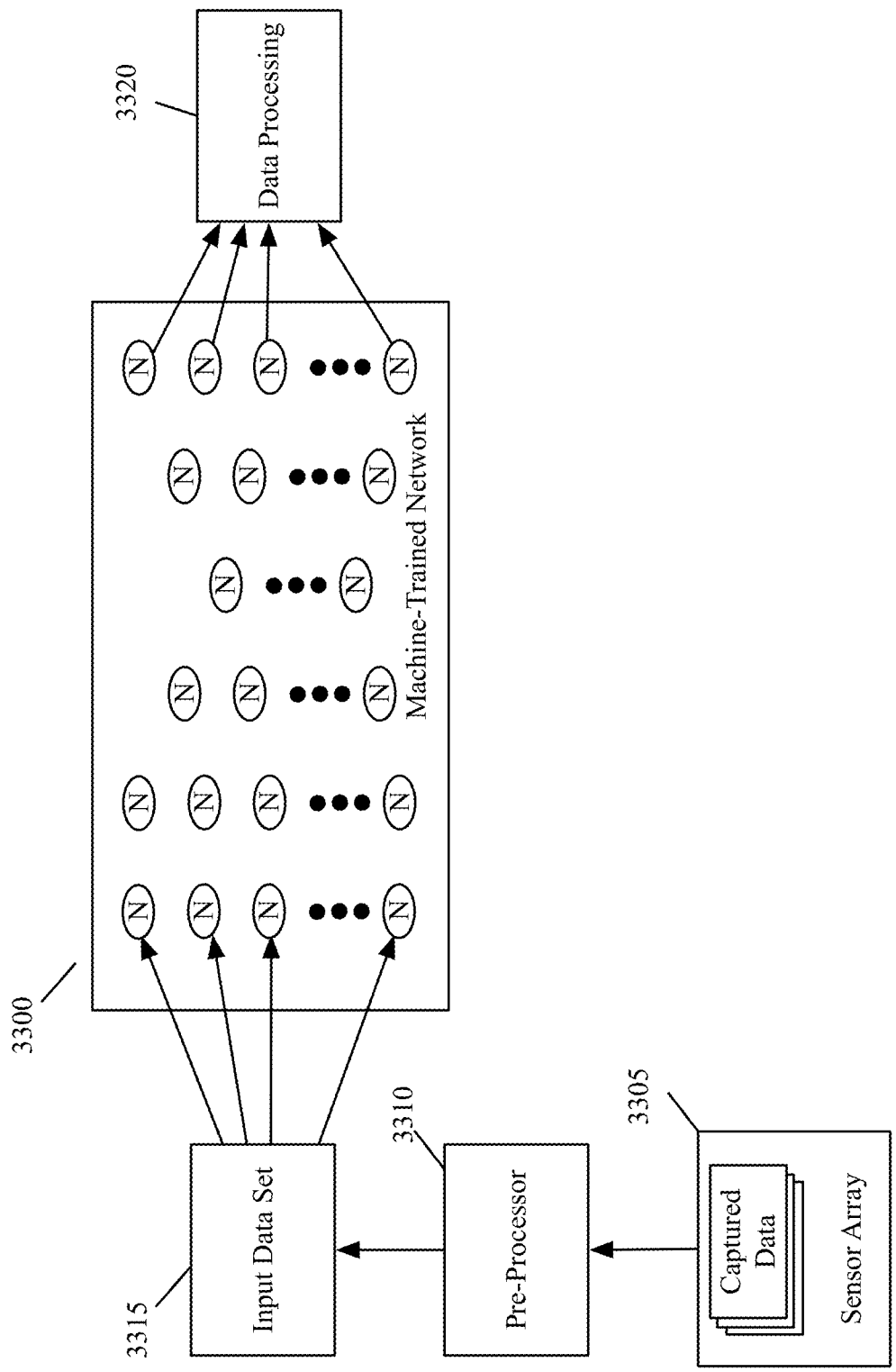
FIG. 33 illustrates a system using a machine-trained network to compute an output value set from data captured by a sensor array.

FIG. 33 illustrates a system using a machine-trained network to compute an output value set from data captured by a cellular radar network. FIG. 33 includes MT network 3300, a sensor array 3305, a pre-processor 3310, an input data set 3315 and a data processing unit 3320. As described in relation to FIG. 32, sensor array 3305 captures data that is passed to pre-processor 3310. Pre-processor 3310 takes the raw data set and converts it into a form that is acceptable to MT network 3300. Once input data set 3315 is in the proper format, it is fed to MT network 3300 as input data and MT network 3300 processes the input data set to produce the output value set. The output value set is then passed to data processing module 3320. As described above, data processing module in some embodiments uses the output value set to perform additional services based on the output value set.

In some embodiments, a genetic algorithm is used to perform the machine learning to produce the output data. In some embodiments, the genetic algorithm generates a set of 10-1000 solution matrices. A solution matrix in some embodiments, is a set of weights applied to a set of functions. The functions, in some embodiments, are functions of data based on individual radar systems, location of the individual radar systems, time of the data, additional sensor data associated with the individual radar system. Similar to the training described above the results for each solution matrix is compared to a desired result and a measure of the accuracy (i.e., score) is calculated. After each score is calculated, a fraction (e.g. 10-50%) of the highest scoring matrices (or lowest scoring matrices, depending on the particular scoring methodology) are kept for the next round (generation) as well as "mated" in pairs such that each pair produces a new solution matrix using a portion (e.g., half) of the weights from one solution matrix of the pair and the rest (e.g., the other half) of the weights from the other solution matrix of the pair. Additional solution matrices are generated, in some embodiments, by "mutating" a set of weights in the solution matrices. The newly generated matrices are tested and the scores of all the matrices (including the ones from the previous generation) and the process iterates until a satisfactory solution matrix is found (e.g., no solution matrix with a higher (or lower) score has been identified in 100 generations). As described above, once the satisfactory solution has been found the solution matrix is used to determine or predict the meteorological conditions. In some embodiments, multiple solution matrices are determined that are used depending on prevailing or initial conditions (e.g., solution matrix 1 for snow, solution matrix 2 for rain, etc.). In some embodiments, the solution matrix is the set of weights of a neural network.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

While the invention has been described with reference to numerous specific details, one skilled in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A radar comprising:
   a feed horn antenna for transmitting and receiving radar signals;
   a signal generator for generating radar signals for transmission by the feed horn antenna;
   a parabolic reflector for (i) reflecting antenna-transmitted signals to a splash plate used to direct the signals outside of the radar and (ii) reflecting return signals towards the antenna,
   wherein the feed horn antenna, signal generator, and parabolic reflector are stationary relative to each other and the feed horn antenna is part of a waveguide assembly, wherein the waveguide assembly comprises:
      a first component for (1) receiving a first received return signal with a first polarization direction and (2) transmitting a signal with the first polarization direction; and
      a second component for (1) receiving a second received return signal with a second polarization direction that is orthogonal to the first polarization direction and (2) transmitting a signal with the second polarization direction,
   wherein the waveguide assembly comprises (1) a magic T waveguide junction with the first and second components connecting to first and second arms of the magic T waveguide junction and (2) first and second circulators (i) that are used to connect the arms of the magic T waveguide junction to the first and second components and (ii) that connect to first and second paths to an analog to digital converter for capturing data related to the received return signals.

2. The radar of claim 1, wherein the feed horn antenna, signal generator, and parabolic reflector are stationary with respect to a support structure supporting the radar.

3. The radar of claim 1, wherein the feed horn antenna, signal generator, and parabolic reflector are stationary with respect to the ground.

4. The radar of claim 1, wherein the splash plate comprises a reflective surface with an axial aperture through which the feed horn antenna passes.

5. The radar of claim 4, wherein the splash plate is rotated around the feed horn antenna to direct the transmitted signals in different directions around the radar.

6. The radar of claim 5, wherein a splash plate support structure comprises a component for changing an elevation angle of the splash plate.

7. The radar of claim 6, wherein the elevation angle of the splash plate is controlled to direct the transmitted signal to different heights outside of the radar.

8. The radar of claim 6, wherein the splash plate support structure and component for changing the elevation angle are driven mechanically.

9. The radar of claim 8, wherein the elevation angle of the splash plate is controlled by a differential gear.

10. The radar of claim 1, wherein the splash plate comprises a planar reflecting surface.

11. The radar of claim 1, wherein the splash plate comprises a curved surface.

12. The radar of claim 11, wherein the curved surface is a parabolic surface.

13. The radar of claim 1, wherein the signal generator is a phase locked dielectric resonator oscillator.

14. The radar of claim 1, wherein the signal generator is a digital to analog converter.

15. The radar of claim 1, wherein the first and second components are rectangular waveguides and the feed horn antenna has a circular aperture.

16. The radar of claim 1, wherein the splash plate rotates relative to the feed horn antenna and components of the antenna-transmitted signals exit the radar with a polarization direction that depends on the degree of rotation of the splash plate.

17. The radar of claim 16, wherein at a first position of the splash plate a first component of the antenna-transmitted signals is horizontally polarized, wherein at a second position rotated approximately 90 degrees of rotation from the first position, the first component of the antenna-transmitted signals is vertically polarized.

* * * * *